United States Patent
Ma et al.

(10) Patent No.: US 10,745,186 B2
(45) Date of Patent: Aug. 18, 2020

(54) CONTAINER FOR BIOLOGICAL PRESERVATION AT LOW TEMPERATURE

(71) Applicant: FIBULAS, INC., New York, NY (US)

(72) Inventors: Xiaotian Ma, New York, NY (US); Ying Pan, New York, NY (US)

(73) Assignee: Fibulas, Inc., New York, NY (US)

( * ) Notice: Subject to any disclaimer, the term of this patent is extended or adjusted under 35 U.S.C. 154(b) by 0 days.

(21) Appl. No.: 15/970,022

(22) Filed: May 3, 2018

(65) Prior Publication Data

US 2019/0092555 A1 Mar. 28, 2019

Related U.S. Application Data

(60) Provisional application No. 62/585,889, filed on Nov. 14, 2017, provisional application No. 62/537,120, (Continued)

(51) Int. Cl.
*B65D 81/38* (2006.01)
*B01L 7/04* (2010.01)
(Continued)

(52) U.S. Cl.
CPC ....... *B65D 81/3823* (2013.01); *A01N 1/0268* (2013.01); *B01L 3/50851* (2013.01); *B01L 3/5453* (2013.01); *B01L 7/04* (2013.01); *B01L 3/5082* (2013.01); *B01L 2200/028* (2013.01); *B01L 2300/021* (2013.01); *B01L 2300/022* (2013.01); *B01L 2300/042* (2013.01); *B01L 2300/044* (2013.01); *B01L 2300/0832* (2013.01); *B01L 2300/0854* (2013.01); *B01L 2300/1883* (2013.01)

(58) Field of Classification Search
CPC .................................................. B65D 81/3823
USPC ....... 215/201, 216; 220/592.2, 592.24, 23.83
See application file for complete search history.

(56) References Cited

U.S. PATENT DOCUMENTS 3,244,272 A * 4/1966 Beama ................ G07D 9/004
206/82
3,275,180 A * 9/1966 Optner ............. B65D 77/0493
206/459.5
(Continued)

FOREIGN PATENT DOCUMENTS

WO 2011098365 8/2011
WO 2014135890 9/2014

OTHER PUBLICATIONS

Zeus, Low Temperature Properties of Polymers (Year: 2005).*
International Search Report and Written Opinion dated Jul. 12, 2018 for corresponding PCT/US2018/030913, 9 pages.

*Primary Examiner* — Jeffrey R Allen
(74) *Attorney, Agent, or Firm* — Rimon Law

(57) ABSTRACT

A container is provided in the present disclosure. The container includes at least one outer wall that is made of a low temperature tolerant material where the at least one outer wall is arranged to substantially form the container with an opening end; a tube that is situated inside the at least one outer wall, where the tube and the at least one outer wall are substantially thermally insulated, and the tube is open at one end that is on a same side of the opening end of the container; and a container cover being shaped substantially to match the at least one outer wall, where the container over is capable of covering the opening end of the container.

6 Claims, 44 Drawing Sheets

Related U.S. Application Data filed on Jul. 26, 2017, provisional application No. 62/503,750, filed on May 9, 2017.

(51) Int. Cl.
*A01N 1/02* (2006.01)
*B01L 3/00* (2006.01)

(56) References Cited

U.S. PATENT DOCUMENTS

| | | | | |
|---|---|---|---|---|
| 3,587,910 | A * | 6/1971 | McCarthy | B65D 1/30 206/139 |
| 3,730,374 | A * | 5/1973 | Picciano | B65D 77/0493 220/23.89 |
| 4,832,220 | A * | 5/1989 | Quennessen | B65D 41/0471 215/331 |
| 4,915,255 | A * | 4/1990 | Curtis | A61B 10/0096 206/521 |
| 6,085,927 | A * | 7/2000 | Kusz | B65D 77/0493 215/6 |
| 2013/0273648 | A1* | 10/2013 | Dorge | B01L 3/508 435/325 |
| 2014/0158695 | A1 | 6/2014 | Jimenez-Rios | |
| 2015/0325321 | A1* | 11/2015 | Helle | G21F 5/015 250/506.1 |
| 2016/0032110 | A1* | 2/2016 | Battaglia | C09D 105/00 524/55 |

* cited by examiner

1900

- 1910 — Placing Biological Material
- 1920 — Connecting Conduit
- 1940 — Transferring Biological Material to Vial
- 1950 — Positioning Tube inside Container
- 1960 — Placing Container

```
4710 → Adding Chemicals into Container
4720 → Sealing Container Using Cap
4730 → Centrifuging Container
4740 → Solidifying Chemicals
4750 → Forming layer inside Container
```

FIG. 47

CONTAINER FOR BIOLOGICAL PRESERVATION AT LOW TEMPERATURE

CROSS-REFERENCE TO RELATED APPLICATIONS

This application claims the priority to U.S. Provisional Patent Application Ser. No. 62/503,750, filed May 9, 2017, U.S. Provisional Patent Application Ser. No. 62/537,120, filed Jul. 26, 2017, and U.S. Provisional Patent Application Ser. No. 62/585,889, filed Nov. 14, 2017, the entirety of all of which is hereby incorporated by reference herein for all purposes.

FIELD OF THE TECHNOLOGY

The disclosure relates to the field of biological material preservation, and more particularly, it relates to a container for the storage and preservation of virus, nucleic acids, protein, cell, and tissue materials.

BACKGROUND OF THE TECHNOLOGY

Biological materials/samples may be stored at low temperature to keep their properties and functions for future use. The temperature for such storage system can be as low as −80° C. or even down to −196° C., and the materials to be stored may be severely and irreversibly damaged by the abrupt temperature drop while being put into those low temperature environment from conditions of higher temperature. Therefore, special protocols are often conducted during such operations to maintain the properties and functions of the sample to be stored.

SUMMARY

The present disclosure provides a container and a method of producing a container. The present disclosure provides a container. The container may include at least one outer wall that is made of a low temperature tolerant material, where the at least one outer wall is arranged to substantially form the container with an opening end; a tube that is situated inside the at least one outer wall, where the tube and the at least one outer wall are substantially thermally insulated, and the tube is open at one end that is on a same side of the opening end of the container; and a container cover being shaped substantially to match the at least one outer wall, where the container cover is capable of covering the opening end of the container, and when the opening end of the container is covered by the container cover, the container cover substantially seals the tube and substantially thermally insulates the tube such that the container is capable of being placed in a low temperature environment.

The present disclosure also provides a method of producing a container. The method may include providing at least one outer wall that is made of a low temperature tolerant material, where the at least one outer wall is arranged to substantially form the container with an opening end; providing a tube that is situated inside the at least one outer wall, where the tube and the at least one outer wall are substantially thermally insulated, and the tube is open at one end that is on a same side of the opening end of the container; and providing a container cover being shaped substantially to match the at least one outer wall, where the container cover is capable of covering the opening end of the container, and when the opening end of the container is covered by the container cover, the container cover substantially seals the tube and substantially thermally insulate the tube such that the container is capable of being placed in a low temperature environment, wherein the low temperature environment has a temperature that is below or equal to −80° C.

It is to be understood that, both the foregoing general description and the following detailed description are exemplary and explanatory only and are not restrictive of the present disclosure.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 19 briefly describes a set of standard operating procedures of this disclosure.

FIG. 47 briefly describes one set of procedures to produce the coating inside the container in this disclosure.

Figure 1:
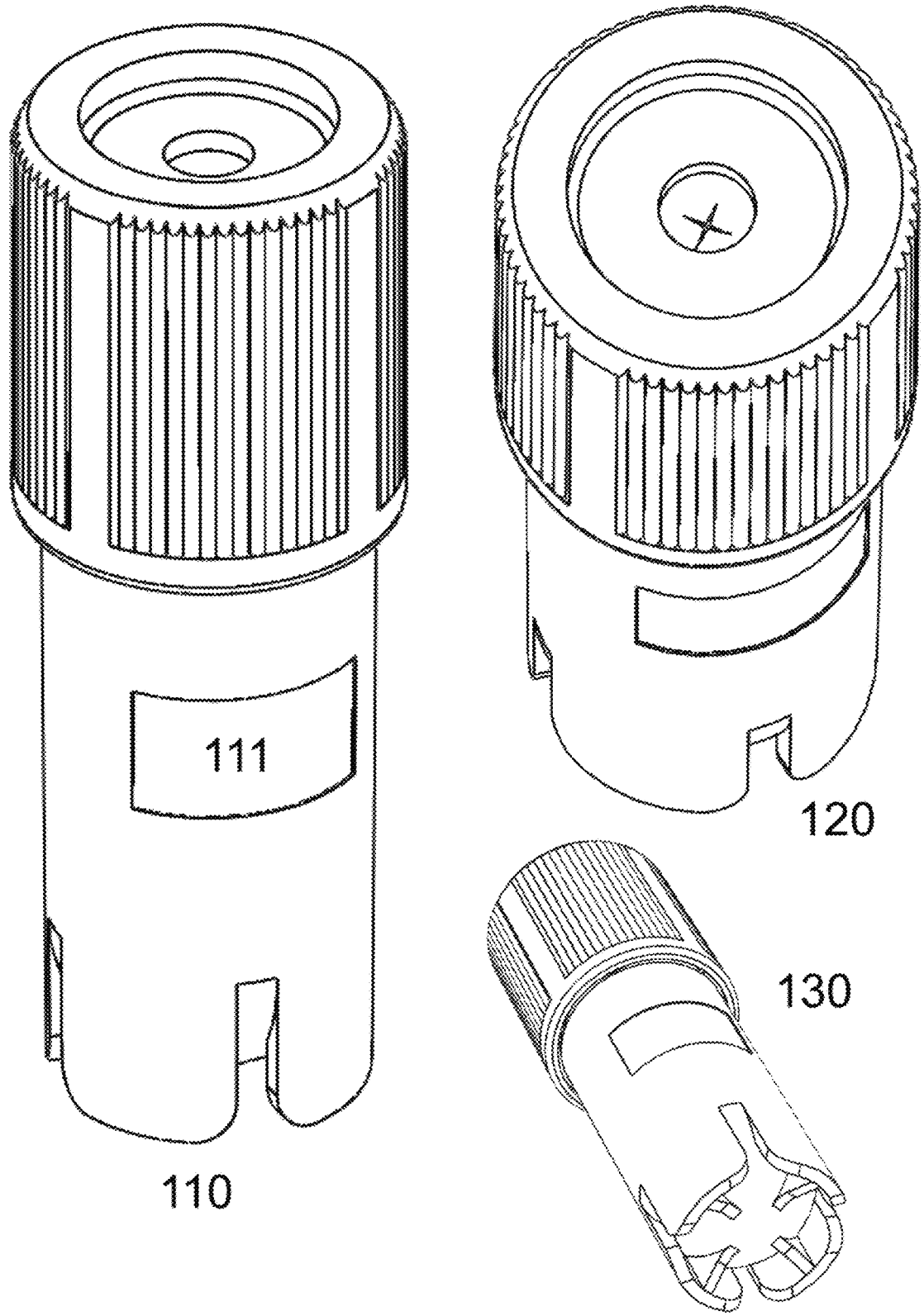
FIG. 1 illustrates one example of the vial that may be used in this disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF ILLUSTRATED EXAMPLES

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Some terms referred in this disclosure may be interpreted as follows:

Biological materials: materials and organisms that form organisms or produced by organisms, primarily including virus, cells, tissues, protein, and nucleic acid. Biological samples may be biological materials.

Low temperature: the temperature lower than the temperature at which a biological material naturally resides, or the temperature lower than the temperature at which a biological material normally functions. Sometimes, the low temperature may refer to the temperature that is below or equal to −80° C.

Protein: large biomolecules that serve multiple functions within organisms. Proteins including but not limited to enzymes, antibodies, and membrane proteins.

Cell: A basic structural, functional and biological unit of living organisms. In the following context, the terms "cell" and "cells" refer to but not limited to cells directly collected from living organisms, cells created, manipulated and replicated outside living organisms, bacteria living inside or outside living organisms, and the like.

Tissue: an ensemble of similar cells from the same origin that carry out a specific function. A tissue may be directly acquired from a living organism, grown outside or inside a living organism from individual cells, or artificially synthesized or assembled using cells and other material.

Medium: a type of liquid or gel-like mixture used to store biological samples. It may contain nutrients and other chemicals that promotes the growth or reproduction of cells.

Culture: the process by which cells and tissues are grown under controlled conditions.

Thawing: a process to unfreeze samples, which may include cells and tissues.

Cryoprotectant: a liquid or gel-like mixture that may be used to contain samples including cells or tissues during a temperature drop (substantially a freezing process). The cryoprotectant may nourish or protect the sample to enable it surviving the freezing process or the thawing process afterwards.

Protocol: a standard operating procedure to complete a task.

Vacuum: the terminology "vacuum" in this context refers to a zone with low air pressure.

Tessellate: cover a plane surface by repeated use of a single shape. An attachment clip is a clip that can attach more than more tubes together via clipping the outer wall of the tubes.

The present disclosure discloses a container that may have a container/chamber/vial which may thermally insulate the inside of the container from outside of the container. The container may include more than one container/chamber/vials. The container may have various shapes and at least part of the container is the container/chamber/vial. Also, multiple containers may be assembled to form one big container for preservation of protein, cell, and tissue samples.

FIG. 1 illustrates one example 100 of the vial 110 that may be used in this disclosure. The vial 110 may be viewed at different angles. For example, from top, the vial 110 may be shown as a top view 120 and from bottom, the vial 110 may be shown as a bottom view 130 in FIG. 1. As shown in FIG. 1, the vial 110 may have a container/vial inside which may have low air pressure (vacuum). The vial 110 may have a cap region (the cross-shaped region in 120) that can be punctured by a needle-like structure so the vacuum inside is able to suck the sample into vial 110. The cap may be removable, so the sample can be taken out. Otherwise, with a non-removable cap on vial 110, another needle can be used to take the sample from vial 110. The example of vial 110 shown in FIG. 1 is cylindrical, but the shape of vial 110 is not limited to cylinder. A vial may be other shape such as a tube.

Each vial 110 may be labeled with a unique identification (ID) for the purpose of sorting and management. The band 111 on the side of the vial 110 in FIG. 1 can be a location to install the ID. The ID includes but not limited to barcode, QR code (Quick Response Code, two-dimensional barcode), and RFID (Radio-frequency identification) chip. The ID may also be engraved on the vial 110.

Vial 110 may be manufactured with the vacuum preloaded. Vial 110 may be tightly sealed as shown in FIG. 1, with vacuum inside. Each vial 110 may be able to suck designated amount of liquid, based on the pressure of the preloaded vacuum inside.

Vial 110 may be preloaded with chemicals, cryoprotectant for example, which may protect the sample during the storage process. Special gas may also be preloaded into vial 110 for other specific purposes, nitrogen, for example, to prevent oxidation of sample.

Vial 110 may be centrifuged since it has a reinforced bottom. Sometimes, vial 110 may or may not have the reinforcement structure depending on the design of its bottom as shown in the bottom view 130.

Vial 110 may be stored in a temperature as low as either −80° C. or −196° C. (liquid nitrogen at 1 atm). The interior of vial 110 may be in contact with the sample so the inner surface of vial 110 may be chemically inert such that it is unlikely to react with or dissolved by the sample contained inside. Meanwhile, the structure of vial 110 may be able to remain intact during sudden temperature change at least once. The temperature change may be caused by directly quenching into liquid nitrogen from room temperature or by putting into hot water bath from liquid nitrogen. Also, the material used for vial 110 may be to be non-permeable to air so it has a longer shelf-life and the vacuum inside may be able to last long enough after it is manufactured. The vial 110 may be made from materials that can tolerant the rapid temperature changes, from example from room temperature to either −80° C. or −196° C.

Figure 2:
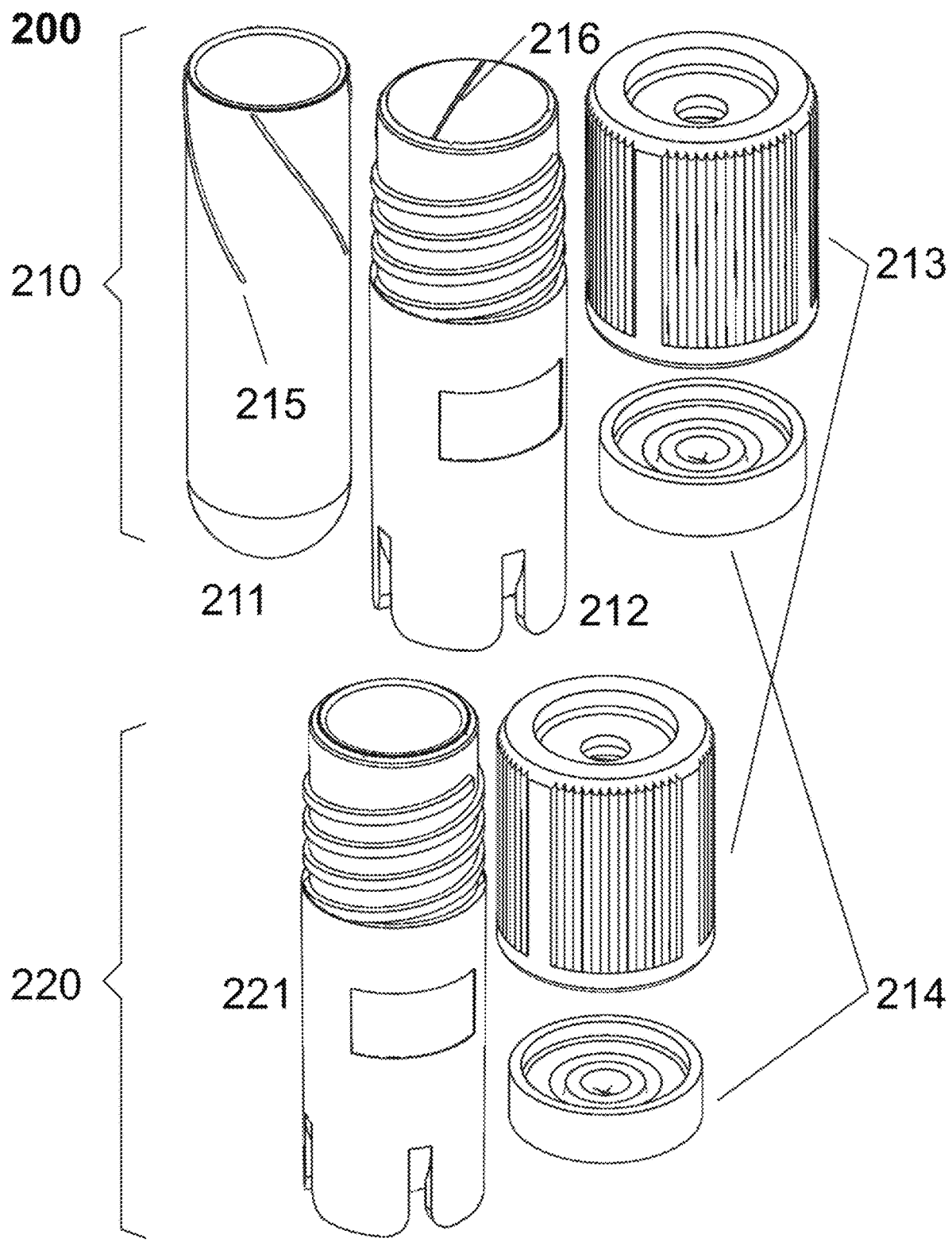
FIG. 2 illustrates some common features shared by most of variations of the vial shown in FIG. 1.

Two possible designs of vial 110 are illustrated in FIG. 2 based on material selection. A double-vial 210 may be implemented while the inner vial 211 is made of chemically inert material (preferably polypropylene, PP), and the outer vial 212 is made of air-tight material (preferably polyethylene terephthalate, PET). Both vials may need to survive the extreme temperature change without cracking, shattering, and other structural or chemical changes that affect the sample stored inside. A single-vial design 220 may be with a single material (preferably polyethylene naphthalate, PEN) that meets all the criteria including but not limited to what are described previously.

FIG. 2 illustrates some common feature shared by most of variations of vial 200, including a vial as shown as the combination of inner vial 211 and the outer vial 212 or the single-designed vial 221, threads between the cap 213 and (the out vial 212 or the single-designed vial 221), the grooves on cap 213, and a plug 214 in FIG. 2. Plug 214 may be embedded inside cap 213, and plug 214 may be moved away along with cap 213 while cap 213 may be unthreaded from vial 210 (or vial 220).

The double-vial 210 shown in FIG. 2 illustrates the essential components of a double-vial vial 110: an inner vial 211, an outer vial 212, a cap 213, and a plug 214. There may be left-handed threads (shown as 215 and 216) between inner vial 211 and outer vial 212 to prevent the possible detaching of inner vial 211 and outer vial 212 while cap 213 is unthreaded from vial 212.

The single-vial design 220 shown in FIG. 2 illustrates the essential components of a single-vial vial 110: a vial 221, a cap 213, and a plug 214.

Figure 3:
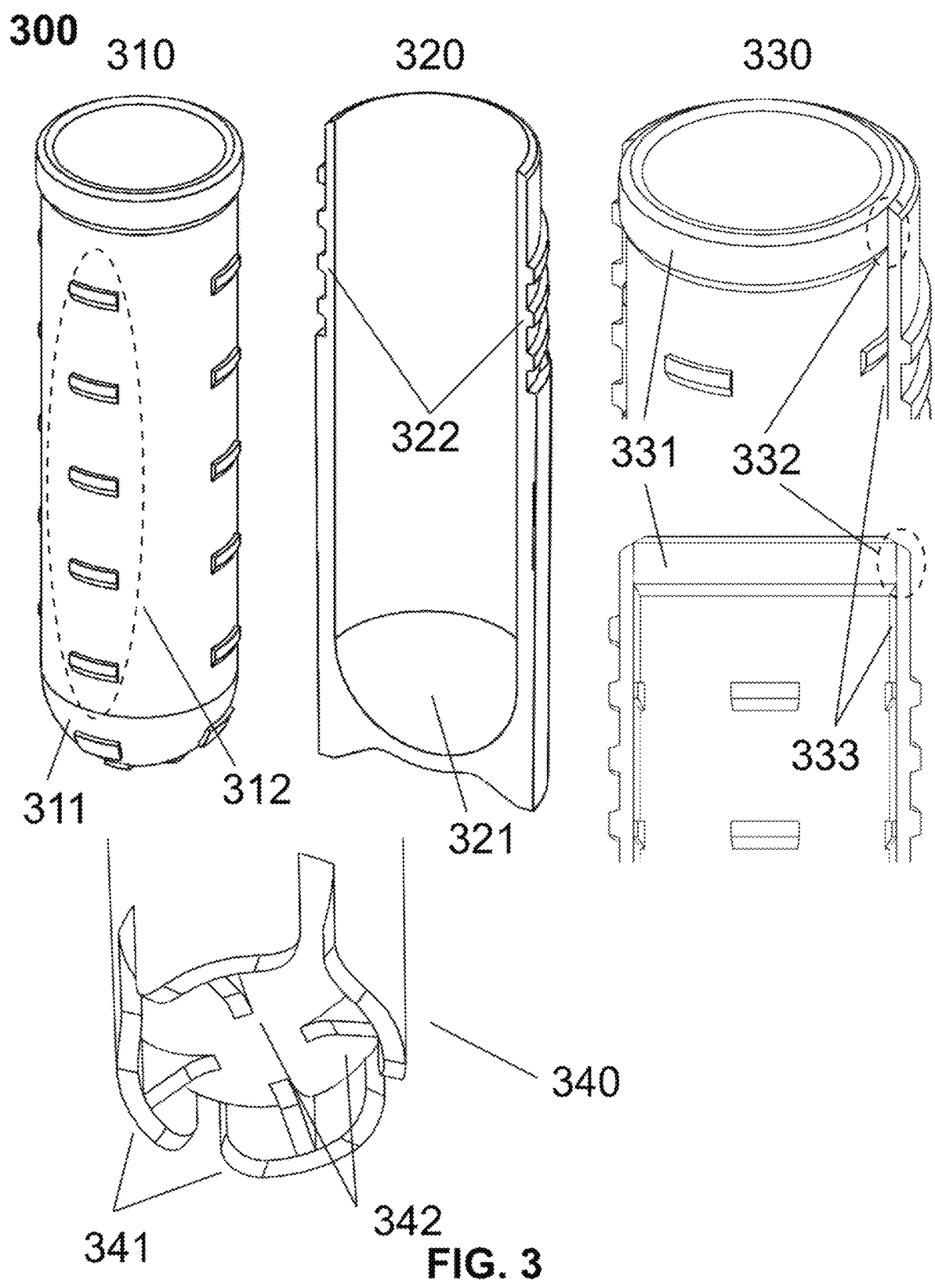
FIG. 3 is an illustration of a design of the double-vial shown in FIG. 2.

FIG. 3 illustrates a double-vial design of vial 210 shown in FIG. 2 300. Inner vial 310 may be embedded into outer vial 320, and there may be a gap 333 between the inner vial 310 and outer vial 320. Gap 333 may be pumped down to vacuum so it may be effectively a vacuum layer between inner vial 310 and out vial 320, to suppress the conductive heat transfer.

The outer perimeter 331 near the opening of inner vial 310 has a larger diameter compared to the outer perimeter of the lower part of inner vial 310, and outer perimeter 331 is connected to the outer vial 330 via an interface 332. Interface 332 may be glued, annealed, melted, or welded so gap 333 may become an encapsulated (isolated) vacuum zone, and may provide the thermal insulation. Array of supporting structures 312 may be distributed between inner vial 310 and outer vial 320 so the gap 333 is not likely to collapse due to the pressure difference between the vacuum inside and the atmospheric pressure outside or due to external mechanical loading.

The bottom of inner vial 310 and outer vial 320 may be rounded as shown as bottom parts 311 and 321 respectively, or conical so they are strong enough to survive while the vial 110 is put under centrifuge. As shown in an example design 340, there may be legs 341 attached to the bottom of outer vial 321 so the inner vial 110 may be able to stand on a flat surface. Reinforcing beams 342 may be used to strengthen the connection between rounded bottom 321 and leg 341. Right-handed thread is on the upper perimeter of outer vial 320 so that vial 320 can be screwed together with cap 213.

Figure 4:
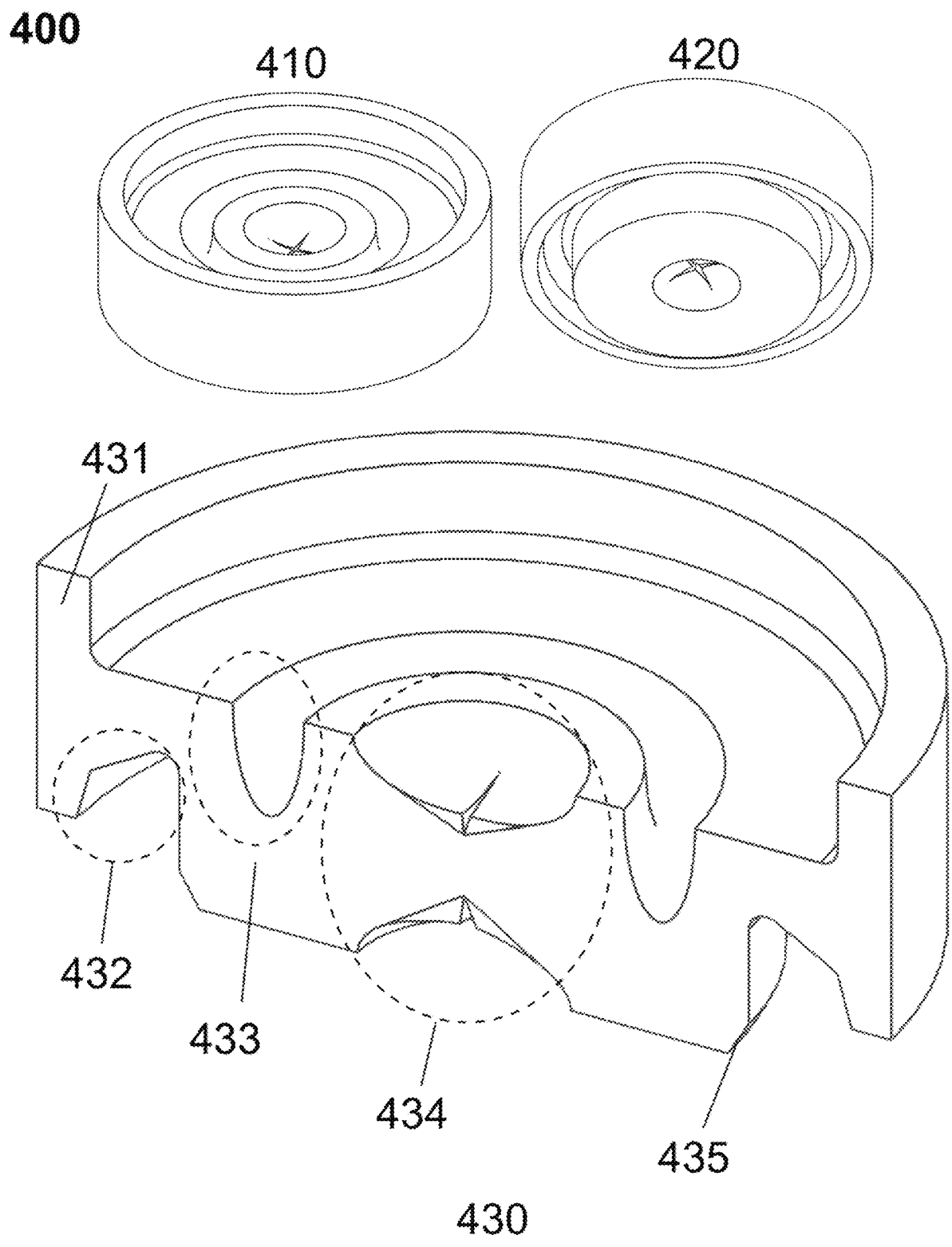
FIG. 4 is an illustration of the detailed design of the plug shown in FIG. 2, with a cross-sectional view.

FIG. 4 is an illustration 400 of plug 214 shown in FIG. 2 viewed at different angles 410 and 420, with a cross-sectional view 430. Plug 214 provides sealing between vial 210 (or vial 220) and cap 213, so that the vacuum inside vial 210 (or vial 220) may be able to last for a long period of time. Plug 214 may be punctured by a needle-like structure to load samples, and plug 214 should self-heal the hole to remain sealed. The self-healing function of plug 214 minimized the possibility of contamination from the outside environment on the sample inside vial 210 (or vial 220) after the sample is loaded.

The material of plug 214 may be chemically inert so that it may not react with the sample. On the other hand, the material of plug 214 may be to be self-healing and non-permeable to air. The material of plug 214 may be butyl rubber or silicone rubber.

The upper rim 431 of plug 214 may be higher than the upper surface of plug 214, which provides more contact area between plug 214 and cap 213, preventing potential detachment while cap 213 is unscrewed from vial 210 or vial 220.

Plug 214 may be capped onto vial 210 (or vial 220) with the ring-groove 432 clamped onto the opening of vial 210 (or vial 220). Ring-groove 432 may have a tapered outer sidewall, which may reduce the chance of being jammed against the opening of vial 210 (or vial 220). Ring-groove 432 may have a vertical inner sidewall, which may be longer than the outer sidewall. The inner sidewall may be in contact with inner vial 310 to form a larger contact area that may provide a better sealing. Chamfer edge 435 may make it easier for plug 214 while being capped onto vial 210 (or vial 220).

Figure 5:
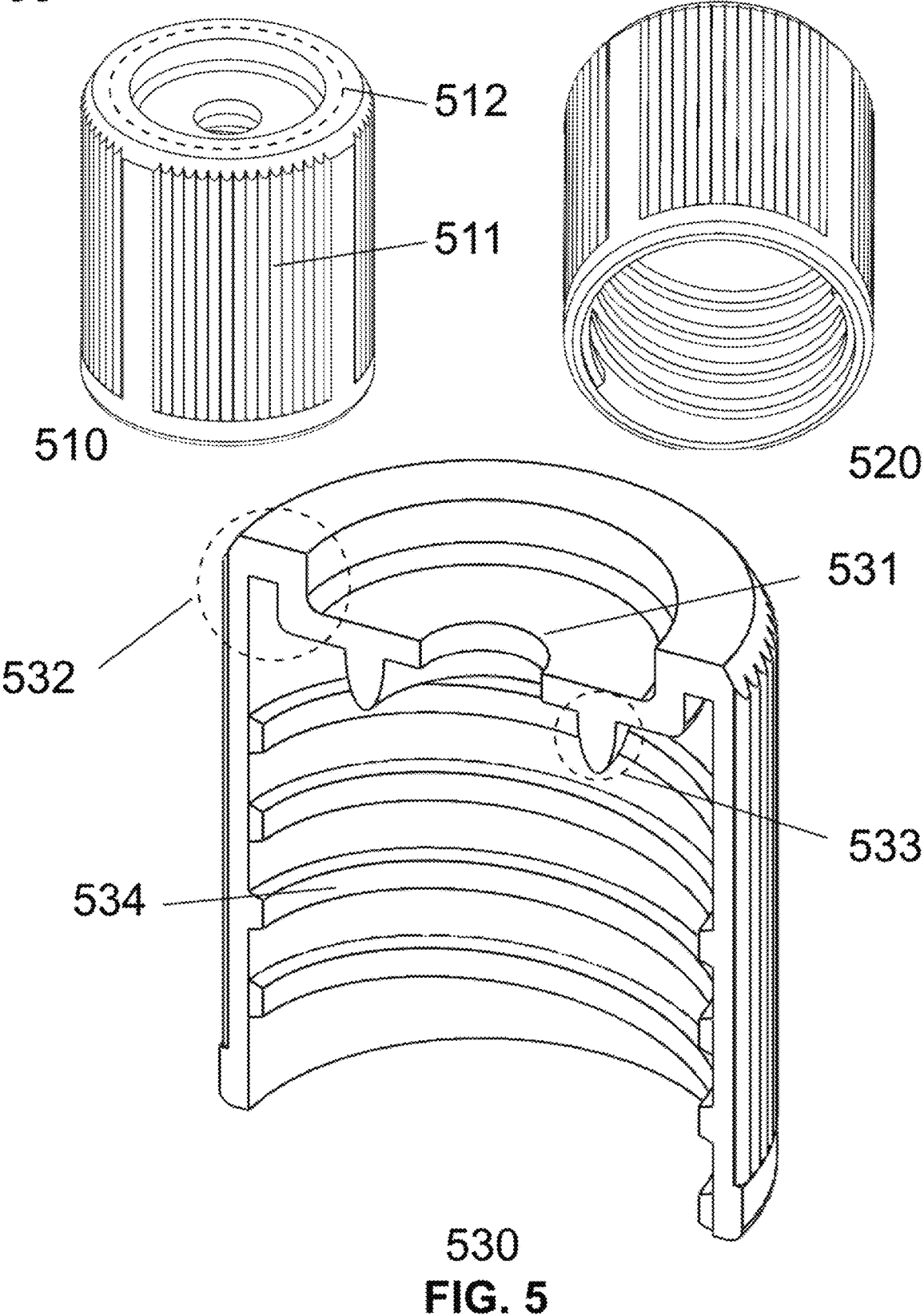
FIG. 5 is an illustration of the detailed design of the cap shown in FIG. 2, with a cross-sectional view.

The ring-groove 433 of plug 214 may be matching with the ring-protrusion 533 as shown in FIG. 5 of cap 213 in order to provide more contact area preventing plug 214 from severe deformation while being punctured at region 434.

The hemispherical dent as well as the cross-groove as shown in region 434 may make it easy for plug 214 to be punctured by a needle-like structure.

FIG. 5 is an illustration 500 of cap 213 shown FIG. 2 viewed at different angles (510 and 520), with a cross-sectional view 530. Cap 213 may be to have grooves on the perimeter 511 to provide friction while being unthreaded.

A hole 531 may be on the top surface of cap 213 so a needle-like structure can pass through it puncturing plug 214 which may be located inside cap 213.

A U-shaped groove 532 may be matching rim 431 of plug 214 to provide friction, strengthening the connection between cap 213 and plug 214. The wall of groove 532 may also provide extra strength for cap 213.

The cylindrical indented volume (circled by region 512) formed by the sidewall of groove 532 may hold a plug during the storage to help labeling the sample. While being inserted after the sample is loaded to vial 110, the plug may also prevent hole 531 and dent 434 from exposing to low temperature environment, enhancing the sealing performance especially after dent 434 is punctured.

Ring-protrusion 533 of cap 213 may be matching with ring-groove 433 of plug 214 in order to provide contact area for preventing plug 214 from severe deformation while being punctured at region 434 through hole 531.

Right-handed thread 534 may be on the inner sidewall of cap 213 so that cap 213 can be screwed together with vial 320.

Figure 6:
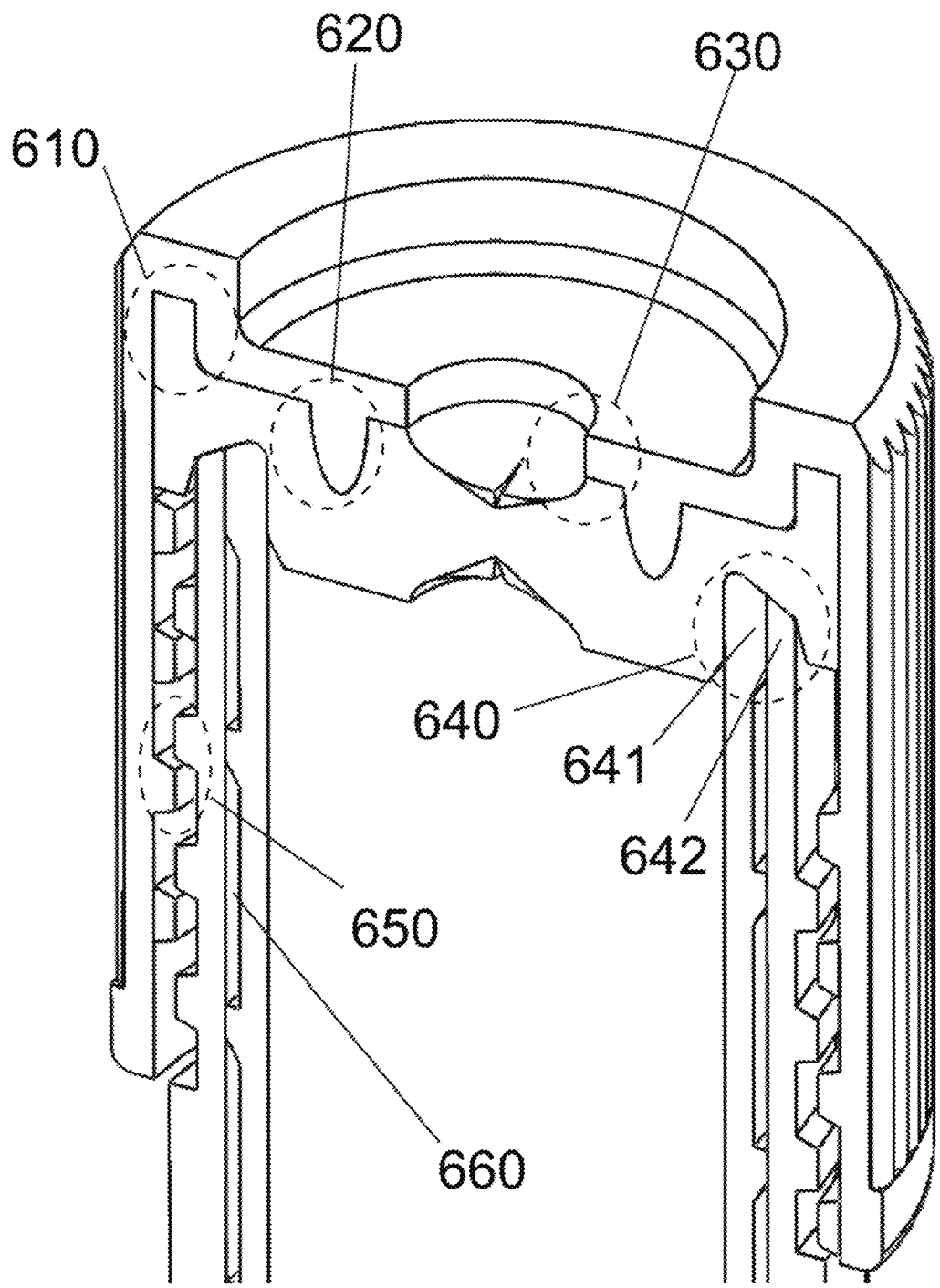
FIG. 6 is a cross-sectional illustration of the assembly of each component shown in FIG. 3.

FIG. 6 is a cross-sectional illustration 600 of the assembly of each components shown in FIG. 3. Inner vial 310 may be embedded inside outer vial 320. As shown in FIG. 6 regarding rim 640, the rim 641 at opening of inner vial 310 and the rim 642 at opening of outer vial 320 may be fused together and the upper surface of rim 641 and rim 642 forms a consistent tapered surface of rim 640, and the tapered surface may be clamped by ring-groove 432 of plug 214. Inner vial 310 and plug 214 form an encapsulated volume containing the sample so the sample may not be in contact with outer vial 320. The vacuum gap 660 between inner vial 310 and outer vial 320 may provide thermal insulation.

Plug 214 may be clamped against inner vial 310 and outer vial 320 by cap 213, and the clamping force is provided by the threads 650 between cap 213 and outer vial 320. As shown in FIG. 6 for rim 640, the edge of rim 641 is higher than the edge of rim 642, so rim 641 is likely to prevent possible leakage of sample inside inner vial 310 through the gap possibly formed between plug 214 and inner vial 310 due to the big temperature change, since rim 641 is higher than rim 642.

Rim 642 may also be clamped by ring-groove 432. Likely, the material of inner vial 310 may be more permeable to gas compared to the material of the outer vial 320. Therefore, the encapsulation formed by plug 214 and outer vial 320 may block the possible air leakage caused by the vacuum inside inner vial 310.

The encapsulation formed by plug 214 and inner vial 310 may prevent the liquid inside inner vial 310 from contacting outer vial 320. The encapsulation formed by plug 214 and outer vial 320 may prevent air from leaking into the vacuum region inside both inner vial 310 and gap 660 before the sample is sucked into inner vial 310. Both encapsulation may be ensured by the clamping of plug 214 onto rim 640, which is forced by threads 650. During the temperature change, threads 650 may hold and keep the clamping of plug 214 tight even though plug 214 may harden at a low temperature.

Plug 214 may be embedded inside cap 213, which is reinforced by the matching of rim 431 and groove 532, as shown in region 610 of FIG. 6. Also, the contact may be reinforced by the matching of protrusion 533 and ring-groove 433, as shown in region 620 of FIG. 6. Hole 531 and dent 434 may be aligned together with the identical diameter, which makes it easier for a needle-like structure to puncture through the region 630.

Figure 7:
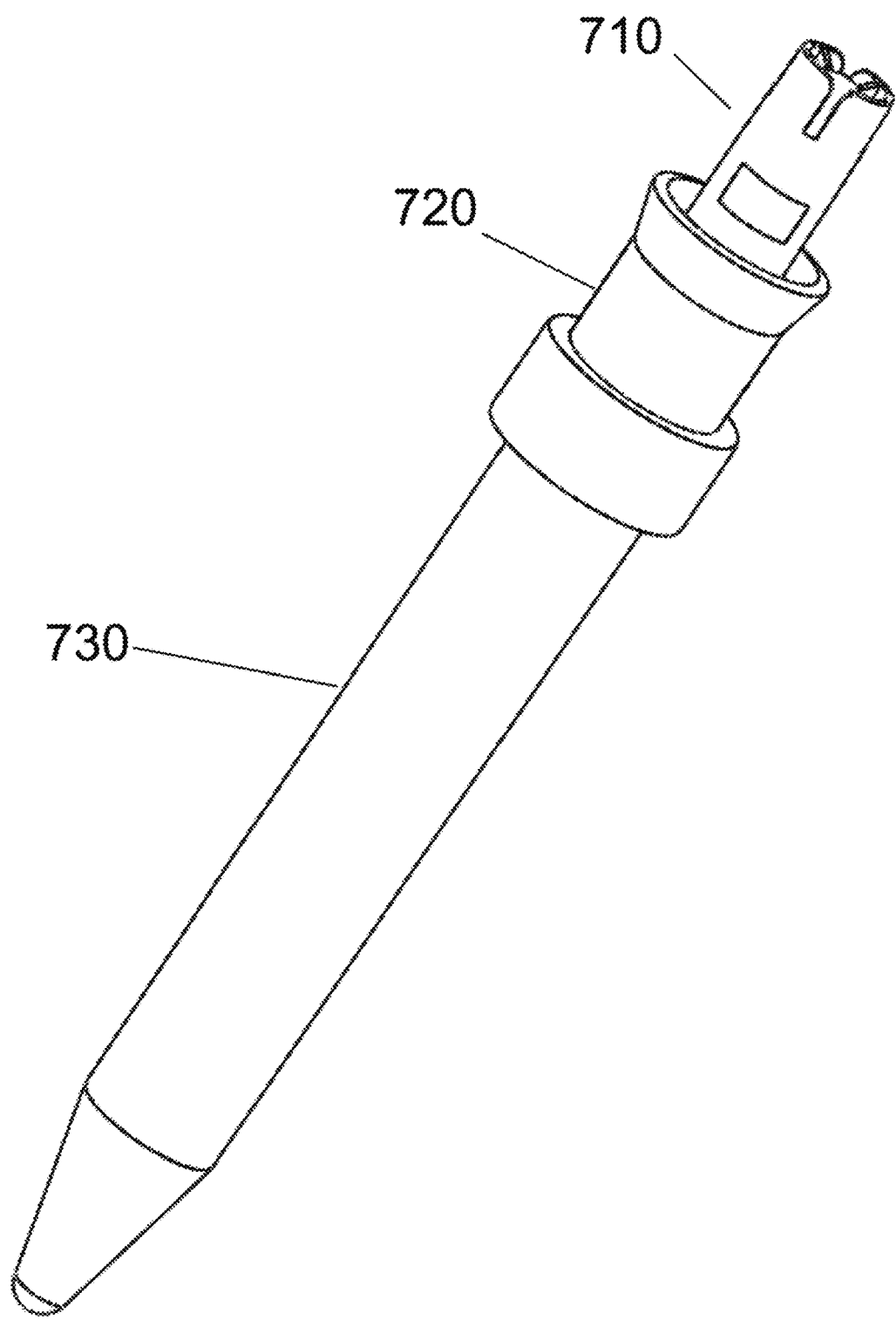
FIG. 7 is an illustrative overview of the sample transferring setup.

FIG. 7 is an illustrative overview 700 of a sample transferring setup, including a test tube 730, a conduit 720, and a vial 110 shown as vial 710. During operation, conduit 720 may be threaded onto test tube 730. The assembly may be turned upside-down so that conduit 720 is at the bottom. The operator may then puncture the vial 110 through its central hole 531 on the top using the needle-like structure in the conduit, and the vacuum inside vial 110 consequently suck the sample from test tube 730.

Figure 8:
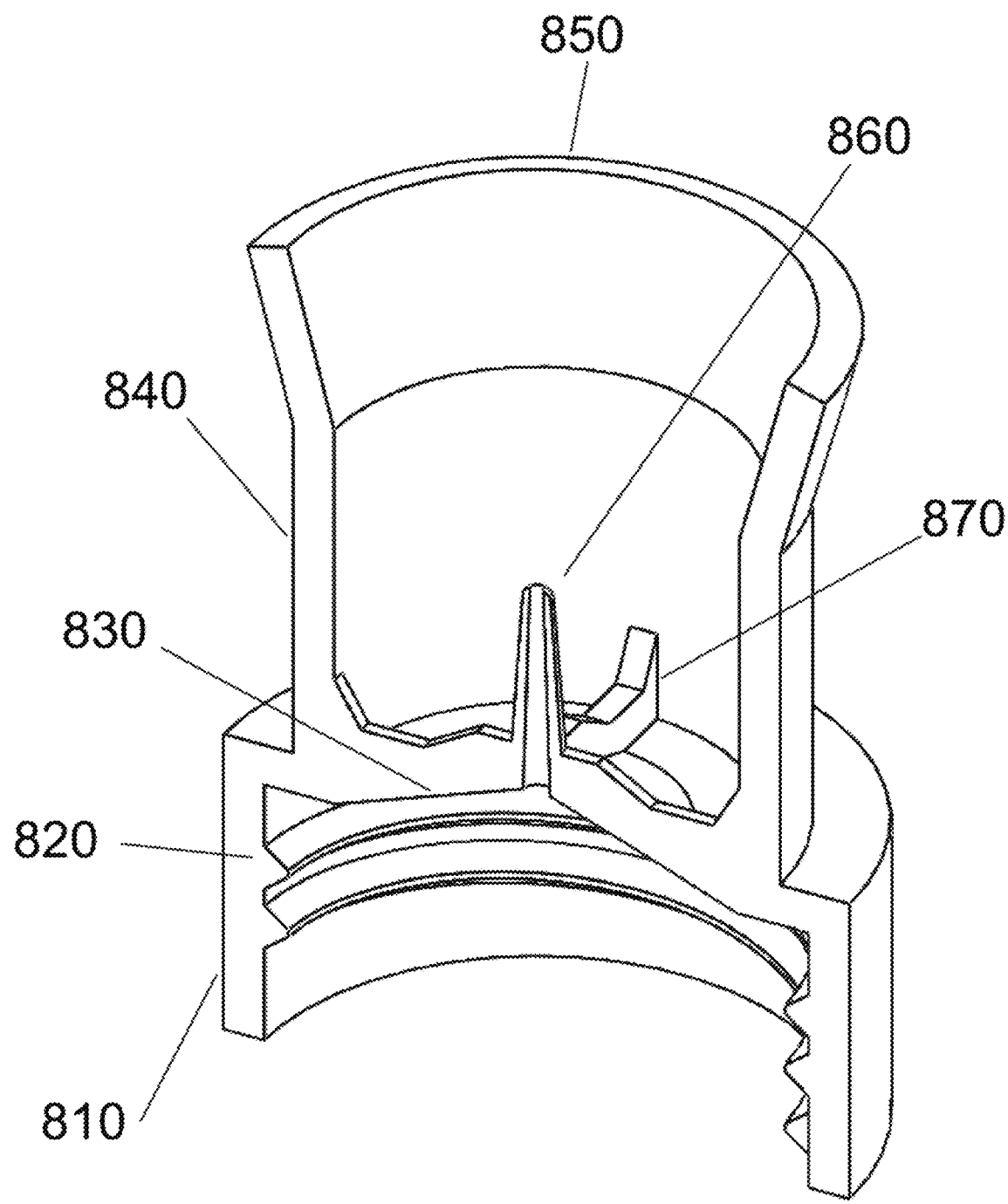
FIG. 8 is a cross-sectional illustration of a design of the conduit shown in FIG. 7.

FIG. 8 is a cross-sectional illustration 800 of a design of conduit 720 shown in FIG. 7. Conduit 720 may be fabricated using a single material that is ductile and chemically inert, and polycarbonate (PC) may be a choice.

A cylindrical sidewall 810 may be attached to the opening end of test tube 730 during operation. Threads 820 may be used to secure the connection between conduit 720 and test tube 730.

A hollow needle 860 may be implemented to the upper surface of conduit 720, which may be reinforced by supporting beams 870. Needle 860 may have a smooth steep conical outer surface, which makes it easy to puncture through dent 434 on plug 214. The lower surface of conduit 720 which is in contact with the sample may be conical, forming a funnel like structure 830. Beam 870 may also provide a stop for cap 213 to sit on while vial 110 is being pressed against conduit 720.

A cylindrical shell 840 may be used to guide vial 110 while vial 110 is being pressed against needle 860. A guide 850 attaching to shell 840 with a wider opening may be used to guide vial 110 so vial 110 is able to smoothly slide into shell 840 while vial 110 is being pressed against needle 860. Also, needle 860 may be hindered by shell 840 and guide 850 so that it is unlikely for the operator to touch needle 860 by accident.

Figure 9:
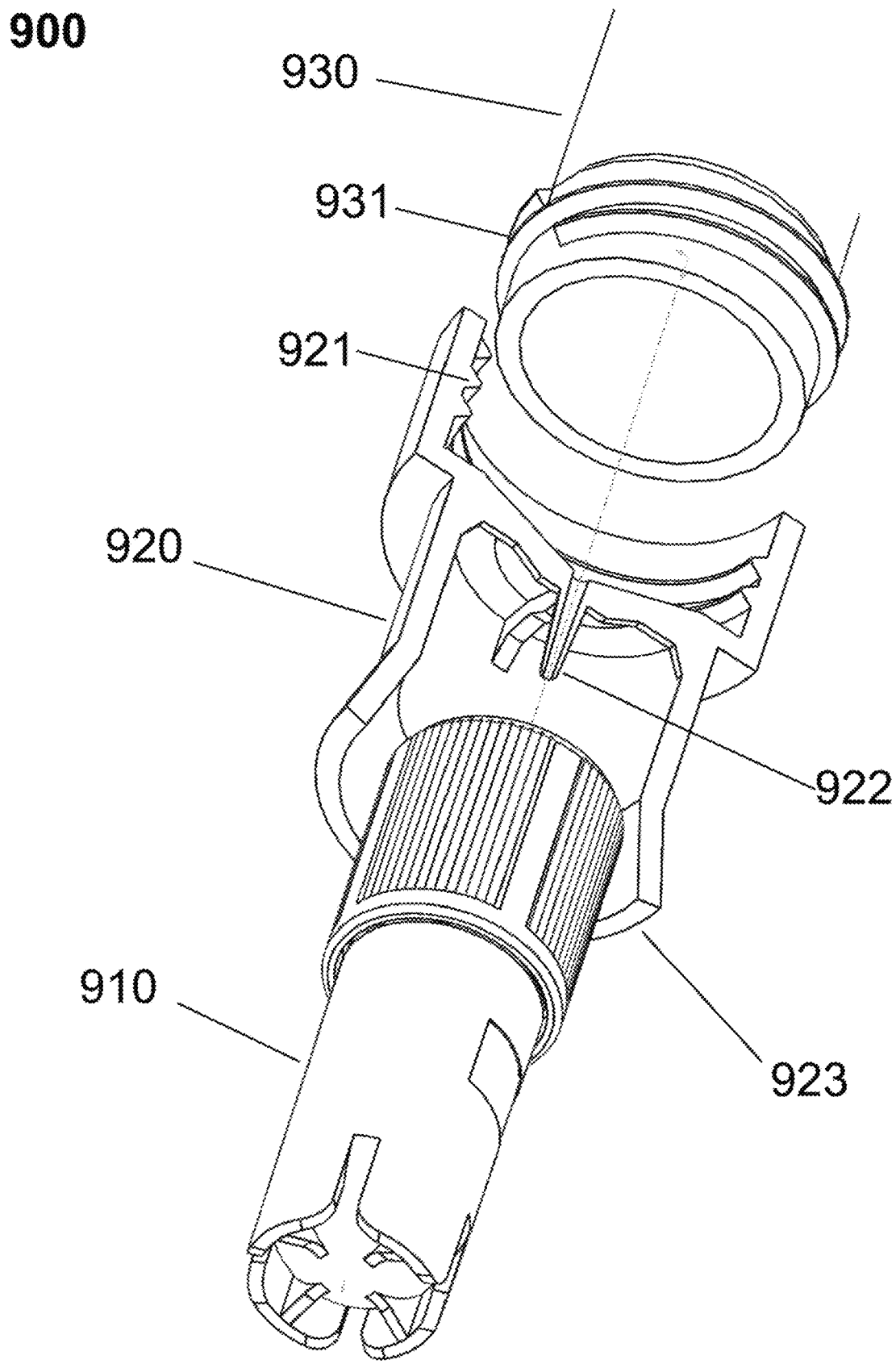
FIG. 9 illustrates the assembly process of the sample transferring setup shown in FIG. 7.

FIG. 9 illustrates the assembly process 900 of vial 110 (910), conduit 720 (920), and test tube 730 (930). Conduit 920 may be screwed onto test tube 930 by using the first part 921 and the second part 931, and vial 910 may be pressed onto conduit 920 guided by shell 923. The dashed-line 922 may indicate the concentric alignment of all three components.

Figure 10:
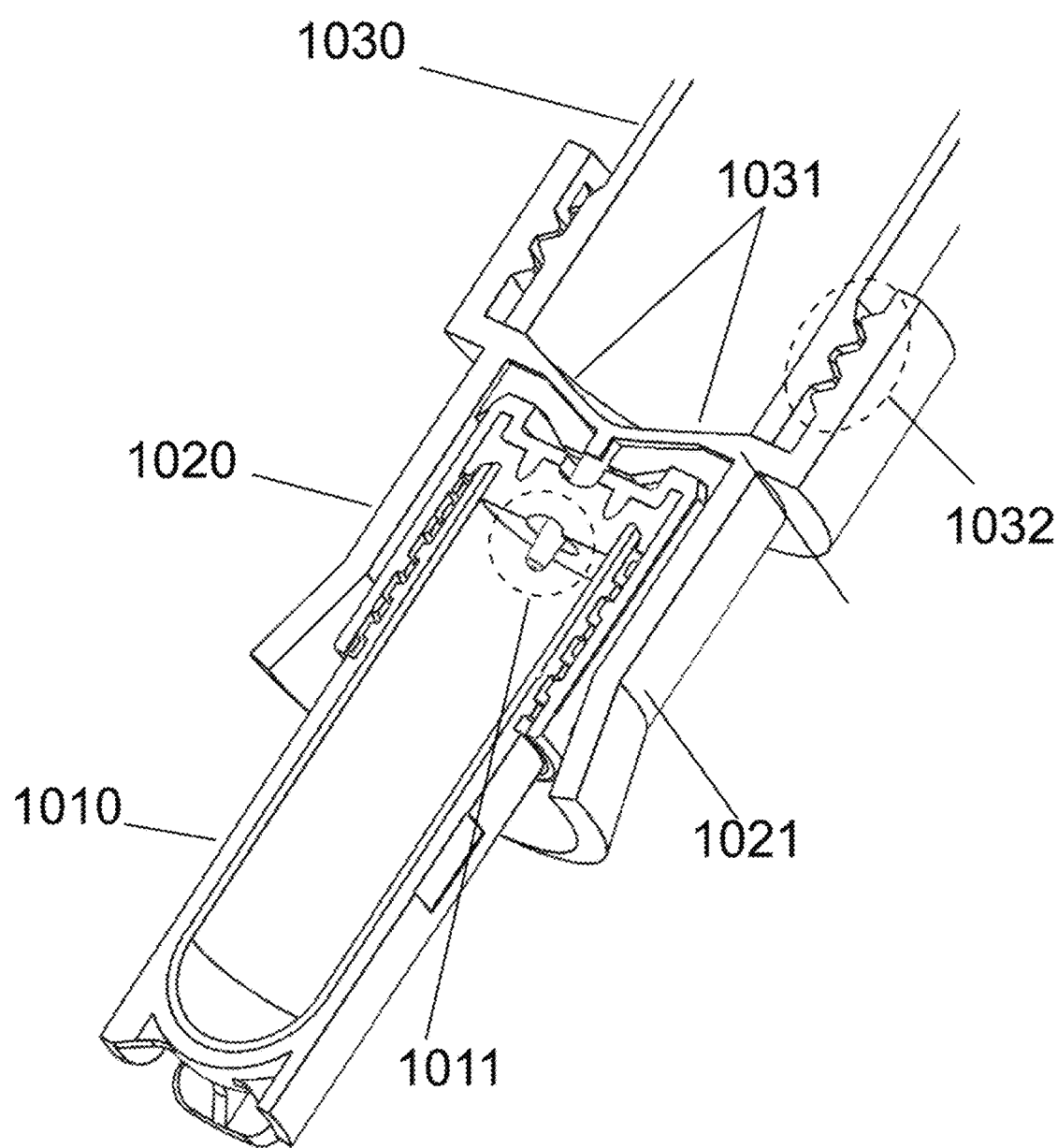
FIG. 10 is a cross-sectional illustration of the assembled sample transferring setup described in FIG. 7.

FIG. 10 is a cross-sectional illustration 1000 of an assembled sampling setup described in FIG. 7 comprising vial 110 (1010), conduit 720 (1020), and test tube 730 (1030). The vial 1010 side of the complex may be pointing downward so that the lowest point of the liquid inside tube 1030 is at the tip of the funnel structure 1031 of conduit 1020. Conduit 1020 is secured tightly onto test tube 1030 using threads 1032. Vial 1010 may be supported by the cylindrical shell 1021 of conduit 1020. Plug 214 of vial 1010 may be punctured by needle 860, as shown by region 1011.

Figure 11:
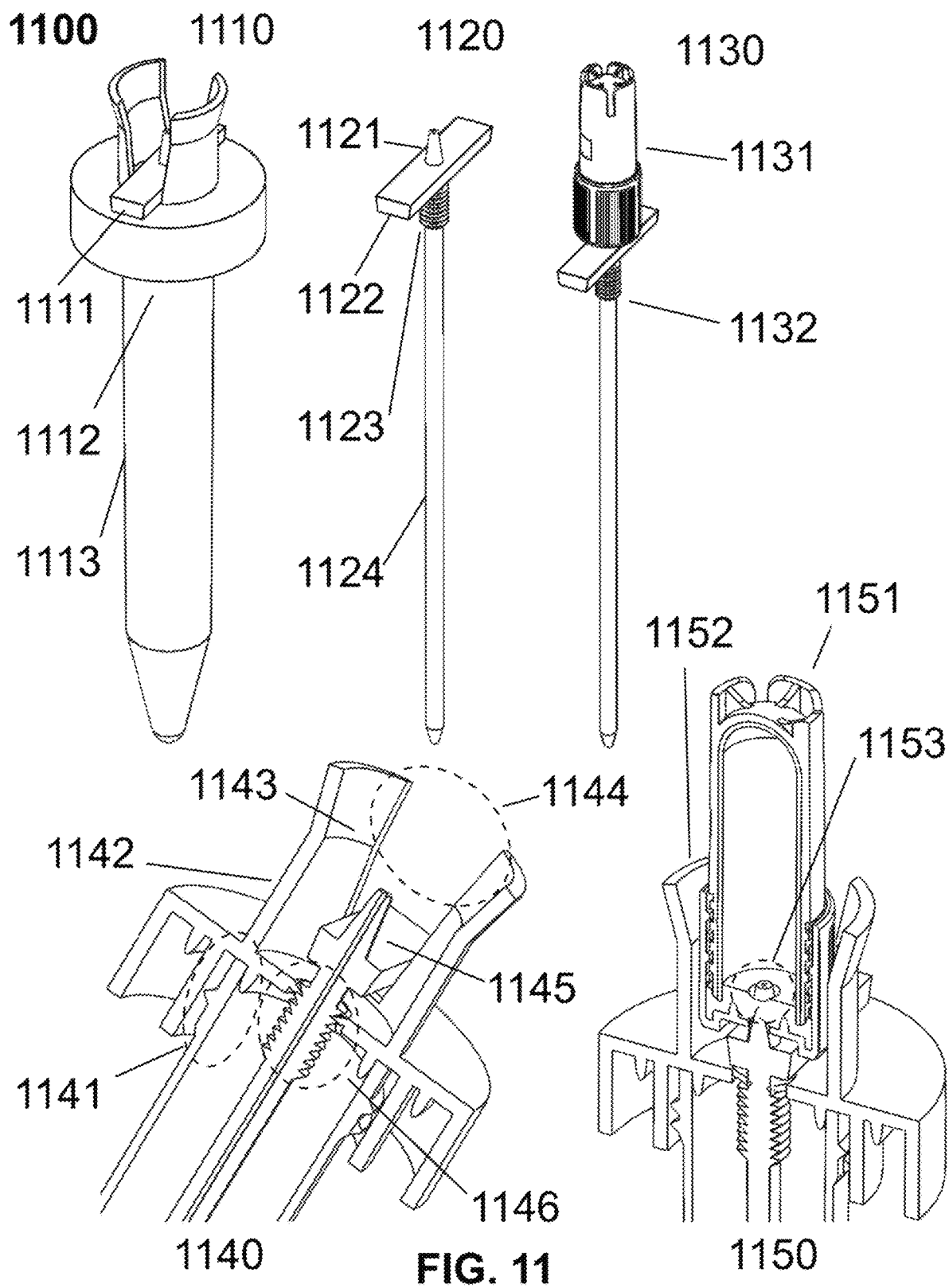
FIG. 11 is the illustration of alternative design of the sample transferring setup as oppose to the one in FIG. 7.

FIG. 11 illustrates an alternative design 1100 for conduit 720 that may include two parts: a sampling needle 1111, and a sampling conduit 1112. The configuration of assembled needle 1111, conduit 1112, and a test tube 730 (1113), is shown in the needle design 1110 of FIG. 11. During operation, test tube 1113 may be upward with the tip pointing downward. Needle 1111 may be pressed into the central hole of conduit 1112, as shown in design 1140 of FIG. 11. Vial 110 may be then pressed onto the conical tip of needle 1111 (as shown in design 1130), and the sample may be transferred into vial 110 driven by the preloaded vacuum inside vial 110.

As shown in design 1120, needle 1111 may include a conical tip 1121, a handle 1122, a collar with sawtooth surface 1123, and a long tube with conical tip 1124. Tip 1121 may puncture plug 214 during operation, as shown in region 1153 of FIG. 11. Handle 1122 may be used to force tube 1124 and collar 1123 through the hole on conduit 1112, and collar 1123 may secure needle 1111 onto conduit 1112, as shown in region 1146 of FIG. 11. Also, handle 1122 may be guided by slot 1144 while needle 1111 is pressed through conduit 1112, as shown in design 1140 of FIG. 11. Conduit 1112 may clamp onto test tube 1113 using press-fit, and the hemi-elliptical protrusion may hold against the inner wall of test tube 1113, as shown in region 1141 of FIG. 11. Vial 110 may be guided by shell 1143 and supported by shell 1142 while vial 110 is being pressed against conduit 1112 during the sample transferring process, as shown in design 1150 of FIG. 11.

Conduit 1112 may have multiple variations of clamp 1141 so that conduit 1112 is able to be secured onto different types of teste tube 730.

Figure 12:
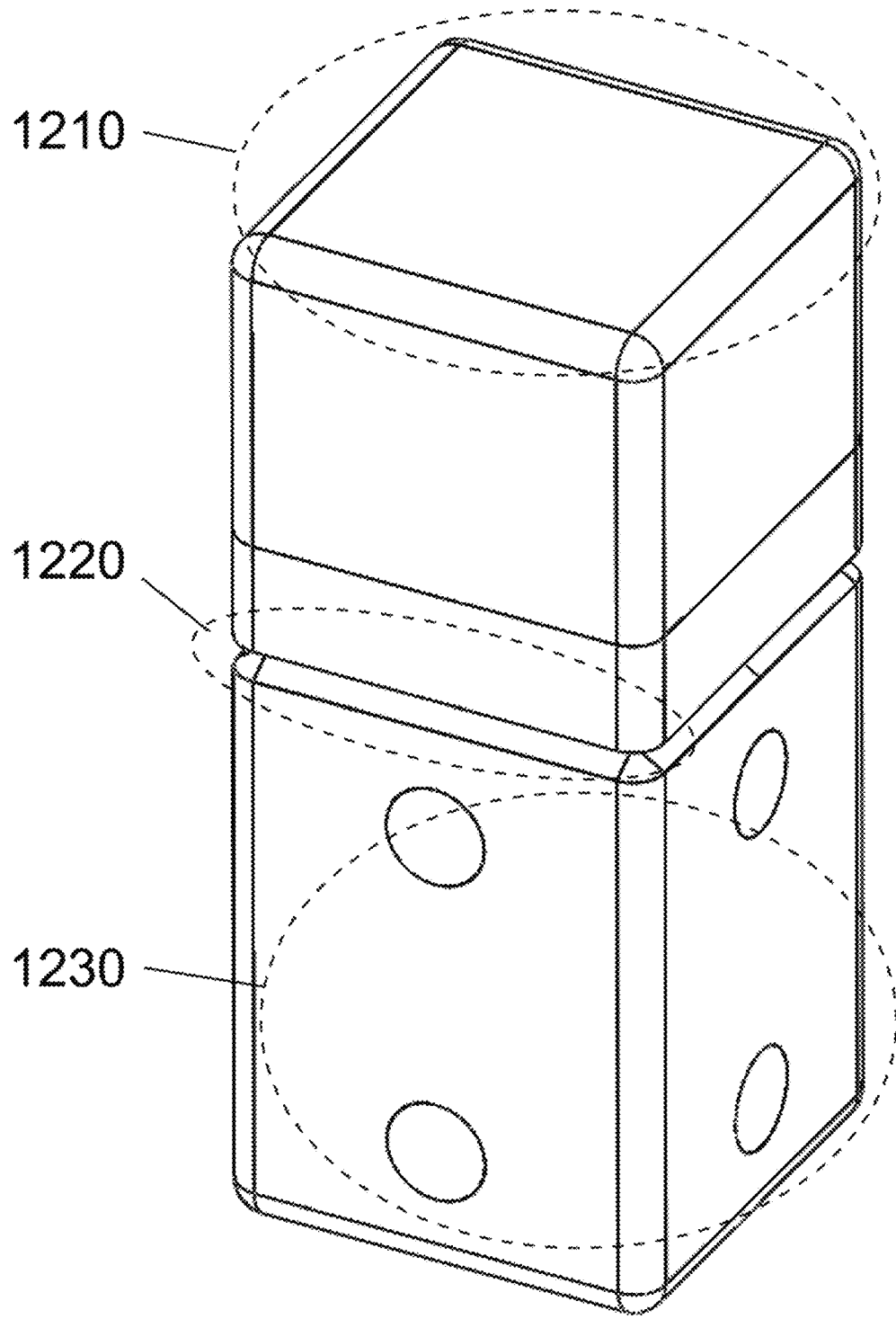
FIG. 12 is an illustrative overview of the container/box described in the disclosure that may be used to control the changing rate of temperature during the storage process of samples.

FIG. 12 is an illustrative overview of the container/box 1200 that may be used to control the changing rate of temperature during the storage process of samples. Container/box 1200 may also be used as an ice bucket during the process where the sample is transferred out of the low temperature storage because the thermal insulation provided by container/box 1200 may prevent the temperature inside from rising fast. Container/box 1200 may include a labeling zone 1210, a cleavage zone 1220, and an assembly zone 1230. Labeling zone 1210 may be used to engrave a company logo or to place labels for the sample. However, labeling zone 1210 may be located anywhere else in the container/box 1200.

Barcode or two-dimensional barcode such as Quick Response Code (QR code) may be placed on container/box 1200. A Radio-Frequency Identification (RFID) chip may be embedded into the structure of container/box 1200, possibly under the surface of zone 1210. Cleavage zone 1210 may be used to break container/box 1200 after container/box 1200 is sealed. Assembly zone 1230 may be the main designated location for magnets installation. Container/box 1200 may be manufactured with different color to help labeling and distinguishing different instances of container/box 1200 in the site of storage. Each container/box 1200 may store a single vial 110 or multiple instances of vial 110.

Container/box 1200 may be brick-shaped, and magnets can be installed to each side, as shown in FIG. 12. A container/box 1200 may also be referred as a thermal box.

Figure 13:
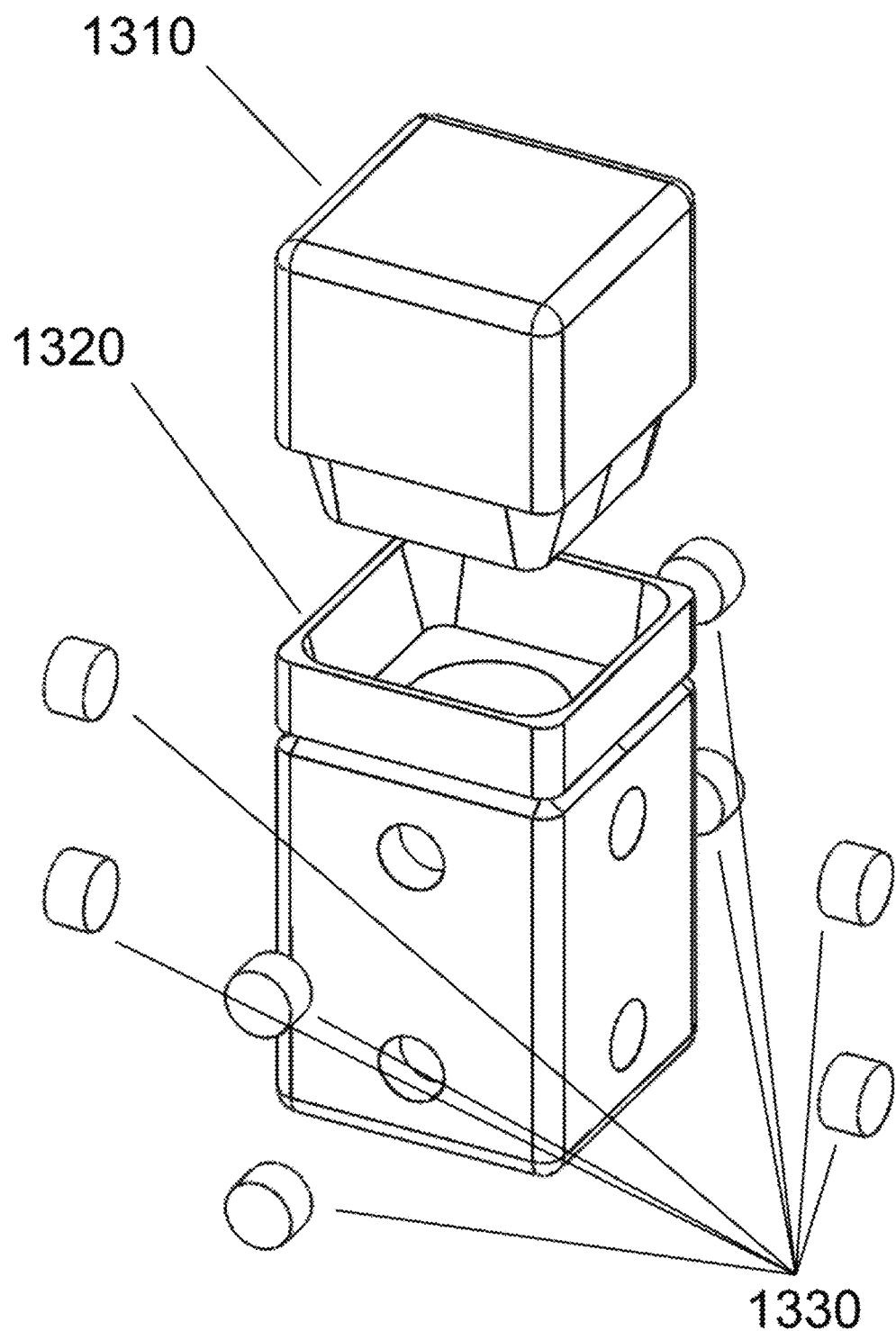
FIG. 13 illustrates the essential parts of the container/box shown in FIG. 12.

FIG. 13 illustrates the essential parts 1300 of container/box 1200 shown in FIG. 12. The essential parts 1300 may include: a base 1320, a lid 1310, and magnets 1330. Lid 1310 and base 1320 may be fabricated from heat-insulating material, possibly close-cell polyurethane foam. Both lid 1310 and base 1320 possibly have a smooth finishing. Magnets 1330 are possibly cylindrical magnets, embedded into the four sides of container/box 1200.

Figure 14:
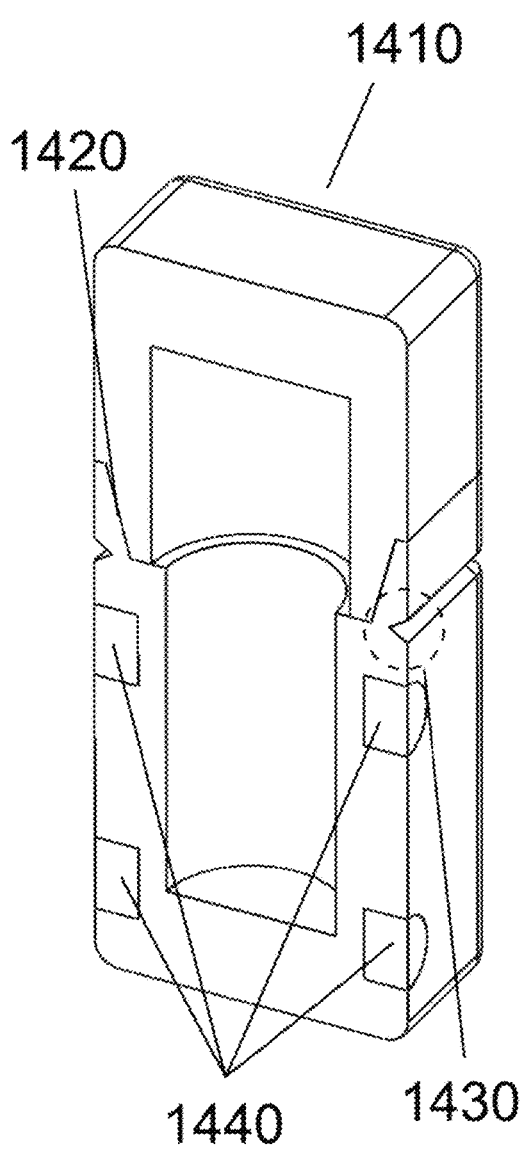
FIG. 14 is a cross-sectional illustration of the container/box shown in FIG. 12 in "closed" state.

FIG. 14 is a cross-sectional illustration 1400 of the container/box 1200 in "closed" state. Lid 1310 (also 1410 in FIG. 14) and base 1320 may be tightly assembled together through a tapered interface, as shown in FIG. 14. Interface 1420 may become a permeant fixture between lid 1310 and base 1320 after container/box 1200 is closed during operation so container/box 1200 may not be opened again from interface 1420. Cleavage zone 1210 can be achieved by a horizontal v-shaped groove 1430 around the side of base 1320. Groove 1430 may have a sharp bottom in order to enhance the stress concentration while lid 1310 and base 1320 are turned to opposite directions, so that cleavage zone 1210 is able to be torn apart to open container/box 1200.

The wall thickness of container/box 1200 may be varied in order to alter the behavior of temperature change inside vial 110. Extra shells may be installed to change the sidewall thickness of container/box 1200.

Magnets 1330 may be embedded as shown in magnets 1440 of FIG. 14. Magnets 1330 may be substituted by flat magnets attaching to the side of either lid 1310 or base 1320, as long as the outer side of the assembly is flat and smooth.

Figure 15:
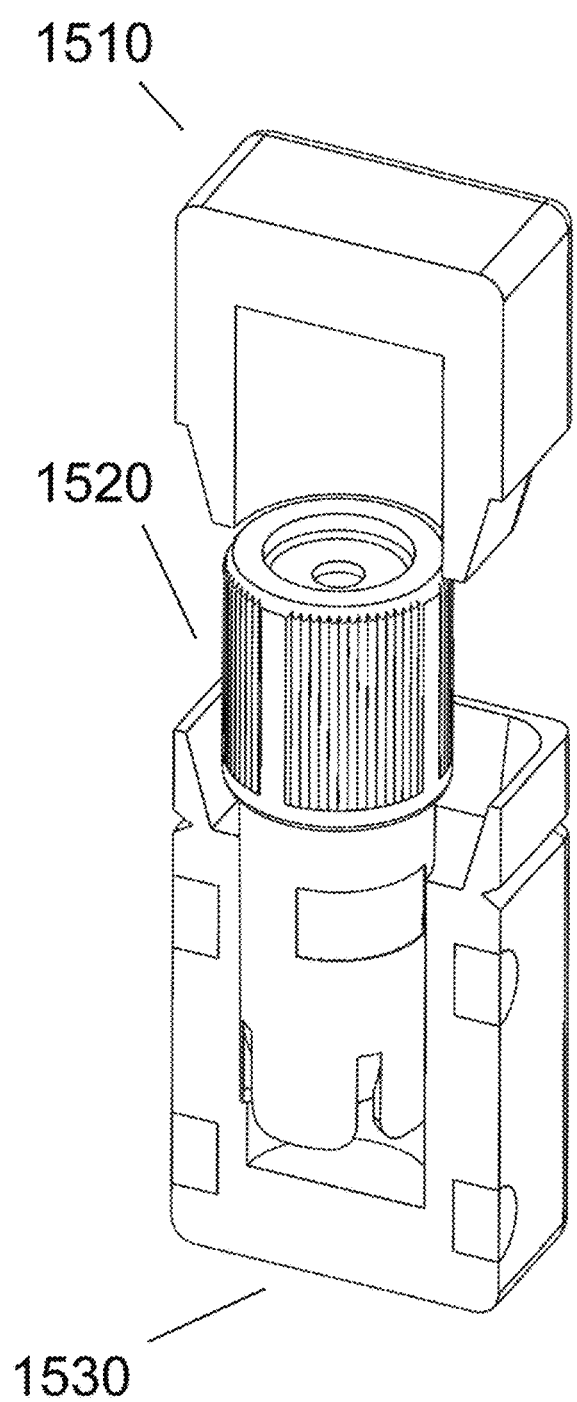
FIG. 15 is a cross-sectional illustration of the container/box shown in FIG. 12 in "open" state with a vial showed in FIG. 1.

FIG. 15 is a cross-sectional illustration 1500 of container/box 1200 in "open" state with a vial 110 (also labeled as 1520 in FIG. 15) stored inside. Vial 1520 may be placed inside base 1320 (also labelled 1530 in FIG. 15) with a tight fitting between each other, and lid 1310 may be then closed from the top 1510 with interface 1420 (also labelled 1520 in FIG. 15) permanently sealed.

Figure 16:
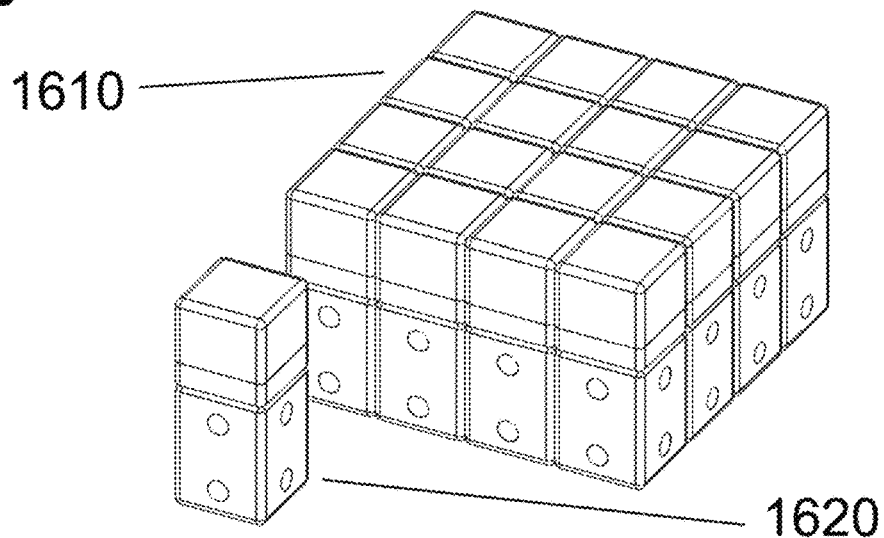
FIG. 16 illustrates a 2D self-assembly of multiple instances of the container/box shown in FIG. 12.

FIG. 16 illustrates a 2D self-assembly 1600 of multiple instances of container/box 1200. The existing assembly of sixteen (16) instances of container/box 1200 are held together by magnetic attraction 1610, and the 17$^{th}$ container/box 1620 may be added to assembly 1610. Container/box 1620 can be attached to any instance of container/box 1200 in assembly 1610.

Figure 17:
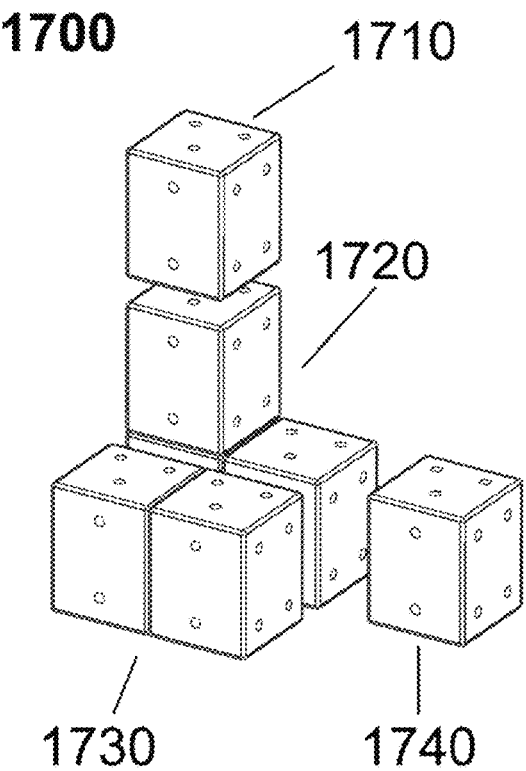
FIG. 17 illustrates a 3D self-assembly of 7 instances of a container/box similar to the container/box shown in FIG. 12.

FIG. 17 illustrates a 3D self-assembly 1700 of seven (7) instances of modified container/box 1200. Modified container/box 1710 may have arbitrary number of cylindrical magnets on each pair of opposing sides, including top and bottom, as shown in the container/box 1710 of FIG. 17. Individual container/box 1710 and individual container/box 1740 may be attached to an existing assembly 1720 from any directions. Also, a smaller assembly of two individual container/box can be assembled to an existing assembly 1730.

Figure 18:
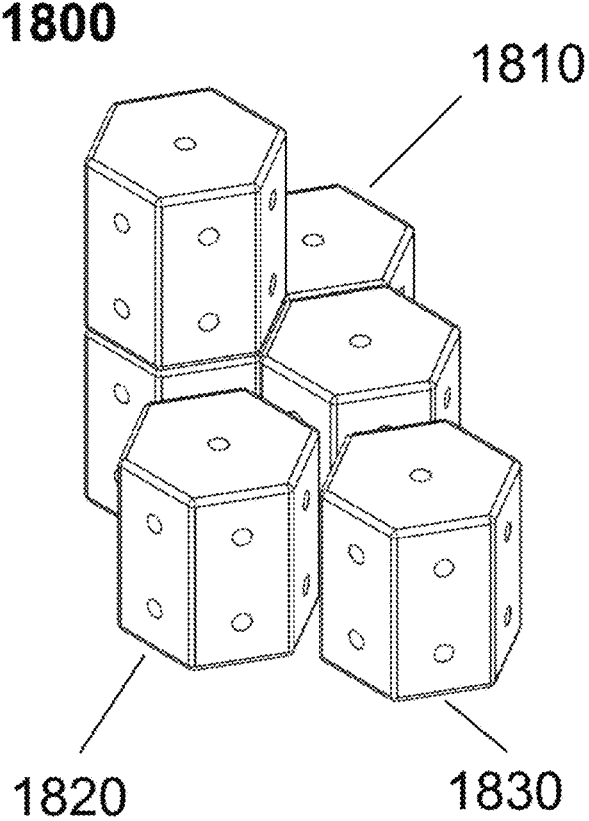
FIG. 18 illustrates a 3D self-assembly of multiple instances of a variation of the container/box shown in FIG. 12.

FIG. 18 illustrates a 3D self-assembly 1800 of multiple instances of modified container/box 1700 extended from the assembly 1700. The top view of the individual container/box indicated in 1820 is hexagon rather than square or rectangle. A hexagon cross-section makes individual container/box able to be tiled as a cubic container/box 1810. Similarly, multiple instances of individual container/box 1820 can self-assembled on multiple directions 1830. In addition, other shapes including triangle are also suitable for a modified container/box 1200 that is able to self-assemble with other instances of itself.

FIG. 19 briefly describes an example operating procedures 1900 to work with vial 110, conduit 720, container/box 1200, and test tube 730.

In step 1910, biological samples may be harvested or collected from its original environment and transferred to test tube 730. All relevant pre-storage processes may be performed depending on the nature of sample. Cryoprotectant may be added into the sample at this step. The vial 110 may also be preloaded with cryoprotectant.

In step 1920, conduit 720 may be screwed tightly onto test tube 730. If needle 1111 and conduit 1112 are used instead of conduit 720, conduit 1112 may be clamped to test tube 730 first. Needle 1111 may then be pressed through the hole on conduit 1112 with the tube 1124 side sticking into test tube 730 till the tip of tube 1124 reach the bottom of test tube 730. Needle 1111 may be secured onto conduit 1112 by collar 1123, and conduit 1112 may be secured onto test tube 730 by clamp 1141.

In step 1940, vial 110 may be held and may be pressed into guide 840 so that vial 110 may eventually hit needle 860 with plug 214 punctured by needle 860. The sample inside test tube 730 may be transferred into vial 110 by the preloaded vacuum inside vial 110 through the funnel-like structure (830) inside conduit 720. Step 1930 may include flipping and holding the assembly of test tube 730 and conduit 720. The step of flipping and holding may be skipped if needle 1111 and conduit 1112 are used instead of conduit 720.

In step 1940, if needle 1111 and conduit 1112 are used instead of conduit 720, vial 110 may be held and pressed into guide 1143 so that vial 110 may eventually hit tip 1121 of needle 1111 with plug 214 punctured by tip 1121. The sample inside test tube 730 may be transferred into vial 110 by the preloaded vacuum inside vial 110 through needle 1111.

In step 1950, vial 110 may be removed from conduit 720 or needle 1111. Vial 110 may be placed into container/box 1200, and vial 110 may be labeled using methods including but not limited to marking with lab sharpie, scanning barcode, scanning QR code, or scanning RFID. The step of placing vial 110 into the container/box 1200 may also be positing a tube inside the container/box.

In step 1950, the step may also include closing lid 1310 of container/box and sealing interface 1420 using any methods disclosed herein. Then container/box 1200 may be labeled using methods including but not limited to marking with lab sharpie, scanning barcode, scanning QR code, or scanning RFID.

In step 1960, container/box 1200 may be put and placed into designated freezer. Multiple instances of container/box 1200 may be assembled depending on the grouping of samples. Container/box 1200 or the assembly of multiple instances of container/box 1200 may be eventually moved to a container/box filled with liquid nitrogen for long-term storage, ranging from multiple months to over 20 years.

Vial 110, conduit 720, and container/box 1200 may be packed into a package together with other supplement materials to make a kit for biological sample preservation. The kit may provide an efficient operation using the protocol (the operating procedures) described in FIG. 19.

The present disclosure provides method of preserving a biological material. The method may include placing the biological material to a container, connecting biological material to a conduit, where the conduit may include a first end and a second end, and where the first end may transfer the biological material out of the container, and the second end may transfer the biological material to a tube, and where the tube may be contained and may have a vacuum inside before the biological material is transferred into the tube.

The method may also include transferring the biological material to the tube when the conduit pinches one end of the tube, positing the tube inside a thermal box comprising a storage space inside the thermal box and an opening end, where the tube can be placed in the storage space when the opening end is opened, and the thermal box may be substantially sealed when the opening end is closed, and placing the thermal box having the tube inside into an environment with a low temperature to preserve the biological material inside the tube at the low temperature.

In the method, transferring the biological material may further include reversing the conduit along with the container having the biological material before the conduit pinches the one end of the tube.

In the method, the environment may include a first environment and a second environment, and the low temperature comprises at least a first low temperature and a second low temperature, and where the thermal box may be placed into the first environment with the first low temperature and then may be placed into the second environment with the second temperature, and the biological material may be preserved at the first low temperature in the first environment and may be preserved at the second low temperature in the second environment, where the second low temperature may be lower than the first low temperature.

The present disclosure also provides a thermal box. The thermal box may include more than one side walls that may be made of a low temperature tolerant material, where the more than one side walls may form at least one inside space to hold at least one tube inside the thermal box, and the at least one tube may be preserved at a low temperature when the thermal box is placed in an environment with the low temperature, an opening end, where the at least one tube can be placed inside the thermal box when the opening end is opened, and the thermal box may be substantially sealed when the opening end is closed; and a magnetic component that may be attached to the more than one side walls, where the magnetic component may provide a force to substantially attach two or more thermal boxes closely when the two or more thermal boxes are positioned to be closed to each other.

For the thermal box, the magnetic component may substantially attach the two or more thermal boxes closely such that the two or more thermal boxes can be placed together into the environment with the low temperature.

The present disclosure further provides a conduit. The conduit may include an outside wall that is made of a hard material, where the outside wall may form an inside space to allow fluid to pass through the inside space, at least two opening ends, where the at least two opening ends may be positioned to substantially oppose to each other to allow the fluid to flow from one opening end, pass through the inside space, and reach another opening end; and a stabilizer that is attached to the outside wall, where the stabilizer may stabilize the outside wall to a container containing the fluid.

For the conduit, the stabilizer may include a clip and the conduit may be placed substantially in a middle of the clip, where the conduit may be substantially stably attached to the container when the clip is attached to an opening end of the container.

For the conduit, the stabilizer and the outside wall may be waterproofly attached, and the stabilizer may further include a fastening structure to waterproofly attach the clip with the opening end of the container when they are attached together.

For the conduit, the outside wall and the stabilizer may include an adjustable matching structure, where the stabilizer may be attached to the outside wall through the adjustable matching structure such that the outside wall may be adjustable substantially upward and downward relative to the stabilizer when the stabilizer and the outside wall are attached together via the adjustable matching structure.

Additionally, the present disclosure provides a tube. The tube may include an outside wall that may be made of a first material which is hard and is able to tolerant a low temperature; and a pierceable end that may be made of a second material, where the pierceable end and the outside wall may form an inside space to store fluid to be kept in the low temperature, and the tube may be filled with the fluid when the pierceable end is pierced by a needle with an inside conduit and the fluid flows into the tube through the inside conduit.

For the tube, the inside space of the tube may be a substantial vacuum space before the tube is filled with the fluid, and the tube may be filled with the fluid automatically through the inside conduit after the pierceable end is pierced with the needle when the inside conduit is connected with the fluid stored in a container outside the tube.

For the tube, the outside wall may include an insider layer and an outside layer, where the inside layer may form the inside space to store the fluid and the outside layer may interface with the lower temperature. A gap may exist between the inside layer and the outside layer. The gap may be filled with liquid or may be a vacuum.

For the tube, a gap may exist between the insider layer and the outside layer, and the gap may be substantial vacuum or may be filled with a pre-determined material. The pre-determined material may be a liquid or may be insulate materials.

For the tube, the outside wall may include a label, and the label may be placed outside the outside wall and may contain information to identify the tube.

Figure 20:
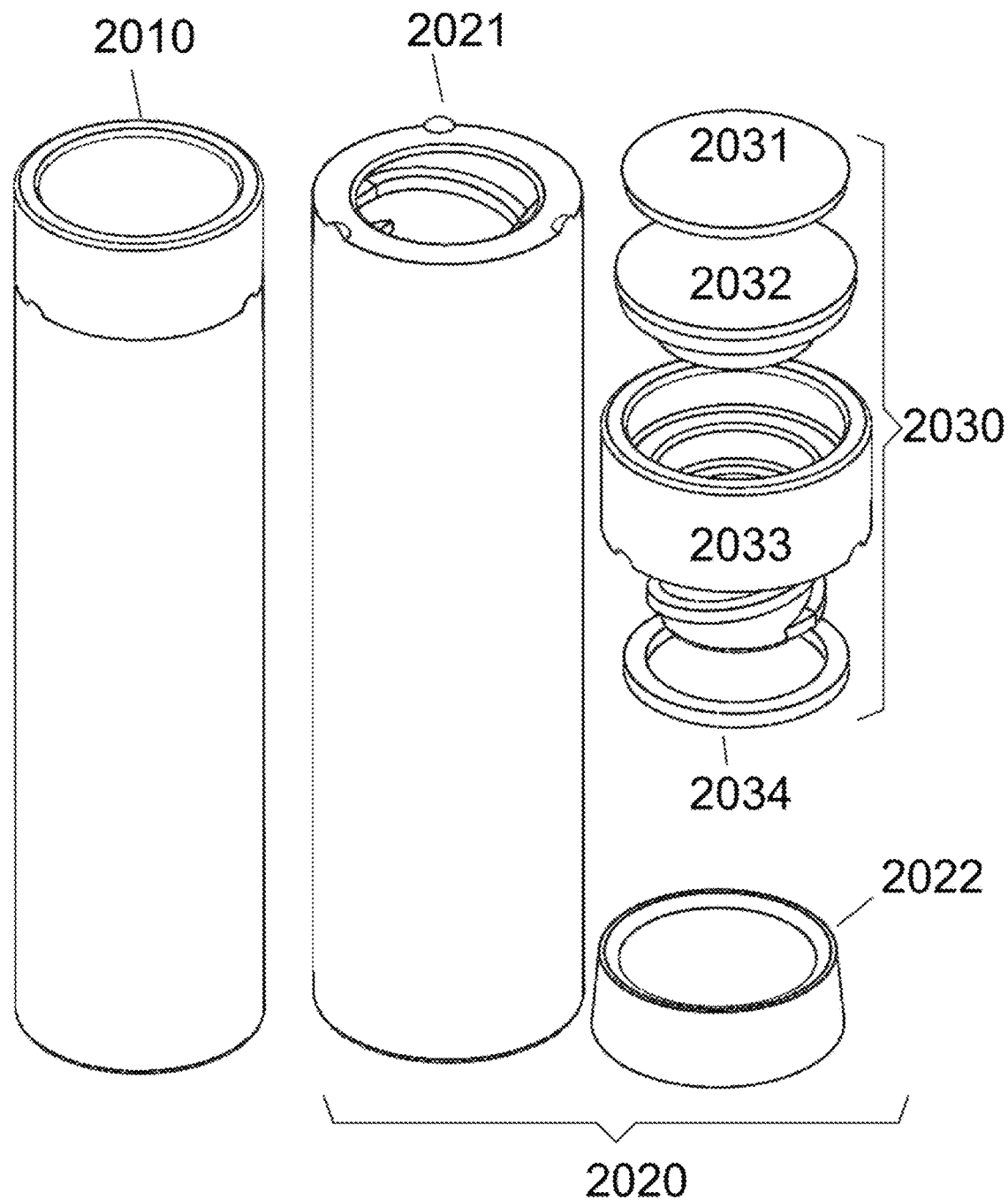
FIG. 20 illustrates one example of the container/chamber/vial as well as components of the container/chamber/vial that may be used in this disclosure.

FIG. 20 illustrates one example of the container/chamber/vial 2000 that may be used in container/chamber/vial 2010 and components of container/chamber/vial 2020 and cap 2030. Container/chamber/vial 2020 and cap 2030 can be assembled into a single container/chamber/vial and the inner hollow of cup 2021 may be used to store sample. Cap 2030 can be screwed into the upper opening of container/chamber/vial 2020 to form a confined space that is thermally insulated from the surrounding environment.

Container/chamber/vial 2020 may include a cylindrical M-shaped-cross-sectioned cup 2021 and a base plug 2022. The inward concave opening from the top of cup 2021 can be covered by cap 2030, and the outer annular hollow facing down can be filled with substances of any kind (including but not limited to polymer foam, solid metal, liquid metal, gas of various pressure, and the like) to modulate the overall heat-transfer property. The bottom opening of cup 2021 may be covered or sealed by base plug 2022.

Cap 2030 may include an annular base cup 2033, a cap plug 2032, a cap 2031, and an optional O-ring 2034. The above four components of cap 2031 may be concentric and stacked into a single part.

Figure 21:
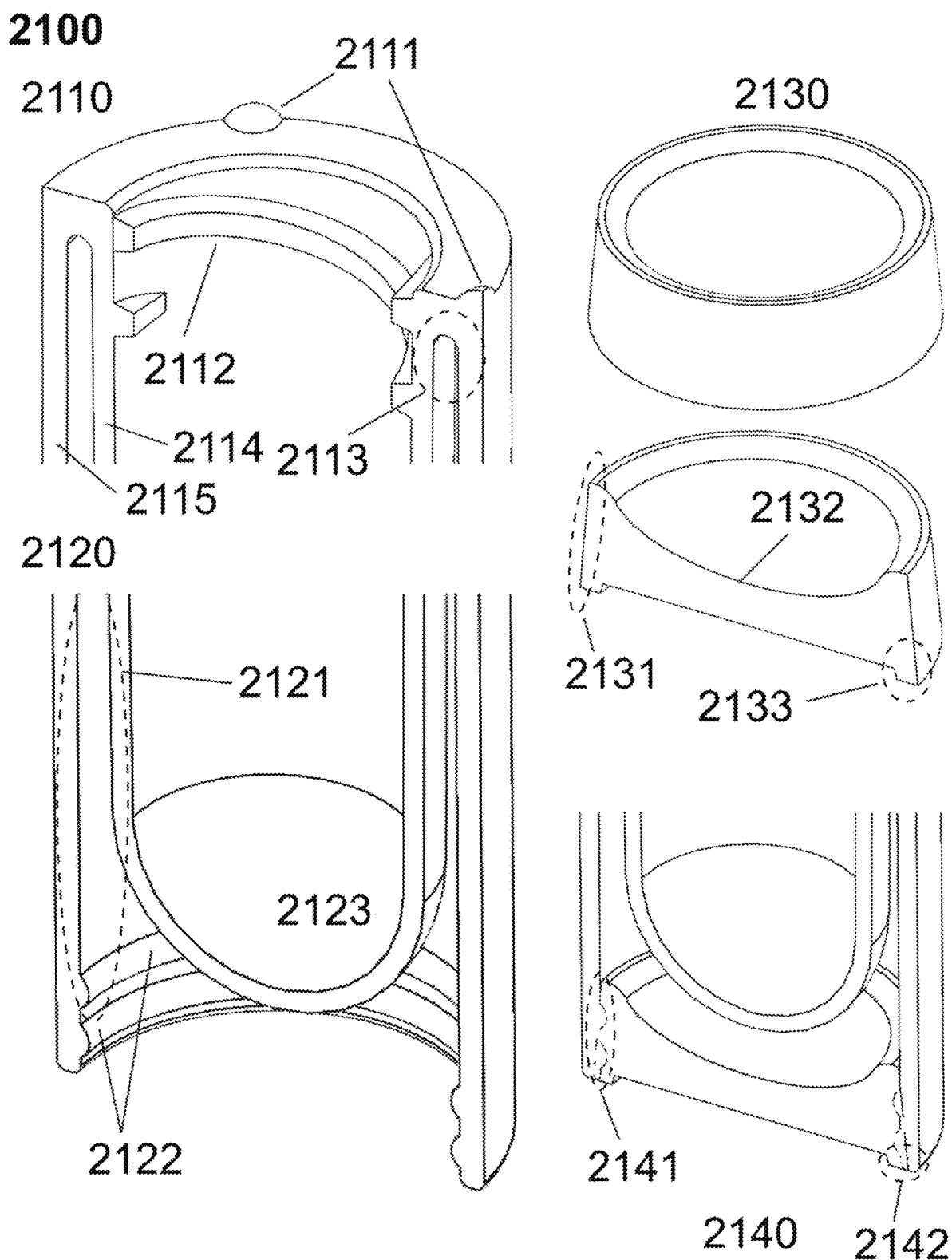
FIG. 21 is a detailed illustration of the container/chamber/vial body shown in FIG. 20, with multiple cross-sectional views.

FIG. 21 illustrates the details 2100 of container/chamber/vial 2020. Cross-section 2110 shows the structure of the upper portion of container/chamber/vial 2020, while cross-section 2120 shows the lower portion of container/chamber/vial 2020. In the illustrated, non-limiting configuration, bumps 2111 may protrude out of the top surface of cup 2021 to match with the dents on lower ring-surface of cap 2030 so that container/chamber/vial 2020 and cap 2030 are interlocked when their threads are fully fastened.

Internal thread 2112 may be used to fasten cap 2030 into place. The M-shaped cross-section of cup 2021 may have an inner shell 2114 and outer shell 2115 connected at the top as illustrated in region 2113. The connecting point in region 2113 may have different shapes (the currently used half-circle is one possible example). The gap 2121 between shell 2114 and shell 2115 may span most part of the height of cup 2021. Dome 2123 may be the bottom of inner shell 2114.

The surfaces of container/chamber/vial 2020, cup 2030, and other structures may have surface treatment including but not limited to annealing, coating, engraving, to modify the surface properties.

Base plug 2022 is illustrated in 2130, which may have a tapered cylindrical sidewall with a downward concave surface 2132 on the top to reinforce the structure. Taper/chamfer 2131 may be designed to improve the fitting between base plug 2022 and cup 2021, with the help of double-ring 2122, as shown in region 2141 of FIG. 21. The bottom surface of base plug 2022 has a ring-shaped extrusion 2133 to raise the bottom surface of base plug 2022 while base plug 2022 (also labeled as 2142) may be press-fit into cup 2021 (also labeled as 2140) in order to minimize the contact area between the bottom of container/chamber/vial 120 with the supporting structures underneath.

Gap 2121 and the confined space determined by cup 2021 and base plug 2122 may be filled with any of a variety of substances including but not limited to polymer foam, solid metal, liquid metal, gas of various pressure, and the like. The gap 2121 may be to modulate the overall heat-transfer property of container/chamber/vial 2020. Gap 2121 may also be sealed with methods other than base plug 2022.

Figure 22:
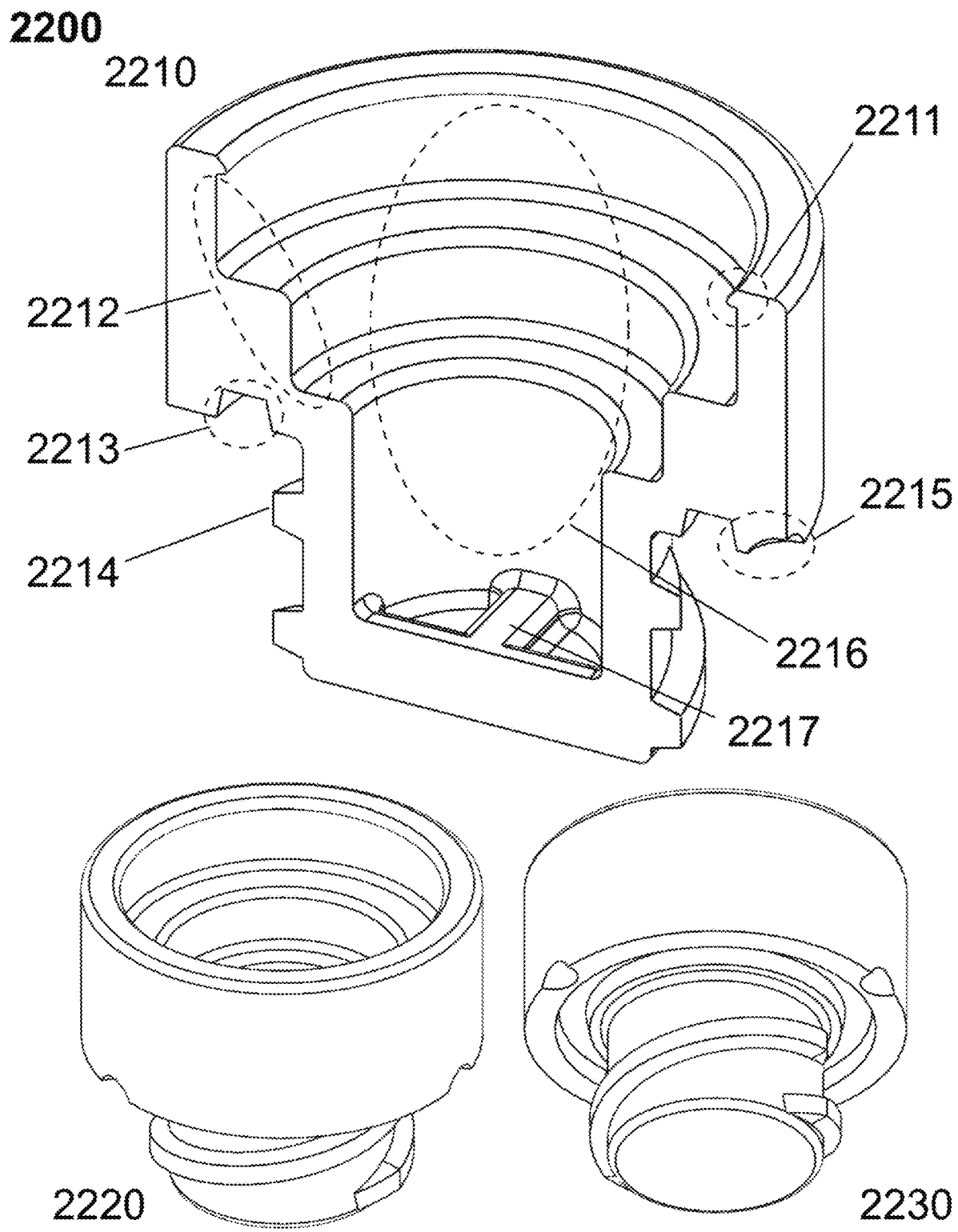
FIG. 22 is a detailed illustration of the cap body shown in FIG. 20, with a cross-sectional view.

FIG. 22 illustrates the details 2200 of base cup 2033. Cross-section 2210 shows a combination of features while design 2220 and design 2230 show perspective view from above and from below respectively. Ring-clip 2211 may provide the interlocking mechanism with cap 2031 as the tilted upper surface of ring-clip 2211 may allow cap 2031 to be press through. The horizontal lower surface of ring-clip 2211 may prevent cap 2031 from sliding out. Ring-steps 2212 may provide a relatively large contact area for cap plug 2032 to reside on. Ring-groove 2213 may be used as the housing for the optional O-ring 2034. Thread 2214 may be used to match the inner thread 2112 inside the cup 2021 to provide a solid attachment between container/chamber/vial 2020 and cap 2030. Dent 2215 may be used to match the bump 2111 to provide mechanical interlocking when cap 2030 is fastened into container/chamber/vial 2020.

Region 2216 may be the hollowed volume inside base cup 2033, which may be filled with substances of any kind (including but not limited to polymer foam, solid metal, liquid metal, gas of various pressure, and the like) to modulate the overall heat-transfer property of cap 2030. Region 2216 may also contain active devices. Region 2216 may be sealed with cap plug 2032. Support 2217 may be used to reinforce the structure of the bottom part of base cup 2033.

Figure 23:
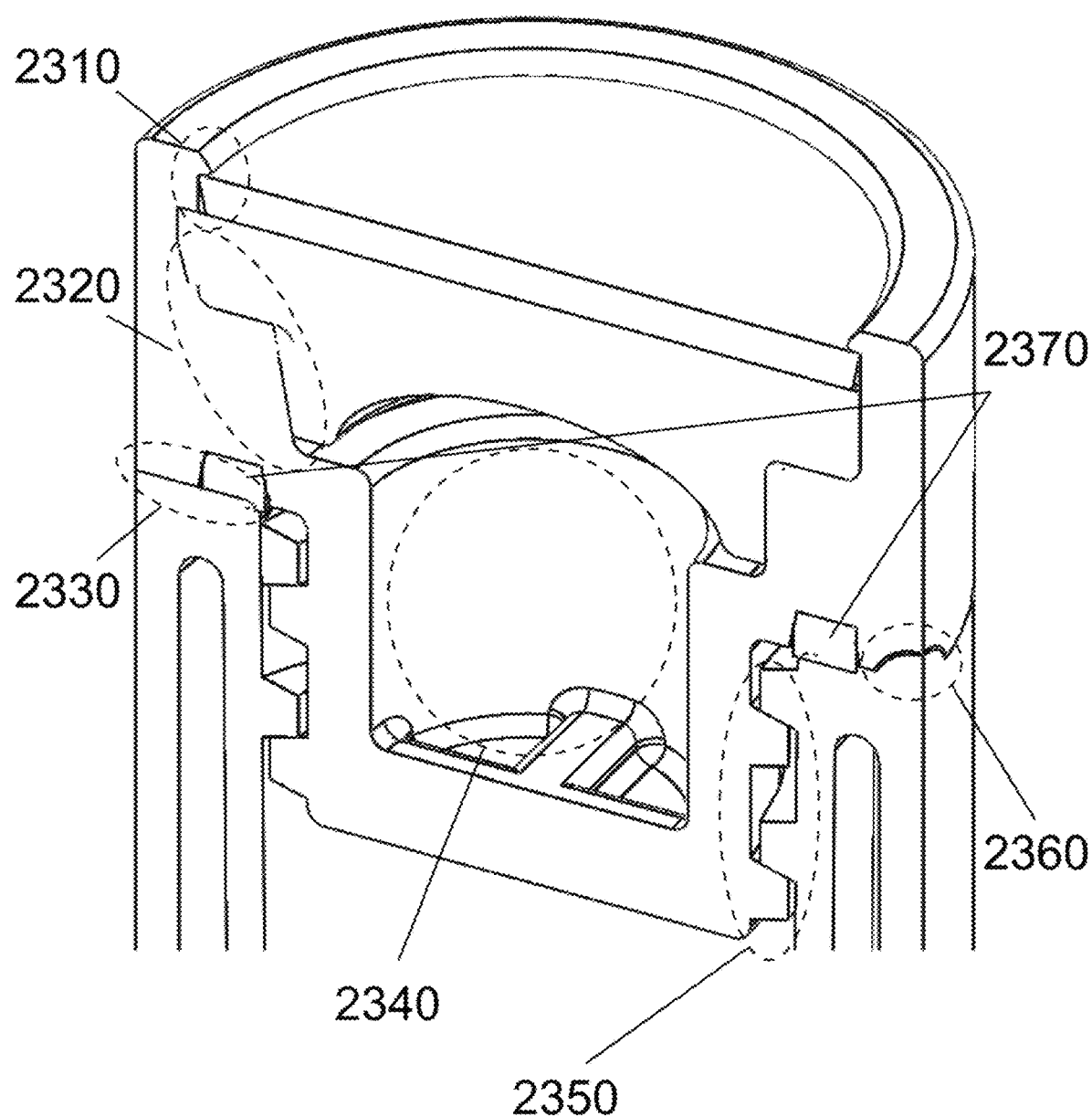
FIG. 23 is a cross-sectional illustration of the assembly of the cap and the container/chamber/vial shown in FIG. 20.

FIG. 23 illustrates the assembly 2300 of container/chamber/vial 2020 and cap 2030. Cap plug 2032 may be press-fit against ring-step 2212, as shown in region 2320 of FIG. 23. Cap plug 2032 may be pressed and locked by cap 2031 and ring-clip 2011, as shown in region 2310 of FIG. 23. Region 2216 may be confined by base cup 2033 and cap plug 2032 and may be filled with substance of choice described above. Cap 2030 may be threaded into container/chamber/vial 2020 via threads 2350, and may be interlocked by bump 2111 and dent 2215, as shown in region 2360 of FIG. 23. The interface between container/chamber/vial 2020 and cap 2030 may be closed by the force provided by threads 2350, as shown in region 2330 of FIG. 23. Also, O-ring 2034 may be squeezed or compressed between container/chamber/vial 2020 and cap 2030, as shown in region 2370 of FIG. 23.

Figure 24:
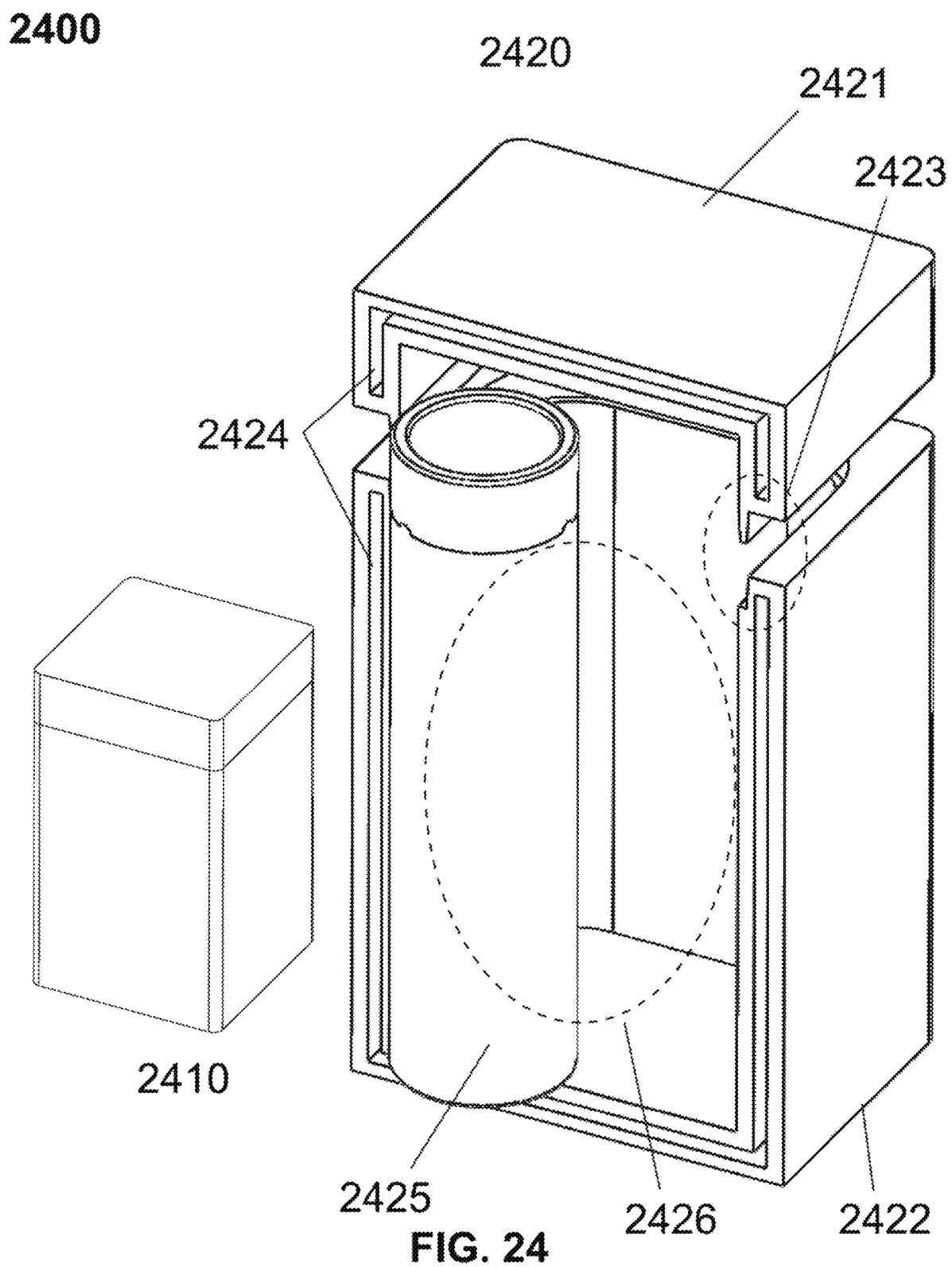
FIG. 24 is an illustration of the container/chamber/vial shown in FIG. 20 residing inside a container comprising two parts, resembling the structures of the container/chamber/vial, forming a "container inside container" multi-container configuration.

FIG. 24 illustrates an extension 2400 of container/chamber/vial 2010, which is a similar M-shaped cross-section device with a rectangular horizontal cross-section with a hollow region in the middle. Box 2410 may be the closed state of the device, while cross-sectional view 2420 of box 2410 is shown in open up state in FIG. 24.

Box 2410 may include an upper lid 2421 and a lower cup 2422, with an optional interlocking mechanism 2423 to lock them together. Both lid 2421 and cup 2422 have an M-shaped cross section, as shown in area 2424 in FIG. 24. Gap of area 2424 may be filled with substance of choice described above. The inner volume confined by lid 2421 and cup 2422 can be used to store a device similar to box 2410 itself, and an instance (labeled as 2425) of container/chamber/vial 110 may be used as an illustrative example.

The side wall and/or side edge may have embedded magnetic component so that multiple instances or variations of box 2410 can be assemble to a complex structure. As such, multiple instances may be stored together.

Figure 25:
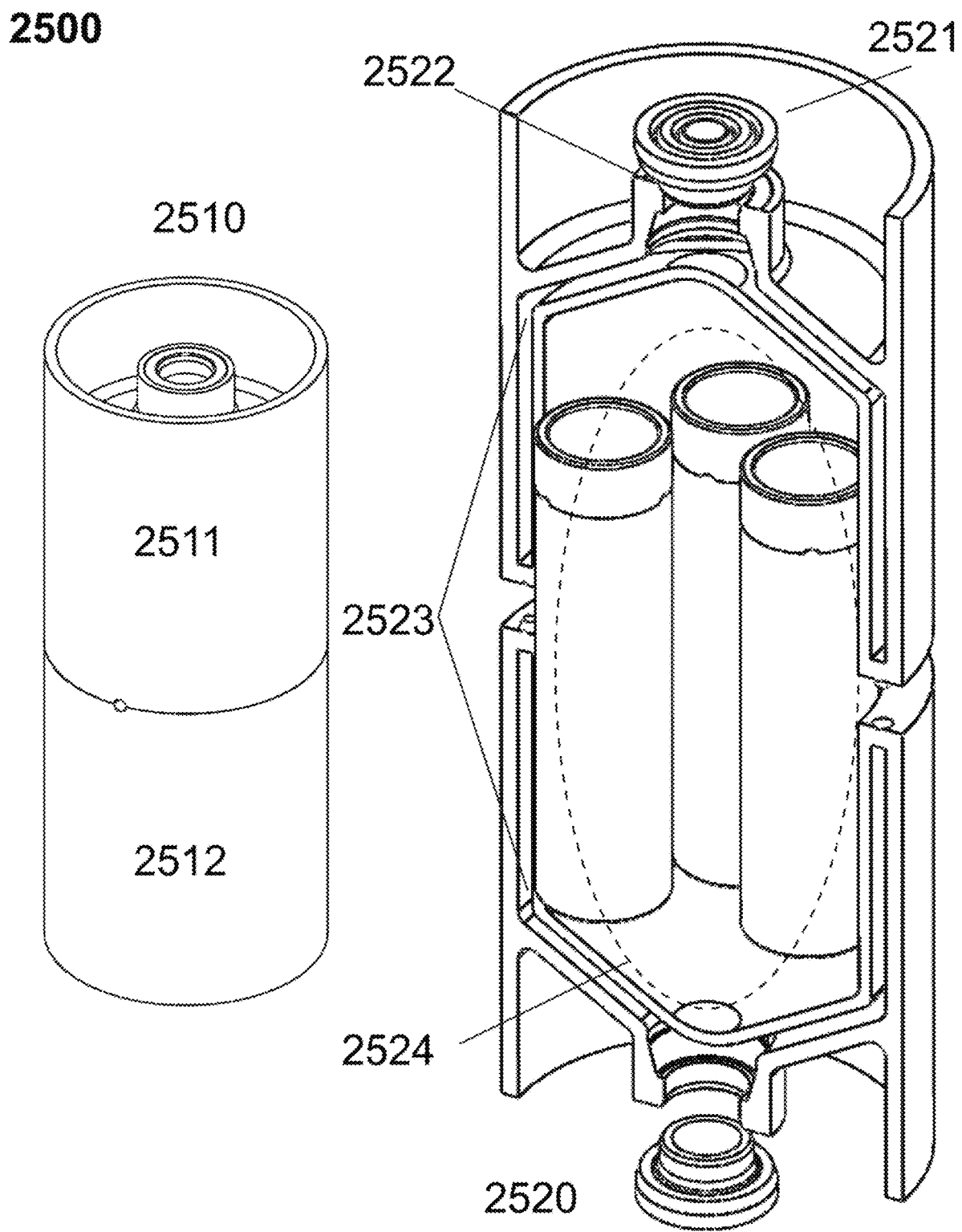
FIG. 25 illustrates another example of the "container inside container" multi-container configuration described in FIG. 24, with a cross-sectional view.

FIG. 25 illustrates an alternative device 2500 that serves the same purpose as box 2410. A cylindrical M-shaped-cross-sectioned tank including an upper cup 2511 and a lower cup 2512 that is shown as the tank 2510 of FIG. 25. Cup 2511 and cup 2512 may be similar parts of opposite orientation. Cross-sectional view 2520 shows the interior structure of tank 2510. Cup 2511 and 2512 may each have a gap 2523 to store substances of any kind (including but not limited to polymer foam, solid metal, liquid metal, gas of various pressure, and the like) to modulate the overall heat-transfer property of tank 2510. Gap 2523 may have one (or more) opening 2522 to add or remove filler materials, and gap 2523 may be sealed by plugging in a plug or cork 2521. Region 2524 may be used to store one or more devices similar to cylinder 2510 itself.

Figure 26:
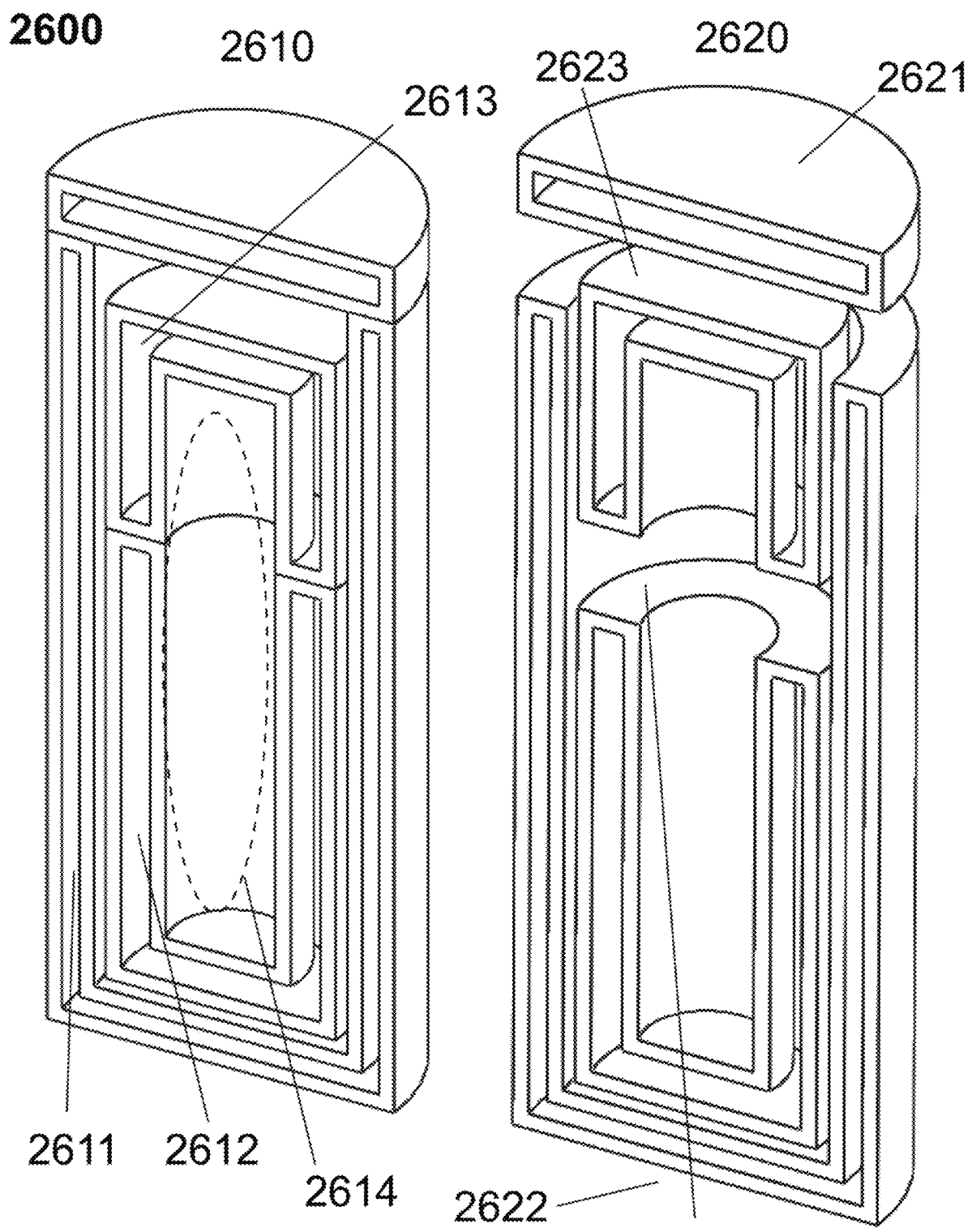
FIG. 26 is illustration of the fundamental features of a "container inside container" multi-container configuration described in FIG. 24 and FIG. 25.

FIG. 26 illustrates a cross-section of a more generalized design of box 2410 and tank 2510. The design 2610 shows the closed state of a four-part assembly with two layers of thermal-insulation devices. The design 2620 may be the open state of assembly 2610. Cap 2621 and cup 2622 may form an outer container while cap 2623 and cup 2624 may form an inner container. The volume confined by cap 2623 and cup 2624 may be used to store smaller versions of 2610 or the sample. Although only two layers of thermal-insulative structure is shown here, there can be multiple layers of similar structures encapsulating each other to reinforce thermal-insulation.

Figure 27:
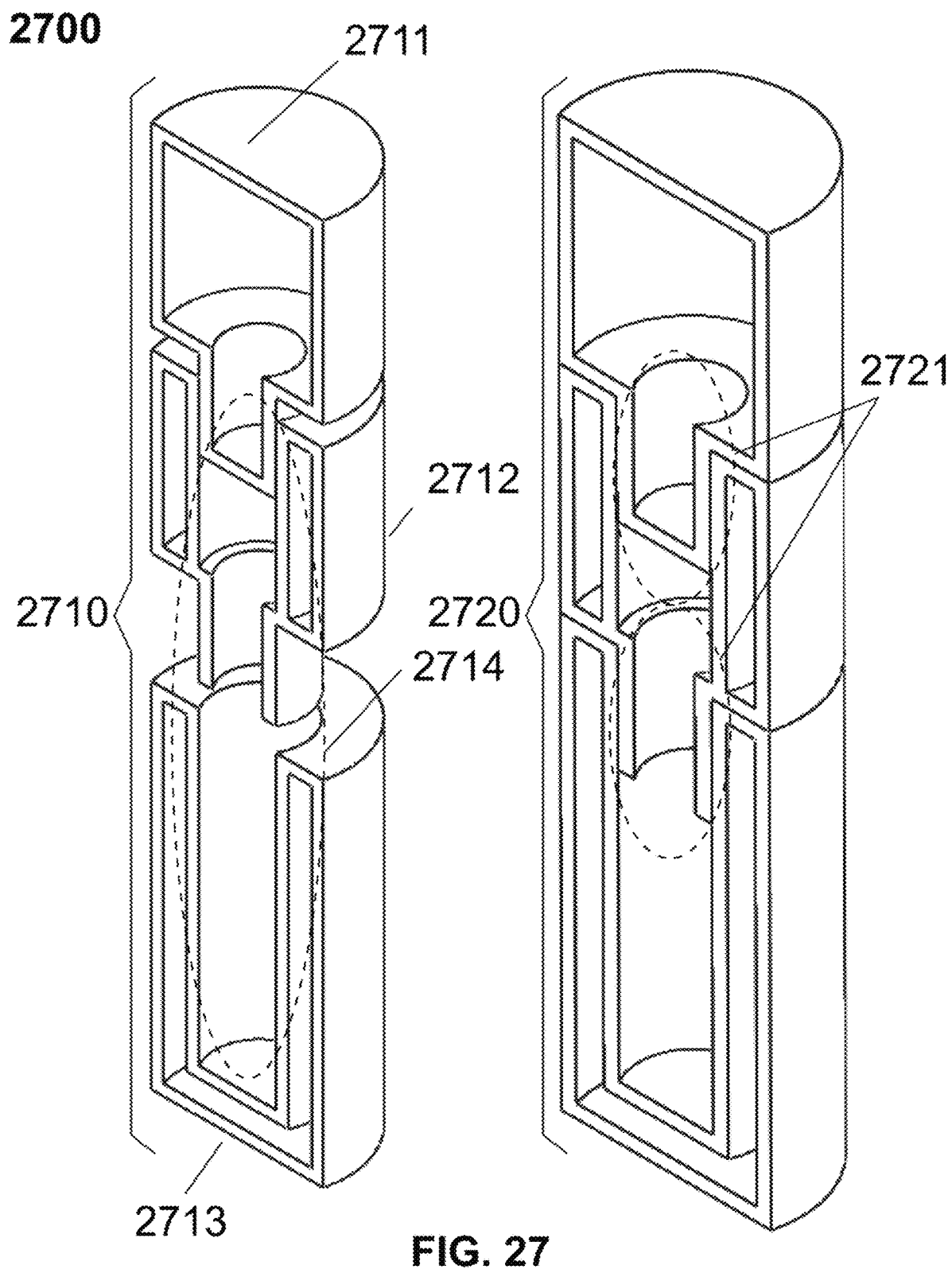
FIG. 27 illustrates yet another example of multi-container configuration assembled using individual vacuum container/chamber/vials, with a cross-sectional view.

FIG. 27 illustrates an alternative assembly 2700 of basic thermal-insulative structures (2010, 2410, 2510, and 2621-2624) that extend the spatial capacity of the confined space. In the open state of the device in 2710, device 2711, 2712 and 2713 may be concentric and stacked to form a central confined space 2714. Optional interlocking structures between adjacent devices 2721 may be installed as shown in the close state view 2720.

Devices 2711, 2712 and 2713 are not limited to cylindrical shape, and the mechanical interlocking 2721 may be replaced with magnets, adhesives or completely removed.

Figure 28:
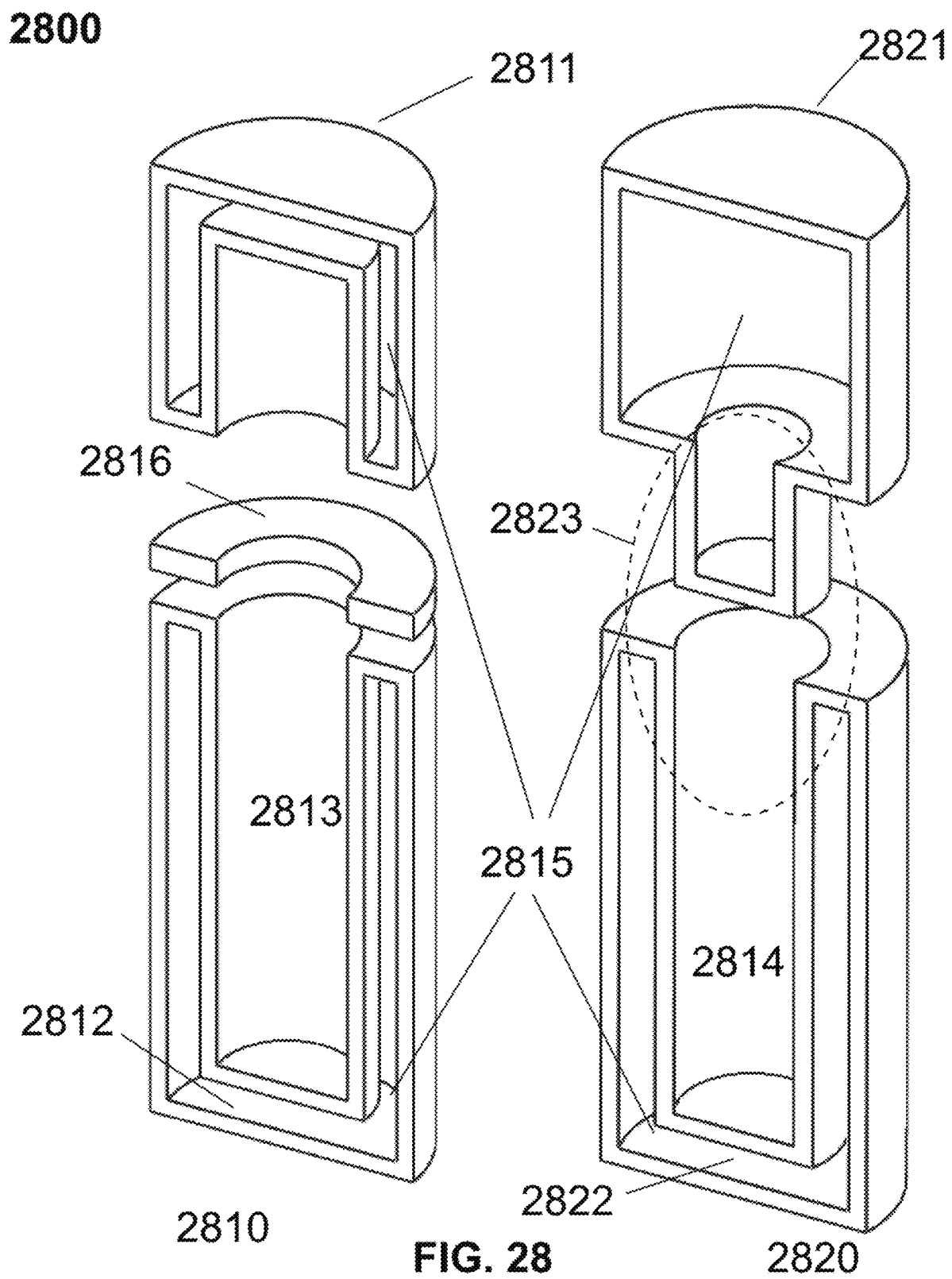
FIG. 28 illustrates still another example of multi-container configuration assembled using individual vacuum container/chamber/vials, with a cross-sectional view.

FIG. 28 illustrates two possible simplified example 2800 of device 2710, the dual-cup configuration 2810 and plug configuration 2820. Dual-cup 2810 may include an upper cup 2811, a middle spacer 2816, and a lower cup 2812, while device 2820 may include plug 2821 and a lower cup 2812. The volume 2815 inside each individual device may be filled with substances of any kind (including but not limited to polymer foam, solid metal, liquid metal, gas of various pressure, and the like). Spacer 2816, optional, may be used as an O-ring made out of rubber, and spacer 2816 may also be active devices or metal depending on applications. In the plug configuration, the interlocking mechanism may be in the dashed circle.

Figure 29:
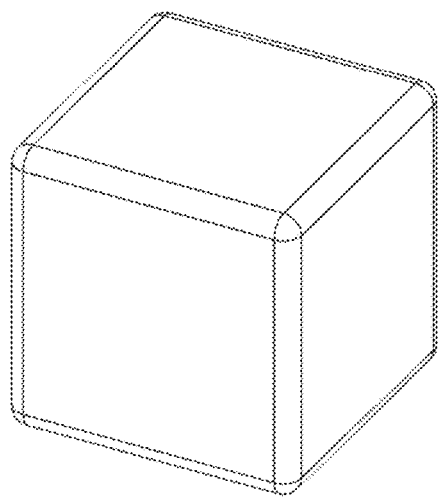
FIG. 29 illustrates another example of the individual container/chamber/vial used to create the multi-container configuration.
Figure 29:
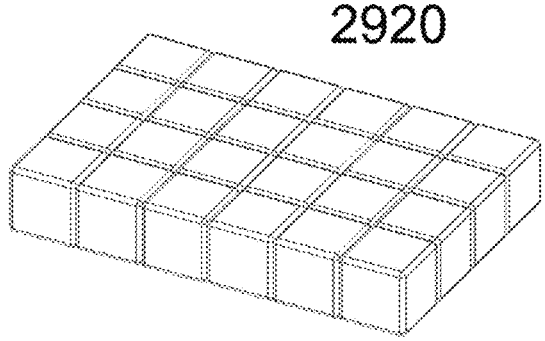
Figure 29:
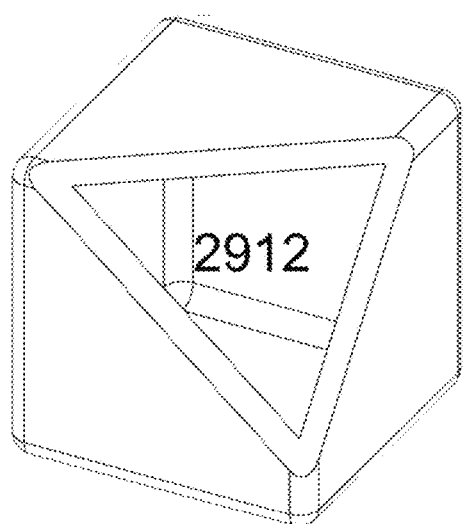
Figure 29:
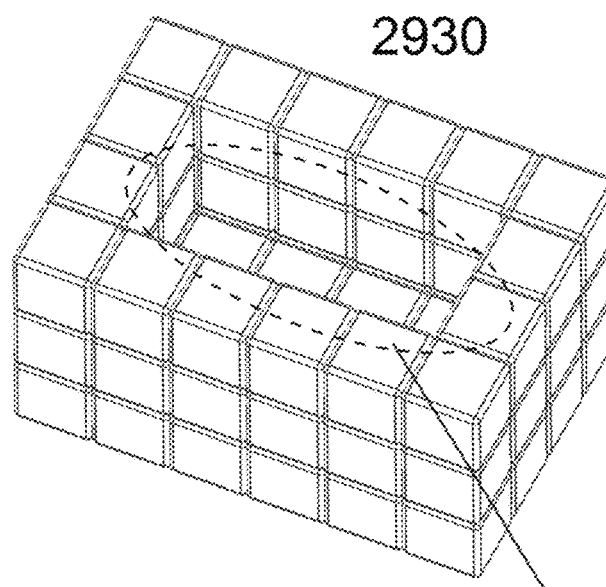

FIG. 29 illustrates another example 2900 of the modular thermal-insulating design, a cubic container/chamber/vial 2910. As shown in the example 2911 of FIG. 29, the container/chamber/vial has a shell and an inside volume 2912, and volume 2912 may be filled with substances of any kind (including but not limited to polymer foam, solid metal, liquid metal, gas of various pressure, and etc.) to modulate the overall heat-transfer property of container/chamber/vial 2910.

Multiple instances or variations of container/chamber/vial 2910 may tessellate a surface or fill a volume, as shown in the example 2920. The assembly describe above may form a thermal-insulating layer 2020, or create a thermal-insulating confining space such as region 2931 in assembly 2930.

Figure 30:
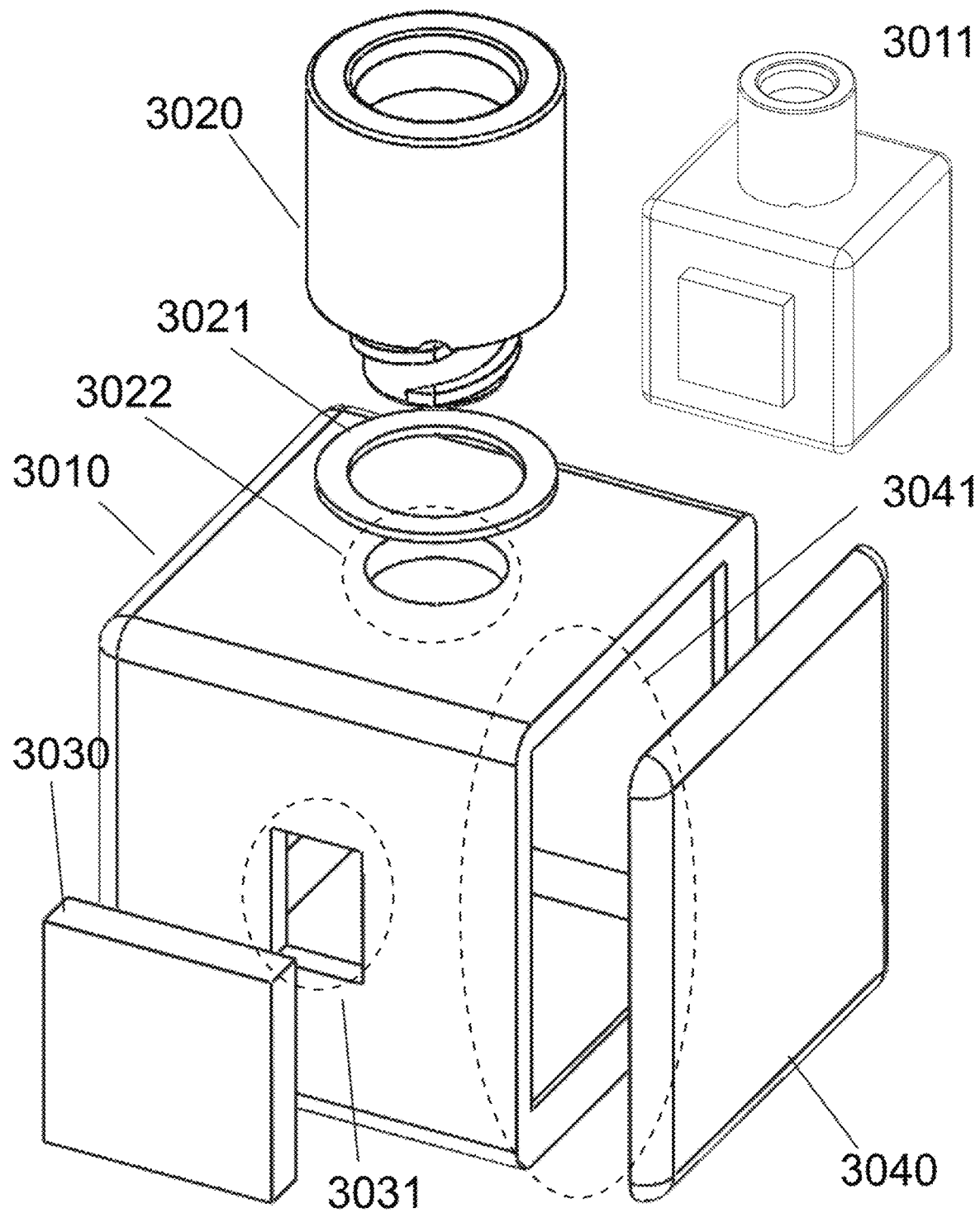
FIG. 30 illustrates some of the methods how an individual vacuum container/chamber/vial in FIG. 29, and FIG. 20 can be sealed.

FIG. 30 illustrates alternative sealing possibilities 3000 of gap 2113, volume 2216, volume 2340, gap 2424, gap 2523, volume 2815, volume 2912, and container/chamber/vials of other geometries. One example of the thermal-insulating device may have any number of opening and sealing structures.

Using container/chamber/block 2910 as an illustrative example, volume 2912 of container/chamber/block 2910 may be sealed using a threaded or non-threaded fitting 3020 through a hole on the shell of container/chamber/block 2910. An optional ring 3021 may be installed between hole 3022 and fitting 3020 to modulate the behavior of the interface. Ring 3021 may be made of rubber material, metal, electronics, and the like. The opening of container/chamber/block 2910 may also be orientation-sensitive (as shown in region 3031) so that the orientation of the cap 3030 may be fixed, and the two parts 3030 and 3031 may be attached together. Also, part of the container/chamber/block 2910 itself may serve the purpose of sealing. As shown in the area 3041, a sidewall 3040 of container/chamber/block 2910 may also be used as the sealing structure.

Figure 31:
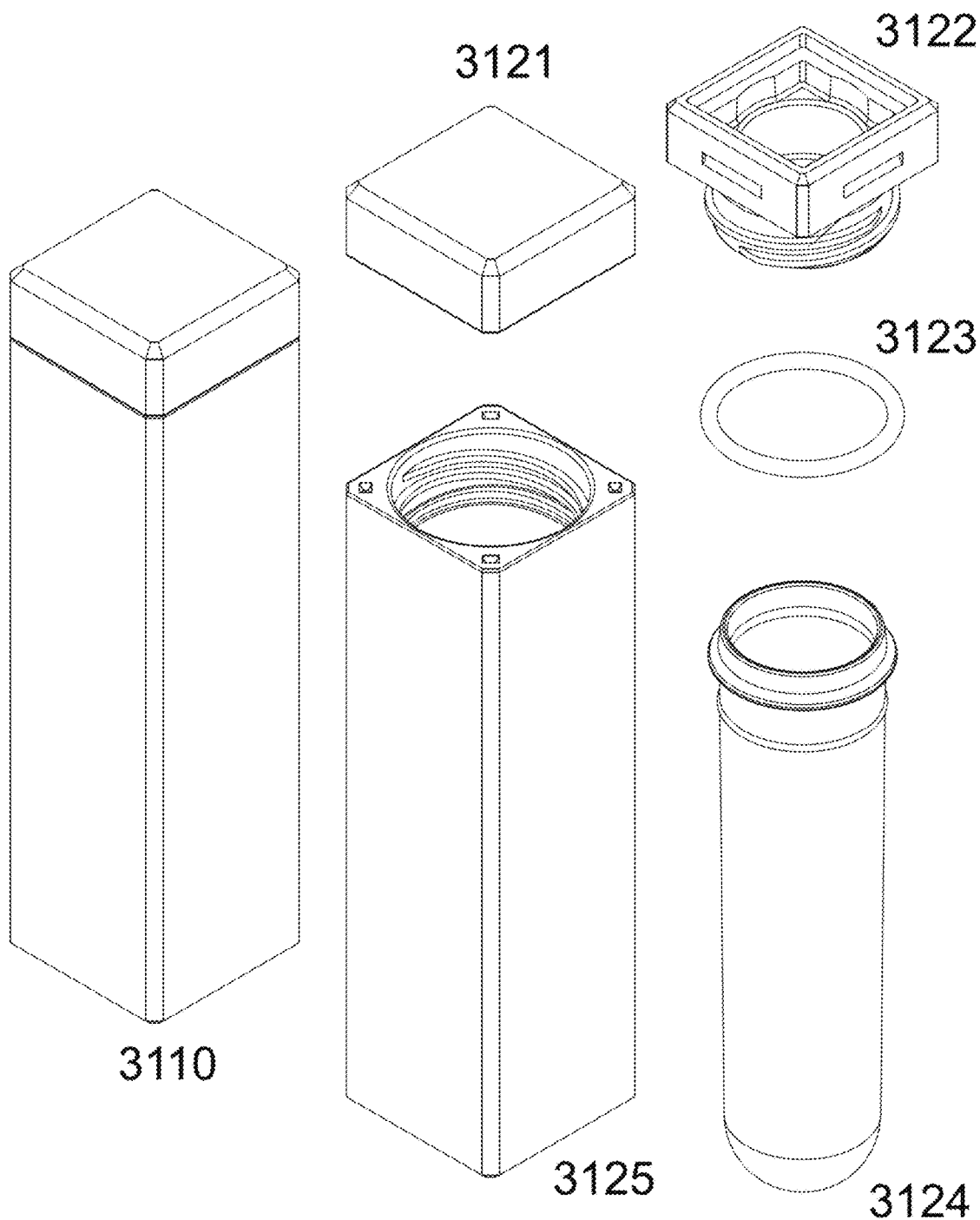
FIG. 31 illustrates one example of a vial that may be used in this disclosure, including an overview of the assembled vial as well as an exploded view of the components.

FIG. 31 illustrates one example 3100 of a container such as a vial. Vial 3110 shows a fully assembled and closed vial, and the components are illustrated in exploded view 3120. The components in exploded view 3120 may include a cap shell 3121, a cap base 3122, a gasket 3123, an inner vial 3124, and an outer vial 3125. A vial may be a tube.

The vial 3110 may include a vial body and a cap, where the body may include inner vial 3124 and outer vial 3125. A cap may include cap shell 3121, cap base 3122, and also optionally may include gasket 3123.

Figure 32:
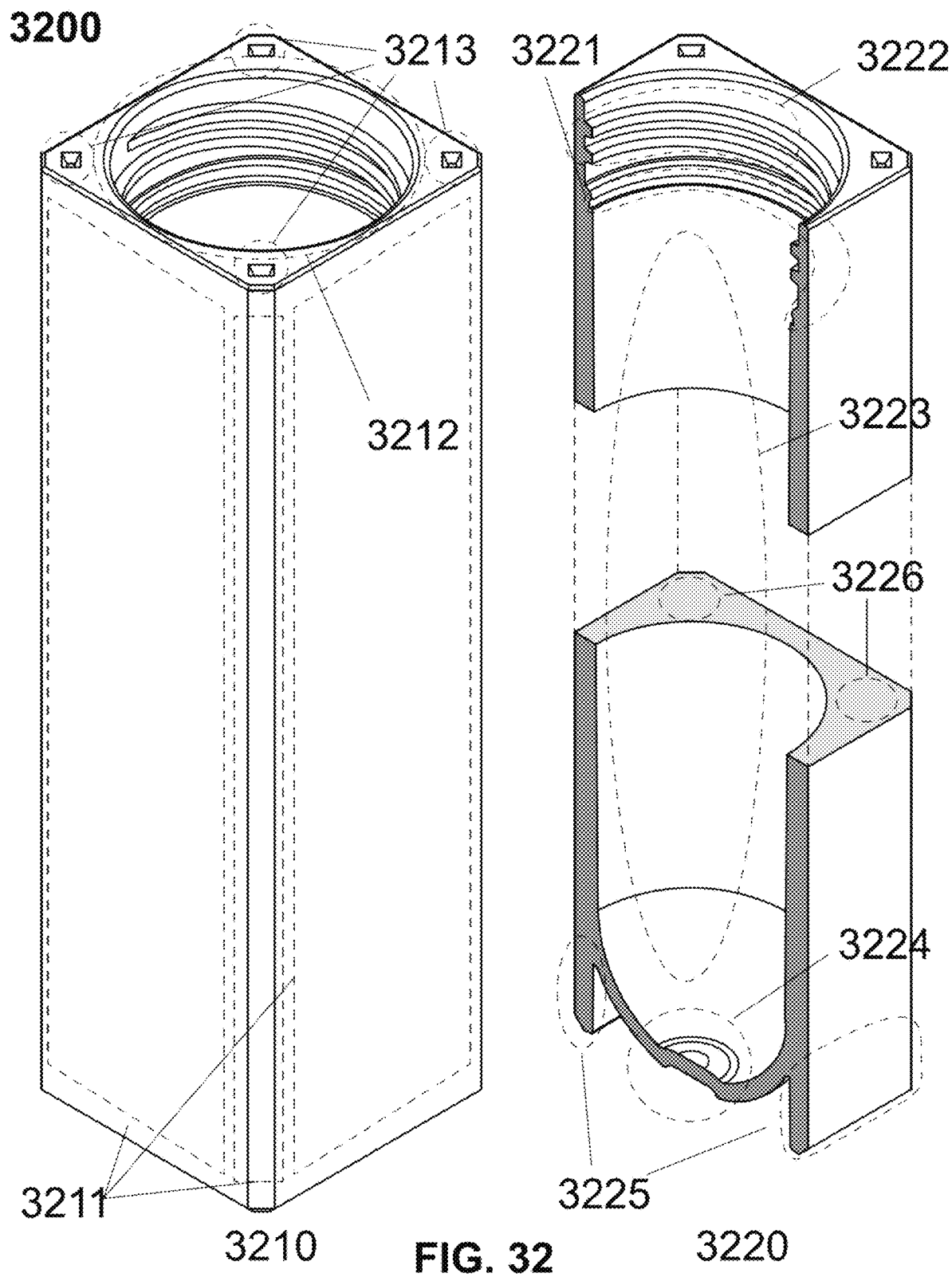
FIG. 32 is a detailed illustration of one design of the outer vial shown in FIG. 31 with a cross-sectional view.

FIG. 32 illustrates one example 3200 of outer vial 3125 shown in FIG. 1. Isometric view 3210 shows the exterior features of outer vial 3125 and cross-sectional view 3220 shows the interior.

Figure 40:
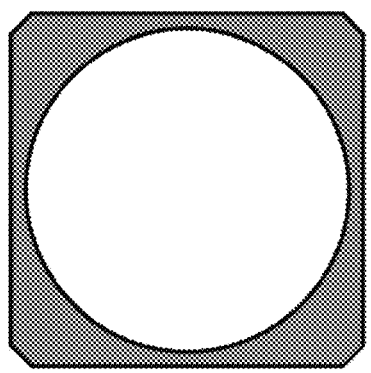
FIG. 40 is an illustration of possible alternative cross-sectional geometries of the vial used in this disclosure.
Figure 40:
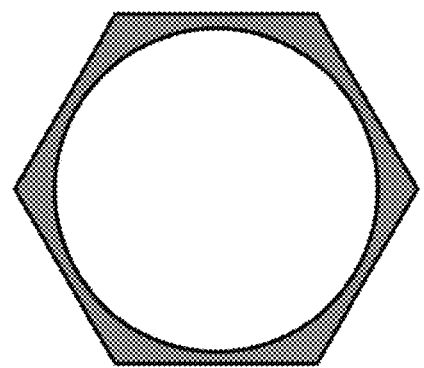
Figure 40:
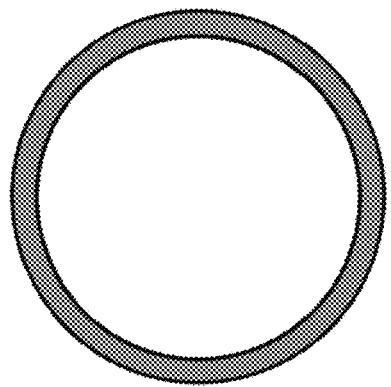
Figure 40:
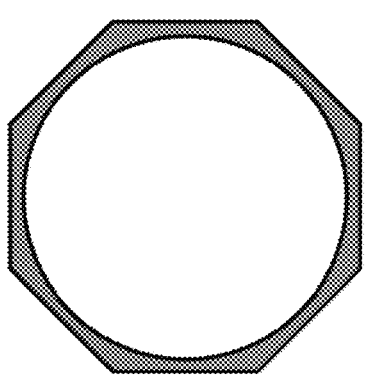

As shown in view 3210, outer vial 3125 may have a square footprint, four (4) vertical sidewalls with a chamfer on the intersection of each pair of adjacent sidewalls, boxed by 3211. Outer vial 3125 may have a circular opening on the top surface, as circled by region 3212. The horizontal cross-section of outer vial 3125 may be a circle surrounded by a chamfered square, and the corner volume 3226 between the cylindrical inner surface 3212 and square sidewalls 3211 may be solid, which can be used to adjust the thermal mass of vial 3110. Outer vial 3125 may have horizontal cross-sections of other shapes, whereas inner surface 3212 is not necessarily circular as long as interior volume 3223 defined by inner surface 3212 is able to contain inner vial 3124. The perimeter of the cross-section of outer vial 3125 may also be other polygons. Alternative geometries of outer vial 3125 are shown in FIG. 40

Also, sidewalls 3211 may generate internal reflections to give vial 3110 a crystal-like appearance, with the outer vial made of transparent material, possibly polycarbonate that can maintain mechanical properties in cryogenic conditions. Sidewalls 3211 may be used for labeling purposes, and the flat surface makes sidewalls 3211 easy to write with a sharpie or a permanent marker. Moreover, barcode as well as QR code or any other marker can be engraved or printed onto sidewalls 3211, and the flatness of sidewalls 3211 makes the code easy to be read by both human and machines.

Since vial 3110 is to be stored in cryogenic condition, label written or stick on sidewalls 3211 is most likely to degrade and fall off. It is possibly to etch sidewalls 3211 with either laser engraving or chemical corrosion to leave permanent physical grooves that last longer on sidewalls 3211.

Outer vial 3125 may have positioning slots 3213 in the corner area on the top surface, and each of the positioning slots may have a counterpart, a positioning block, on the bottom surface of the cap. The positioning slots 3213 may be on the bottom surface and the positioning block may be on the top surface. Alternatively, the top surface may have one or more positioning slots 3213 and positioning blocks, and the bottom surface may have one or more matching positioning blocks and positioning slots 3213. While each pair of positioning structure is locked to position, each sidewall of outer vial 3125 should be coplanar with the corresponding sidewall of the cap.

As shown in cross-section 3220, outer vial 3125 may have an annular groove 3221 on inner surface 3212 to hold inner vial 3124. Threads 3222 in the opening above interior volume 3223 may be for the cap to be screwed in. Outer vial 3125 may have a hemispherical or conical bottom/dome, and also, may optionally have a dent that may be used for manufacture, as shown as dome 3224. Sidewalls 3211 of outer vial 3125 may extend beyond the tip of dome 3224 becoming feet 3225 which may enable vial 3110 standing by itself on a horizontal surface. The bottom surface of feet 3225 may have chamfers on the edges in contact with the supporting surface where vial 3110 stands on, so that the contact area between outer vial 3125 and the supporting surface is minimized in order to suppress conductive heat transfer.

Figure 33:
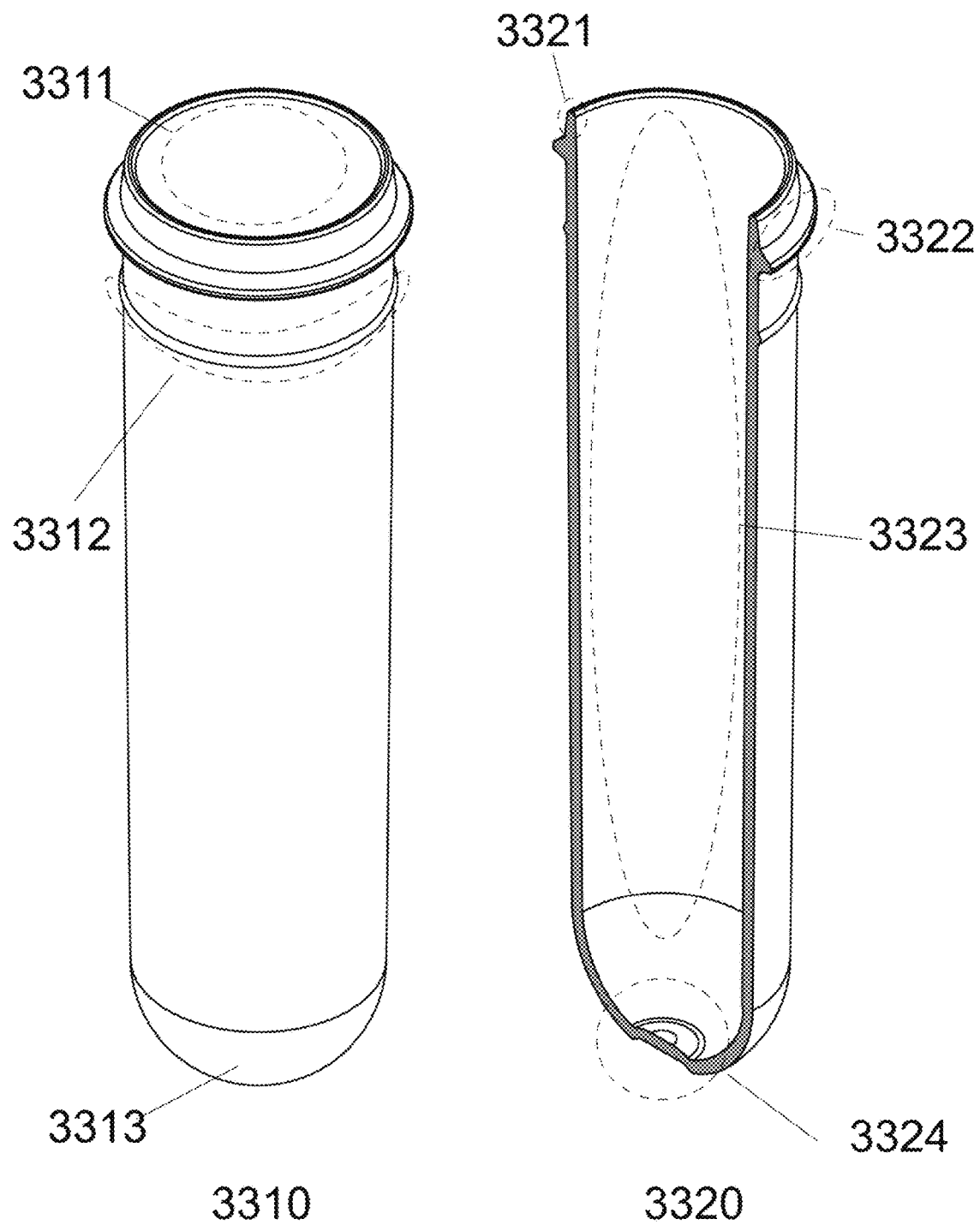
FIG. 33 is a detailed illustration of one design of the inner vial shown in FIG. 31 with a cross-sectional view.

FIG. 33 illustrates one example 3300 of inner vial 3124 shown in FIG. 31. Isometric view 3310 shows the exterior features of inner vial 3125 and cross-sectional view 3320 shows the interior as well as details.

As shown in the example 3310, inner vial 3124 may have a cylindrical geometry with a hemispherical or conical dome 3313 at the tip and cylindrical inner surface 3311 that opens on the opposite side of dome 3313. An annular mark 3312 on the sidewall of inner vial 3124 can be used as an indicator for specific volume of liquid inside interior volume 3323 defined by inner surface 3311. Inner vial 3124 is possibly made of transparent or semi-transparent material, polypropylene for example, so the user can observe the content inside inner vial 3124.

As shown in cross-section 3320, dome 3313 of inner vial 3124 may have an optional dent 3324 that may be used for manufacture. Rim 3321 at the opening of inner vial 3124 may serve a sealing purpose to encapsulate interior volume 3323 from the surrounding environment. Rim 3322 can support inner vial 3124 by residing into annular groove 3221 of outer vial 3125.

Figure 34:
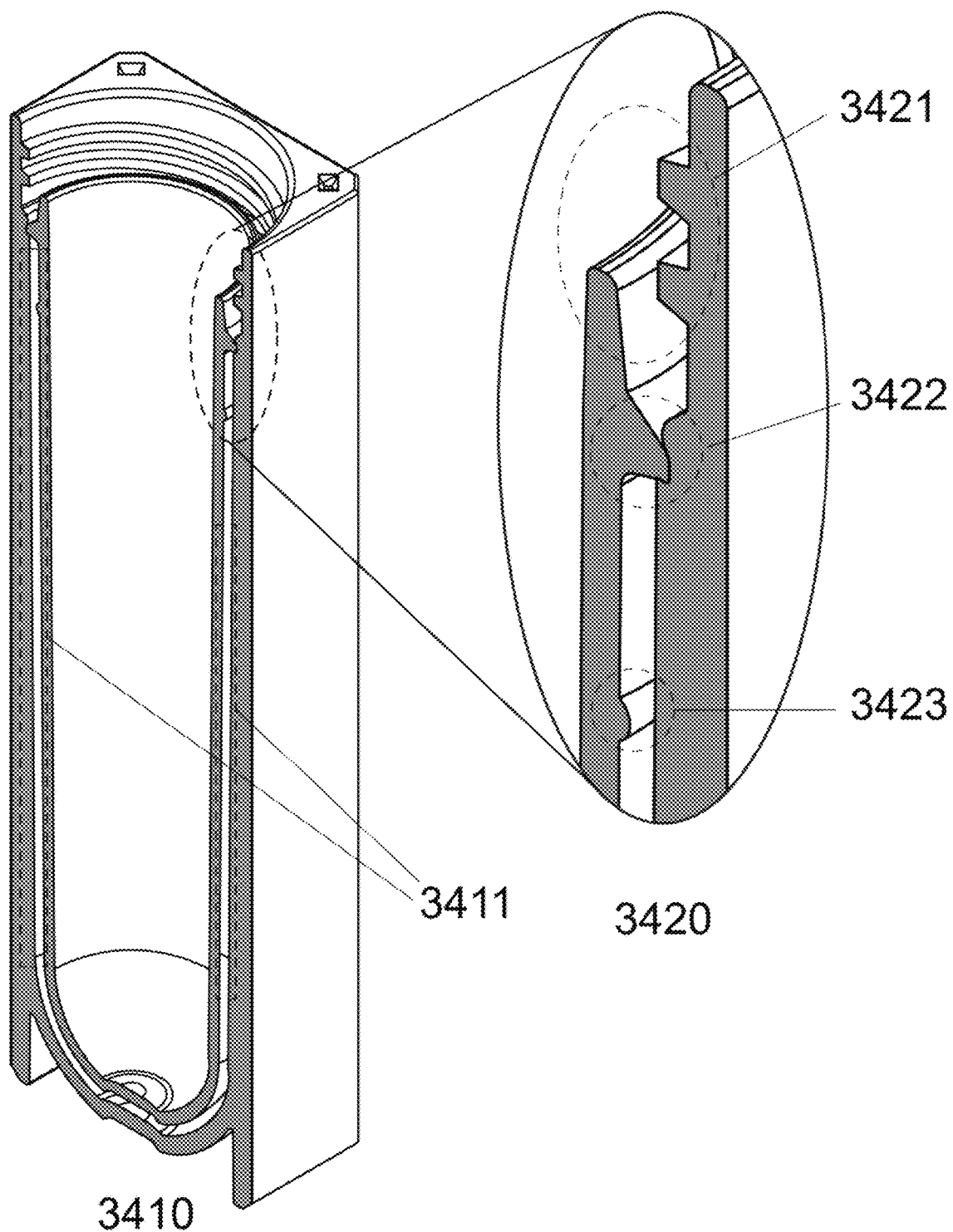
FIG. 34 is a cross-sectional illustration of the assembly of the outer vial shown in FIG. 32 and the inner vial shown in FIG. 33, with a detail view.

FIG. 34 illustrates the assembly 3400 of outer vial 3125 and inner vial 3124. Cross-section 3410 shows the relative position of outer vial 3125 and inner vial 3124 while zoom-in cross-section 3420 shows the details.

As shown in cross-section 3410, inner vial 3124 is fixed to outer vial 3125, and there may be a thin gap 3411 in between. Gap 3411 may be filled with designated substance at designated pressure or stress to block the conductive heat transfer across gap 3411 between inner vial 3124 and outer vial 3125.

As shown in cross-section 3420, inner vial 3124 is mounted onto outer vial 3125 as rim 3322 resides into annular groove 3221, possibly through press-fitting or interlocking without adhesives, as shown in fitting 3422 as an example. Fitting 3422 may have a sealing effect or function to encapsulate gap 3411 from the outside so that there may be little amount of gas exchange between gap 3411 and the outside environment. As shown in region 3421, threads 3222 may not be in contact with inner vial 3124, and as shown in region 3423, mark 3312 may not be in contact with outer vial 3125. The only region of contact between inner vial 3124 and outer vial 3125 may be the fitting 3422, so that the conductive heat transfer between inner vial 3124 and outer vial 3125 is controlled to be at a minimum level and is suppressed.

Figure 35:
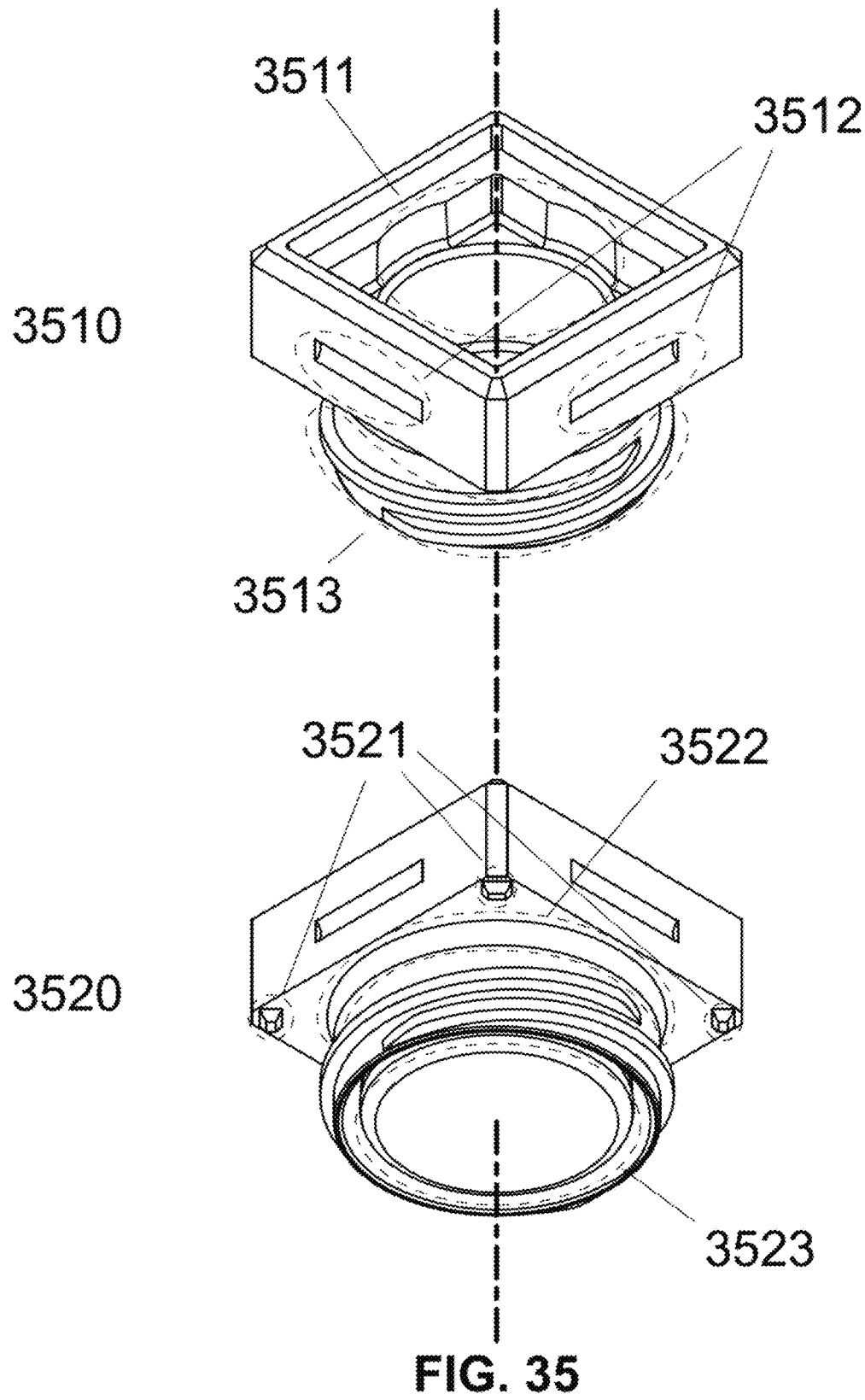
FIG. 35 is a detailed illustration of one design of the cap base shown in FIG. 31.

FIG. 35 illustrates one example 3500 of cap base 3122 shown in FIG. 40. Isometric views 3510 and 3520 illustrate the details of cap base 3122 observed from above and from below, respectively.

As shown in isometric view 3510, cap base 3122 may include a cuboid part on the top and a cylindrical part underneath, with a hollow 3511 that opens from the cuboid side. Hollow 3511 may be used to store electronics or other devices. The lower cylindrical part of cap base 3122 has threads 3513 on the outside that can be screwed into threads 3222 on outer vial 3125. There may be one or multiple slot on each sidewall of cap base 3122 in order to mount and fix cap shell 3121, as shown in 3512 in FIG. 35.

As shown in isometric view 3520, cap base 3122 may have one or multiple positioning blocks 3521 that match with the counterpart positioning slots 3211 on outer vial 3125. Annular groove 3522 above threads 3513 can be used as a mount for gasket 3123. Annular groove 3523 at the bottom of cap base 3122 may fit with rim 3321 after the cap is screwed into the vial body.

Figure 36:
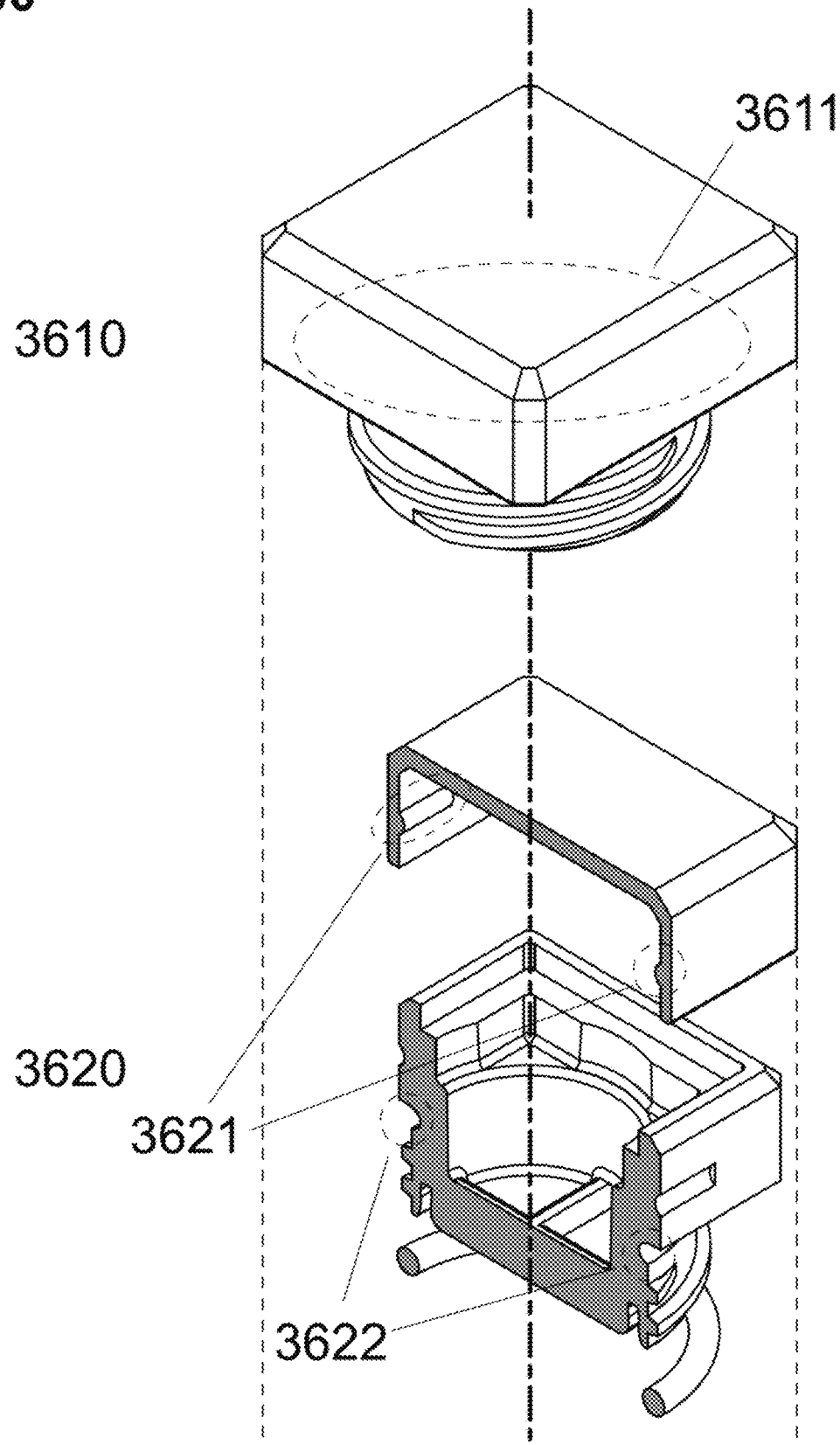
FIG. 36 is an illustration of the assembly of the cap base shown in FIG. 31, the cap shell shown in FIG. 31, and the gasket shown in FIG. 31, with an exploded cross-sectional view.

FIG. 36 illustrates the assembly 3600 of the cap including cap shell 3121, cap base 3122, and gasket 3123. Isometric view 3610 shows the appearance of the cap, and exploded cross-section 3620 shows the assembly relation among each component described above.

As shown in view 3610, cap shell 3121 may have identical sidewall perimeter as outer vial 3125 so that each sidewall of cap shell 3611 is coplanar with the corresponding sidewalls 3211 when the cap is screwed into place. Cap shell 3121 may have a flat top with chamfer 3611 on the edges between adjacent sidewalls as well as on the edges between the top surface and each sidewall. The flat top surface of cap shell 3121 can be labeled using the same techniques that can be used to label sidewalls 3211.

As shown in view 3620, cap base 3122 fits into the bottom hollow of cap shell 3121, and gasket 3123 fits into annular groove 3522. Mechanical latches 3621 may be located on each interior sidewall of cap shell 3121 and latches 3621 may clip into slots 3512 on cap base 3122 to achieve a permanent locking. The position of latches 3621 and slots 3522 may be swapped, and they may be together replaced by adhesives.

Figure 37:
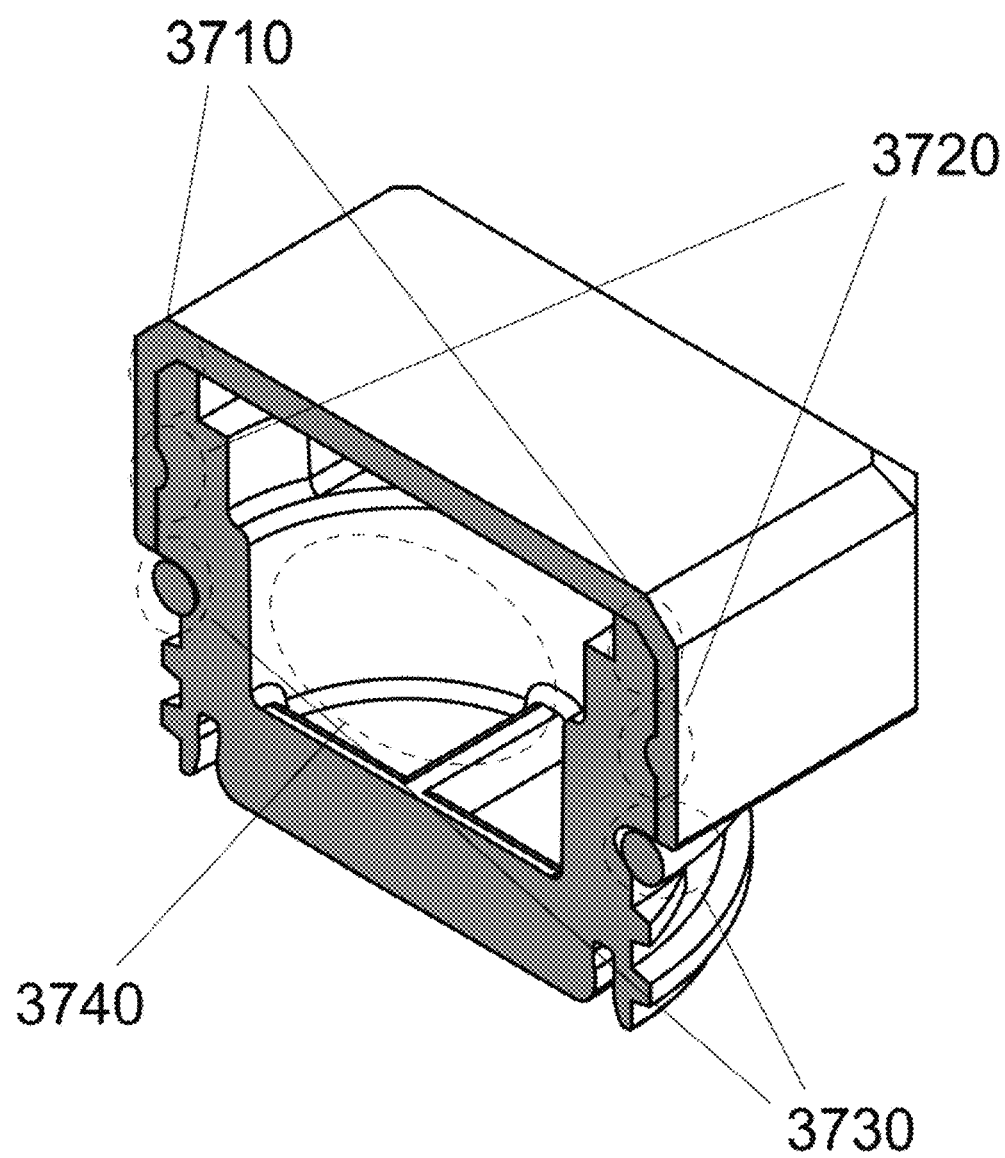
FIG. 37 is a cross-sectional illustration of detailed relations between the components in the assembly shown in FIG. 36.

FIG. 37 illustrates the assembly 3700 of cap 3610 in FIG. 36, including cap shell 3121, cap base 3122, and gasket 3123. Cap base 3122 tightly fits into cap shell 3121 to provide sealing 3710 encapsulating volume 3740 inside cap base 3122. The assembly of cap shell 3121 and cap base 3122 can be secured by mechanical locking mechanism 3720. Gasket 3123 can tightly fit into annular groove 3522 in cap base 3122, as shown in 3730. It is also possible that gasket 3123 is mounted to the rim of outer vial 3125 to ensure the same sealing functionality as configuration 3730.

Volume 3740 can store electronics that include but are not limited to radio frequency (RFID) devices and near field communication devices (NFC), so that each individual vial 3110 can be tracked by external devices. Volume 3740 can also be filled with designated substance, for example, silicone gel, to modulate the physical properties of vial 3110, such as total heat of capacity, mass, location of center of mass, moment of inertia and the like.

Particularly, one or multiple piece of magnetic material can be fixed inside volume 3740 either on cap shell 3121 or cap base 3122 so that the entire vial 3110 can be moved, opened, or closed by an external magnetic device. For example, a user can use a piece of material with a magnetic tip to take a vial 3110 out of a rack filled with other vial 3110s by placing the magnetic tip of the rod near the cap of the vial 3110 which the user may want to take out. Therefore, vial 110 can be moved immediately after being taken out of liquid nitrogen storage by a magnetic device and the user may not need to touch vial 3110 directly, which prevents possible frostbite as well as heating up the sample. The magnetic material inside volume 3740 can either be permanent magnets or material that can be magnetized (temporarily or permanently) by external magnetic fields. The magnetic tip of the device that may be used to pick up vial 3110 can be achieved by permanent magnets or coils with electric current inside.

Figure 38:
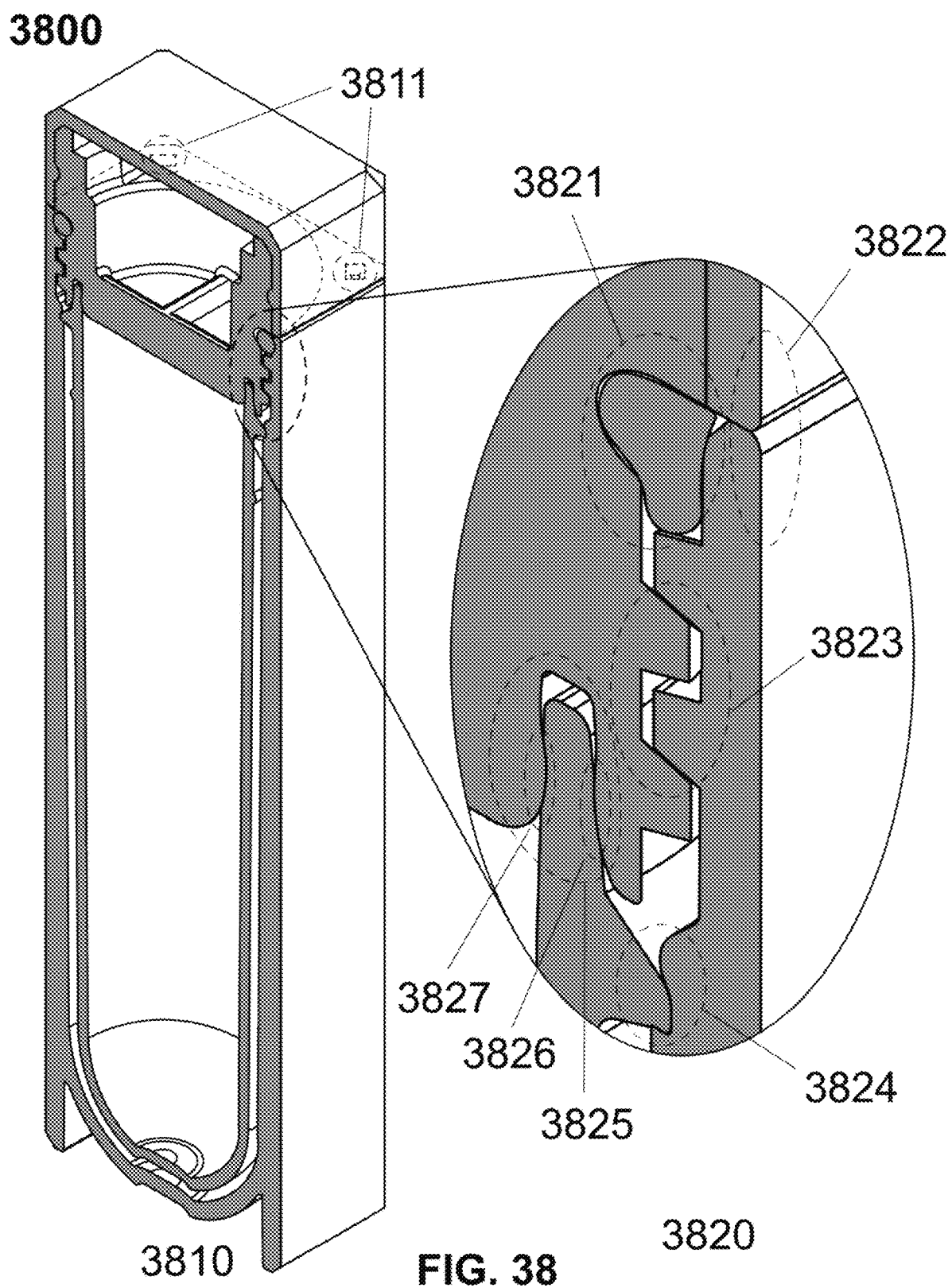
FIG. 38 is a detailed cross-sectional illustration of the assembly of the cap in FIG. 36 and the vial body shown in FIG. 34.

FIG. 38 illustrates the interactions 3800 among all the components described in FIG. 31 while cap 3610 (including cap shell 3121, cap base 3122, and gasket 3123) is tightly screwed into vial body 3410 (including outer vial 3125 and inner vial 3124). View 3810 is a cross-sectional view of vial 3110, and view 3820 is a close-up view of the region where the components described above are in contact. As cap 3610 is screwed into the opening of vial body 3410 along threads-fitting indicated by 3823, multiples interactions among components are described below.

As shown in region 3821, gasket 3123 is squeezed by cap base 3122, cap shell 3121, and outer vial 3125, filling the annular gap between cap base 3122 and outer vial 3125 to form a seal that may prevent liquid from entering the interior volume of vial 3110. The cross-section of gasket 3123 can be circular, elliptical, rectangular, diamond, or other shapes, as long as gasket 3123 is able to completely seal the gap between cap base 3122 and outer vial 3125 tight enough so that liquid is not able to enter the volume inside outer vial 3125 from outside. Also, the deformation of gasket 3123 shown in region 3821 provides a force that keeps threads-fitting 3823 tight.

As shown in region 3822, after cap 3610 is screwed to the designated position, positioning blocks 3541 should slide into corresponding positioning slots, as shown in fitting 3811. Meanwhile, the vertical sidewalls 3211 of outer vial 3125 should be coplanar with the corresponding sidewall of cap shell 3121, as shown in 3822. The assembled vial 3110 may have an overall cuboid shape with chamfers on each edge. The positioning pair in fitting 3811 can be replaced by other type of mechanisms, such as pairs of magnets or any other mechanisms that stop the angular motion of cap 3610 with respect to vial body 3410 after cap 3610 is sufficiently screwed while sidewalls 3211 is coplanar with the corresponding outermost sidewall of cap shell 3121.

As shown in 3824, inner vial 3124 is pressed into outer vial 3125 by cap 3610, so the interface between rim 3322 and groove 3221 is under compression to reinforce the sealing function. Inner vial 3124 and outer vial 3125 should not have any region of contact other than fitting 3824, in order to minimize the conductive heat transfer between inner vial 3124 and outer vial 3125. Fitting 3824 may also provide mechanical support to inner vial 3124 so that inner vial 3124 does not tilt inside volume 3223 of outer vial 3125, even when vial 3110 collides with other objects. When cap 3610 is being unscrewed from the locking position, fitting 3824 holds inner vial 3124 in place with outer vial 3125 so that the user may not pull inner 3124 out accidently.

As shown in region 3825, rim 3321 on inner vial 3124 is pinched by annular groove 3523 to form a seal that may encapsulate the content inside inner vial 3124. Rim 3321 may be pressed inward by groove 3523 in contact region 3826, and may be pressed outward by groove 3523 in contact region 3827, so that rim 3321 is under compressive loading that forms a double seal blocking the liquid exchange between volume 3323 and outside. The cross section of rim 3321 is like a wedge so that double seal 3825 may exert a downward force upon inner vial 3124 to reinforce fitting 3824.

Figure 39:
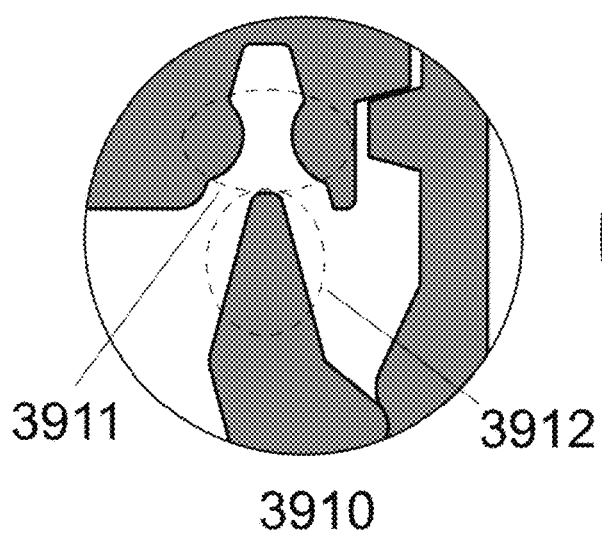
FIG. 39 is a cross-sectional illustration of two possible alternative designs of the seal region shown in FIG. 38.
Figure 39:
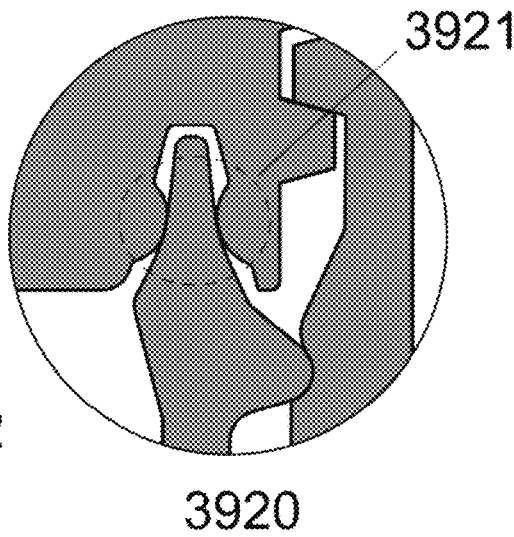
Figure 39:
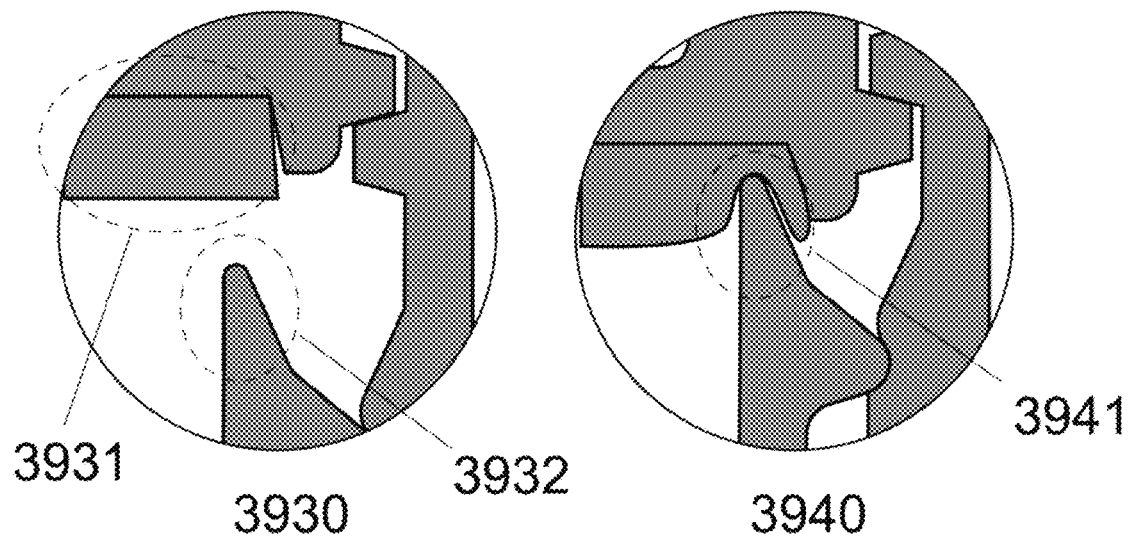

FIG. 39 illustrates two alternative designs 3900 of double seal 3825 in FIG. 38. Views 3910 and 3920 may be the open and closed state respectively of another double seal structure. Views 3930 and 3940 may also be the open and closed state respectively of an elastomer based seal.

As shown in view 3910, groove 3911 (equivalent to groove 3523) has a V-shaped cross section with two annular bumps on each side. Rim 3912 (equivalent to rim 3321) has a flatter A-shaped cross section compared to rim 3321 so that the pinching force exerted on rim 3912 may have a large downward component compared to the pinching force exerted on rim 3312 in double seal 825.

While the seal 3921 (equivalent to double seal 3825) is closed, as shown in view 3920, rim 3912 may be pinched by groove 3911 and may be pressed downward. In comparison with double seal 3825, seal 3921 applies a large downward force compared to double seal 3825 with identical revolution of threads-fitting 3823, resulting in a stronger assembly 3824. Moreover, seal 3921 may have a smaller contact area between groove 3911 and rim 3912 so the conductive heat transfer is weaker compared to seal 3825.

As shown in view 3930, groove 3523 is replaced by an elastomer gasket 3931, and rim 3932 has a shaper tip compared to rim 3321. In the closed state, rim 3932 cuts into the gasket 3931 to form a water-tight seal 3941.

FIG. 40 illustrates different cross-sectional geometries 4000 of vial 3125. Shape 4010 may be the geometry used for all the descriptions above. For all the configurations, the inner rim of each cross-section in FIG. 40 may be circular (or part of a circle) so that cap 3610 can be screwed into the opening of outer vial 3125. The perimeters of each geometry may have different cross-sectional area (shaded area), resulting in different amount of material within vial 3125 as well as different thermal masses, while larger thermal mass may reduce cooling rate of vial 3110.

On the other hand, different perimeters may have different profiles of heat dissipation into the surrounding environment, as pointy polygons may cool faster than circles in a cold environment. The choice of geometries for vial 3125 is primarily based on the designated cooling rate, which may subject to changes depending on the requirement of samples to be stored in volume 3323 of inner vial.

Figure 41:
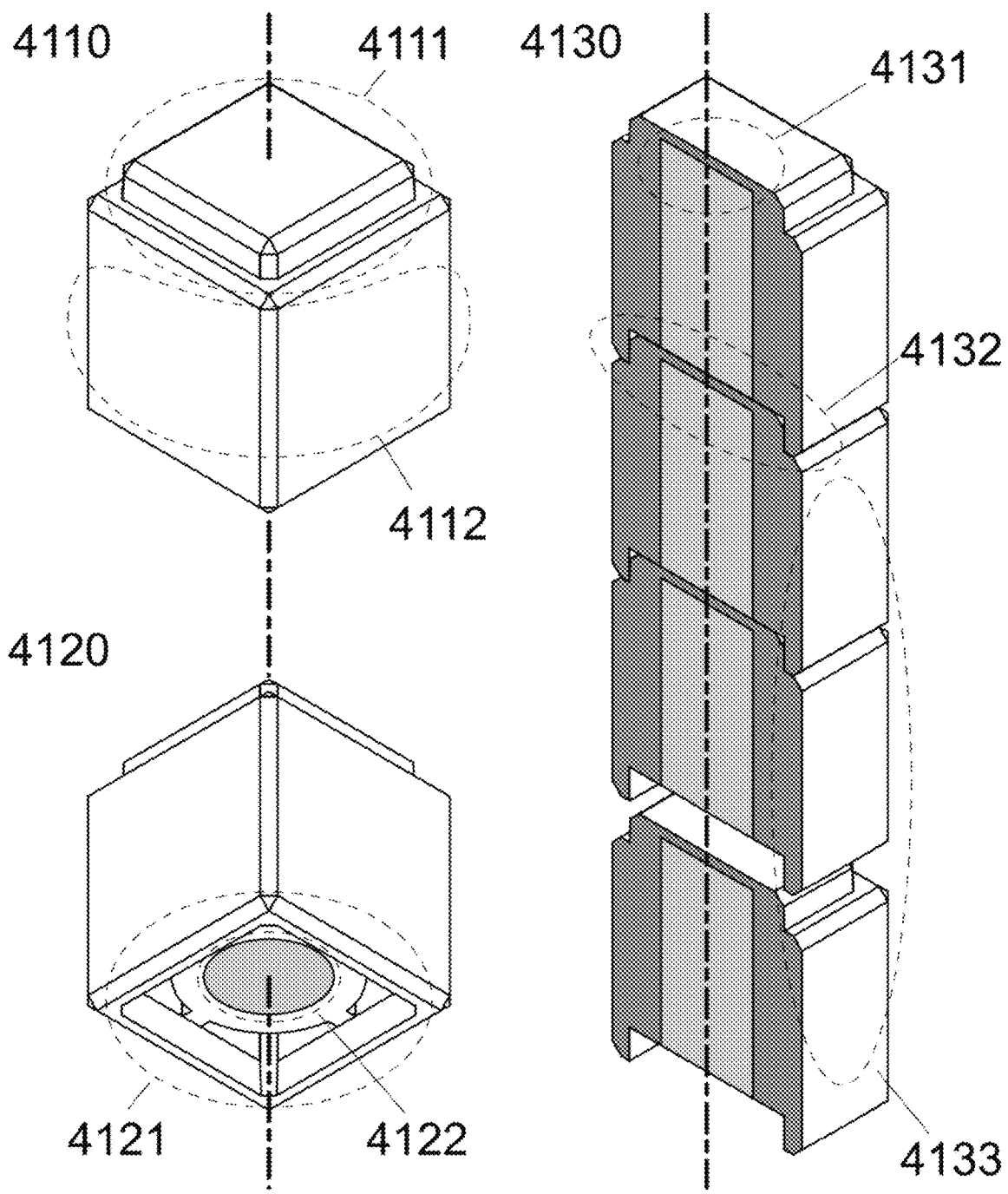
FIG. 41 illustrates one example of the tool to handle the vial shown in FIG. 31, with a cross-sectional view of the assembly of multiple instance of the tool.

FIG. 41 illustrates one example 4100 of a tool, a modular wrench, that can be used to take vial 3110 out of a container, to open, or to seal vial 3110. Views 4110 and 4120 are isometric views of the wrench 4110 from above and below respectively; cross-sectional view 4130 shows a configuration of an assembly of multiple instances of wrench 4110.

Wrench 4110 may be approximately a cube of which top may be a mesa with geometry resembling the outer sidewall and the top surface of cap shell 3121, as shown in region 4111. The sidewalls 4112 of wrench 4110 may resemble the perimeter of sidewalls 3211 of outer vial 3125 including four (4) vertical sidewalls with a chamfer between each pair of adjacent sidewalls, resulting in a large contact area for user to grab.

As shown in view 4120, the bottom surface of wrench 4110 has a square hollow of which geometry is the opposite of mesa 4111, so that hollow 4121 can cover the top of cap shell 3125 resulting in an overlap region on the direction perpendicular to the top surface of cap shell 3121. A magnet 4122 can be mounted into hollow 4121 so that magnet 4122 can attract the magnetic material inside volume 3740 while wrench 4110 is at proximity with cap.

As shown in cross-section 4130, four (4) instances of wrench 4110 are stacked together becoming a single extra-long wrench. Region 4131 shows that the upper surface of the magnet 4122 is very close to the upper surface of wrench 4110, resulting in a proximity between the magnets in adjacent instances of wrench 4110 to enhance the magnetic attraction. The distance 4131 may be optimized based on the designated magnitude of force required for the magnetic attraction between adjacent wrench 4110. As shown in assembly 4132, mesa 4111 and hollow 4121 fit together and lock the relative position of adjacent wrench 4110s. The outer sidewalls of all wrench 4110 should be aligned as shown in side 4133 to make it easy for the user to hold and grab assembly 4130.

Figure 42:
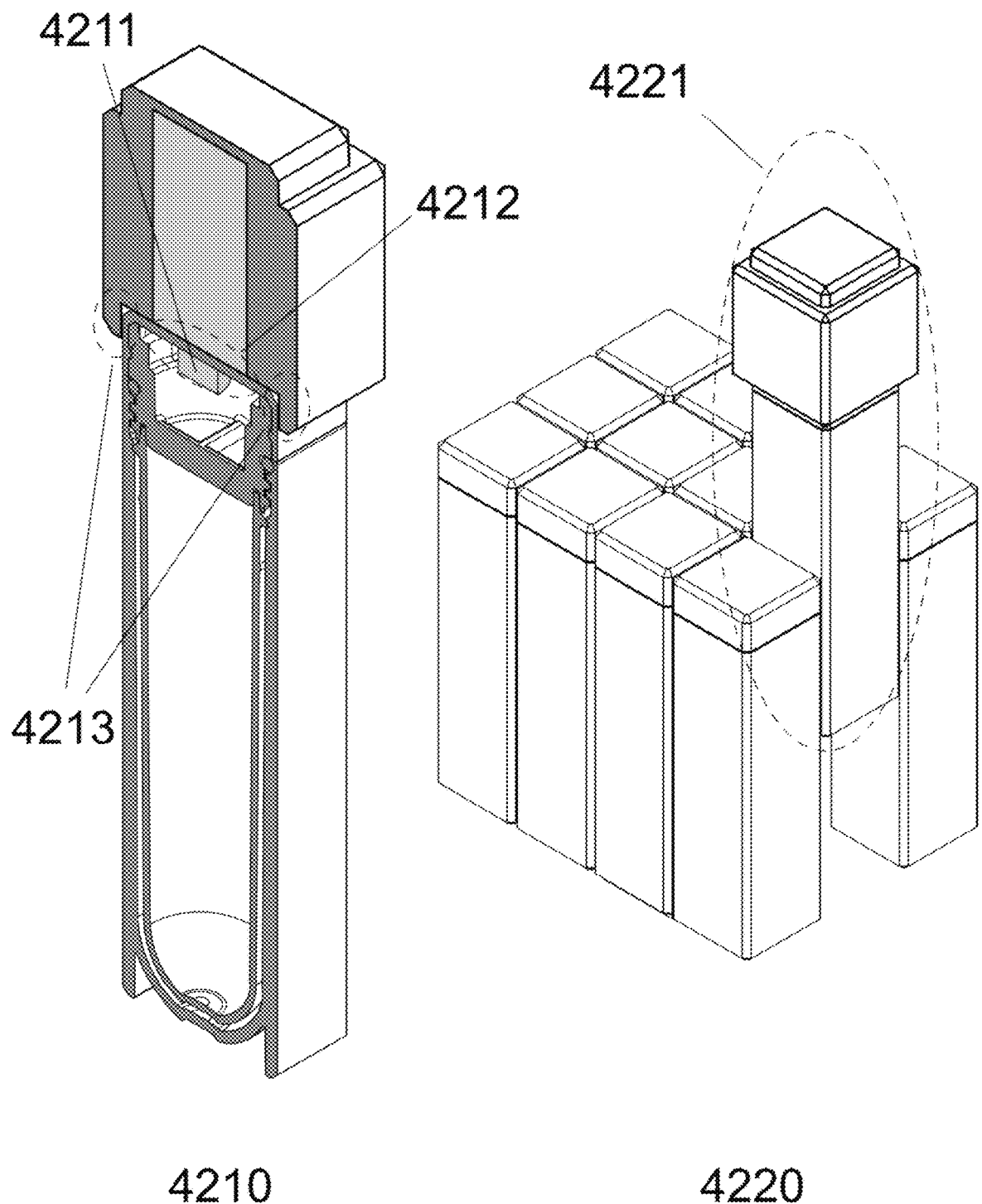
FIG. 42 illustrates one example of the interaction between the tool shown in FIG. 41 and an array of the vial shown in FIG. 31.

FIG. 42 illustrates the interactions 4200 between wrench 4110 and vial 3110. Cross-section 4210 shows the interaction between one wrench 4110 and one vial 3110, while view 4220 shows that one vial 3110 is being taken out by a wrench 4110.

As shown in view 4210, magnet 4211 is mounted in volume 3740 onto the inner surface of cap shell 3121. Magnet 4211 in vial 3110 and magnet 4122 in wrench 4110 may be at proximity so that the magnetic attraction is able to pull cap 3121 into hollow 4121. Subsequently, a user can lift wrench 4110 to pull the vial 3110 attached to wrench 4110 out, as shown in 4220. Vice versa, a user can pick up a vial 3110 using wrench 4110 and then put the vial 3110 into a vacancy in an existing array of vial 3110 or into a container/rack/tank/box. Moreover, wrench 4110 can be used to screw or unscrew cap 3610 from vial body 3410 since wrench 4110 provided a larger area for the user to grab compared to cap 3610. Magnet 4211 can either be a permanent magnet or a material that can be temporarily or permanently magnetized by external magnetic field.

One significant advantage of using wrench 4110 to handle vial 3110 may be that the user do not have to touch vial 3110 while working with vial 3110 while vial 3110 is often at cryogenic temperature. Touching vial 3110 at cryogenic temperature without thick gloves may not only cause frostbite to the user but also raise the temperature of vial 3110, which may have uncontrolled impact on the sample inside vial 3110. On the other hand, handling vial 3110 with thick gloves on may not be efficient. As wrench 4110 is possibly made of material with low thermal conductivity, it may prevent both the harm to user as well as the harm to the sample during operation, while keeping sufficient dexterity to work with vial 3110.

Figure 43:
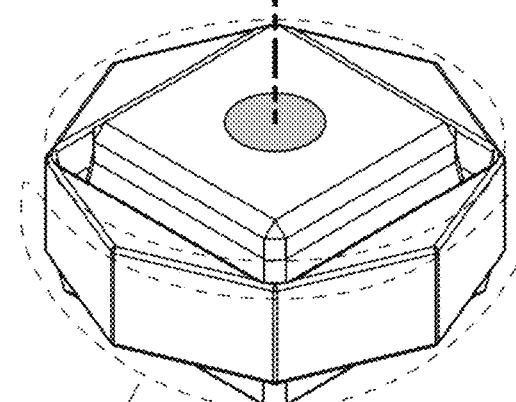
FIG. 43 illustrates a possible alternative design of the tool shown in FIG. 41.
Figure 43:
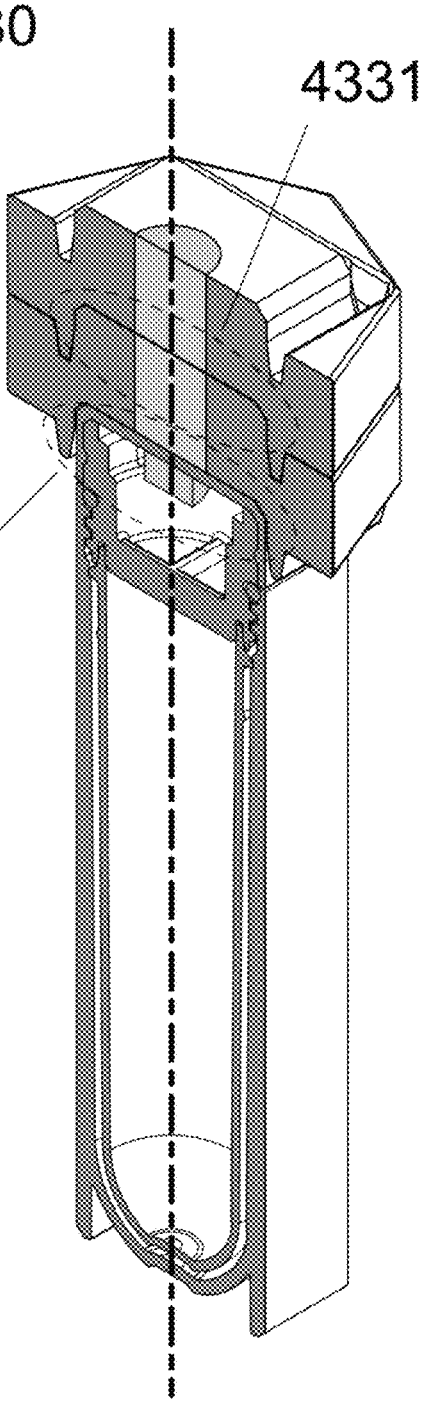

FIG. 43 illustrates one alternative design 4300 of wrench 4110. Views 4310 and 4320 are isometric views of the wrench 4310 from above and below respectively; cross-sectional view 4330 shows a configuration of an assembly of two (2) instances of wrench 4310 and one vial 3110.

Wrench 4310 may resemble wrench 4110 from most features, including mesa 4311 and hollow 4321 that correspond to mesa 4111 and hollow 4121 of wrench 4110. Magnet 4322 may be placed in the center of wrench 4310 so that multiple instances of wrench 4310 can be assembled to make a single tool similar to assembly 4130. The perimeter of sidewalls 4312 may be octangular rather than square in sidewalls 4112, making wrench 4310 easy to be held by two fingers. Essentially the perimeter 4312 can be made into any shapes that benefit the grasp as well as twist motion the user would like to apply to wrench 4310.

As shown in interface 4331, mesa 4311 and hollow 4321 of adjacent wrench 4310 fit close each other, reinforced by the magnetic attraction between magnet 4322s. Wrench 4310 can pick up vial 3110 using the attraction between magnetic 4322 and magnet 3121, and wrench 4310 can screw or unscrew cap 3610 from vial body 3410 using the exact fit between cap shell 3121 and hollow 4321, as shown in interface 4332.

Figure 44:
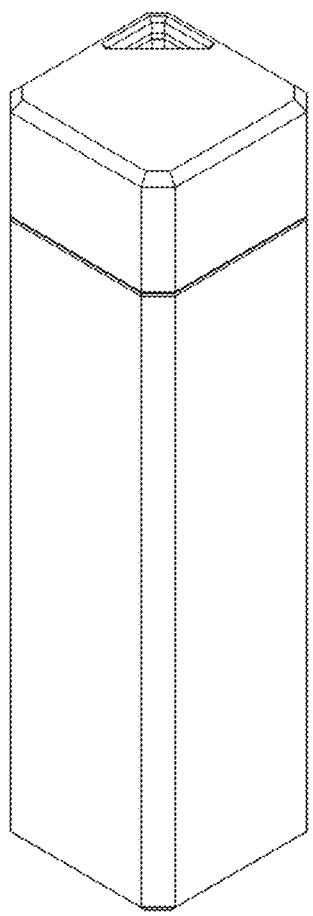
FIG. 44 illustrates another example of a vial that may be used in this disclosure, including an overview of the assembled vial as well as an exploded view of the components.
Figure 44:
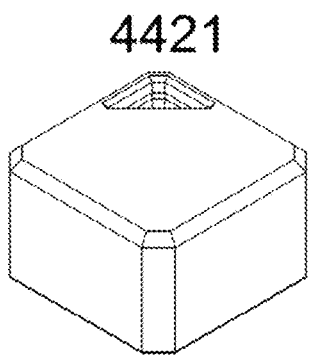
Figure 44:
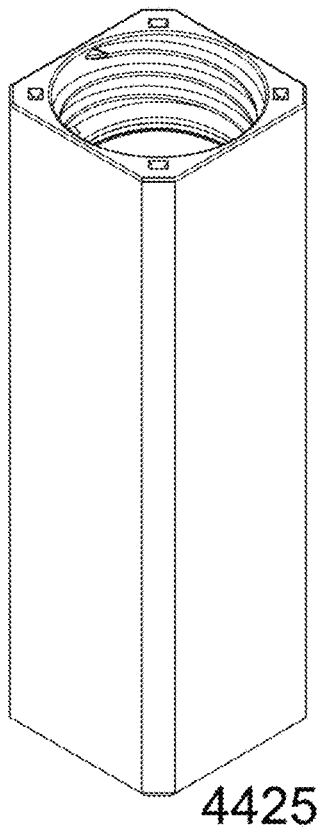
Figure 44:
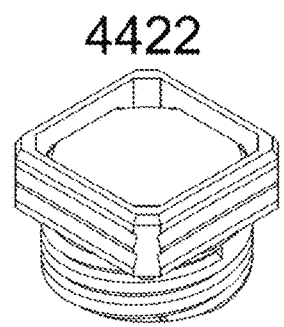
Figure 44:
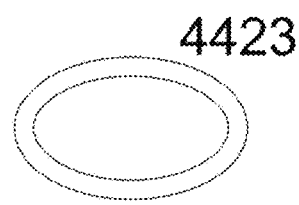
Figure 44:
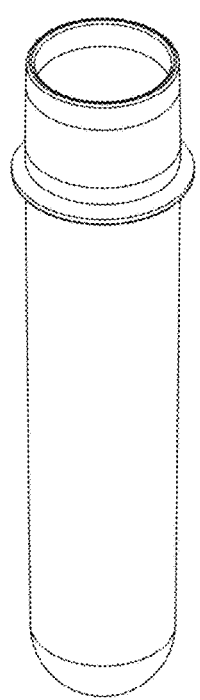

FIG. 44 illustrates the components 4400 for another example of a container 3110. Each component has an exploded view. A closed vial is shown in view 4410. The components may include a cap shell 4421 (equivalent to 3121), a cap base 4422 (equivalent to 3122), a gasket 4423 (equivalent to 3123), an inner vial 4424 (equivalent to 3124), and an outer vial 4425 (equivalent to 3125). A vial may be a tube.

The vial 4410 may include a vial body and a cap, where the body may include inner vial 4424 and outer vial 4425. A cap may include cap shell 4421, cap base 4422, and also may optionally include gasket 4423.

Figure 45:
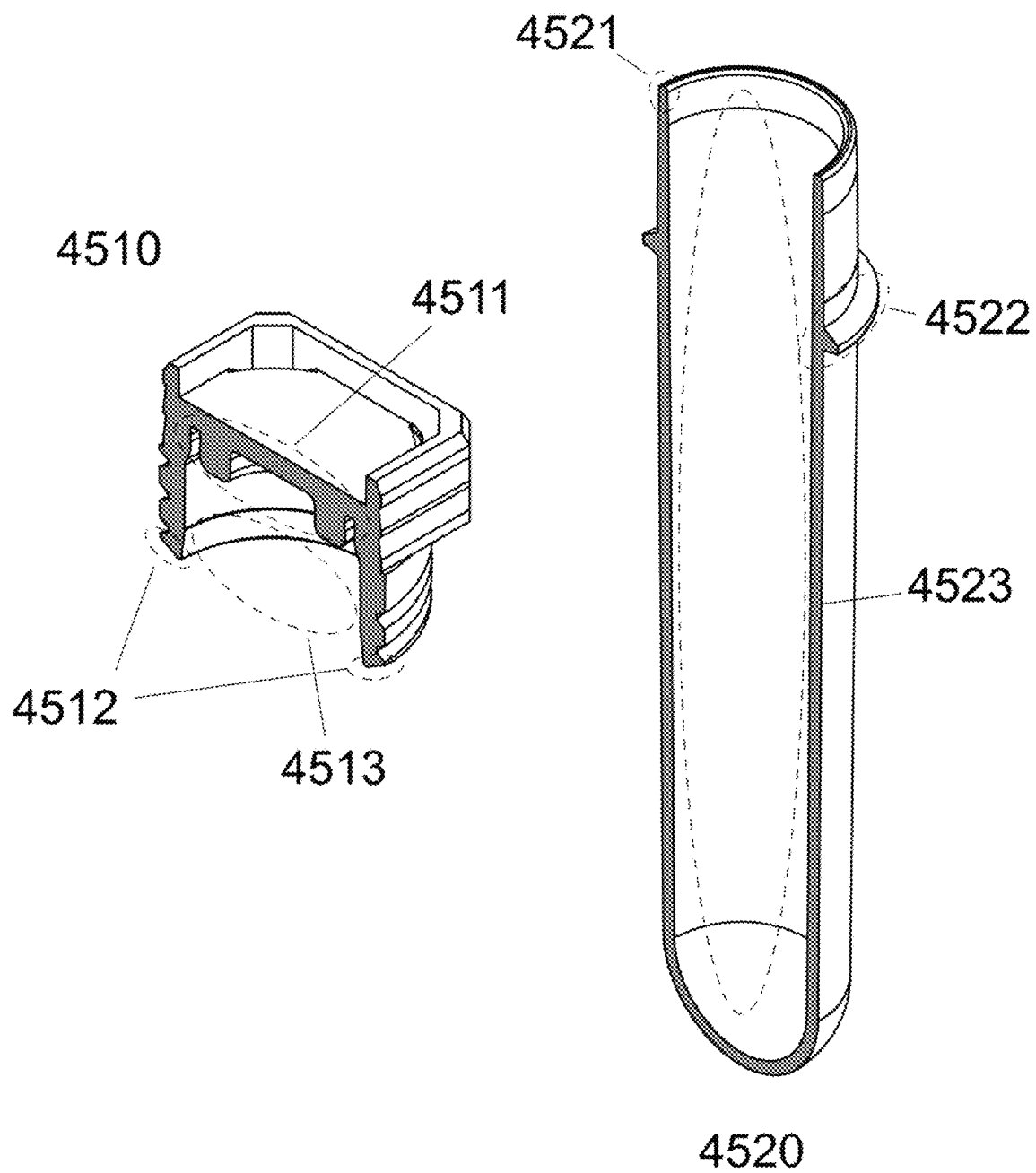
FIG. 45 is a cross-sectional illustration of the cap base and the inner vial shown in FIG. 44.

FIG. 45 illustrates the inner vial 4424 and the cap base 4422 described in FIG. 44 4500. Cross-sectional view 4510 shows the interior features of cap base 4422, and cross-sectional view 4520 shows the features of inner vial 4424.

As shown in view 4510, cap base 4422 may include a cuboid part on the top and a cylindrical part underneath, together with other common features of cap base 3122. Ring groove 4511 is to be clamped onto rim 4521 to form a sealing structure while vial 4410 is fastened. Also, compared to ring groove 3523, ring groove 4511 may be indented into the cap, resulting in a hollow 4513 that opens from the cylindrical side. Hollow 4513 may be to contain the upper part of inner vial 4424. Taper 4512 may be the upper surface that help clamp gasket 4423 after vial 4410 is fastened.

As shown in view 4520, inner vial 4424 may share common features with inner vial 3124, including rim 4521 at the opening of inner vial 4424, rim 4522 on the side of inner vial 4424, and optionally may including annular mark 3312 and dent 3324. Rim 4521 at the opening of inner vial 4424 may serve a sealing purpose to encapsulate interior volume 4523 from the surrounding environment. Rim 4522 can support inner vial 4424 by residing into annular groove 3221 of outer vial 3125 (outer vial 4425). Compared to rim 3322 of inner vial 3124, the location of rim 4522 on vial 4424 is lower, leaving a cylindrical section above rim 4522 that matches hollow 4513 inside cap base 4422. Inner vial 4424 is possibly made of transparent or semi-transparent material, polypropylene for example, so the user can observe the content inside inner vial 4424.

The interior surface 4523 of inner vial 4424 may be coated with a coating agent including one or more kinds of chemicals that may interact with the sample to be added into inner vial 4424.

Figure 46:
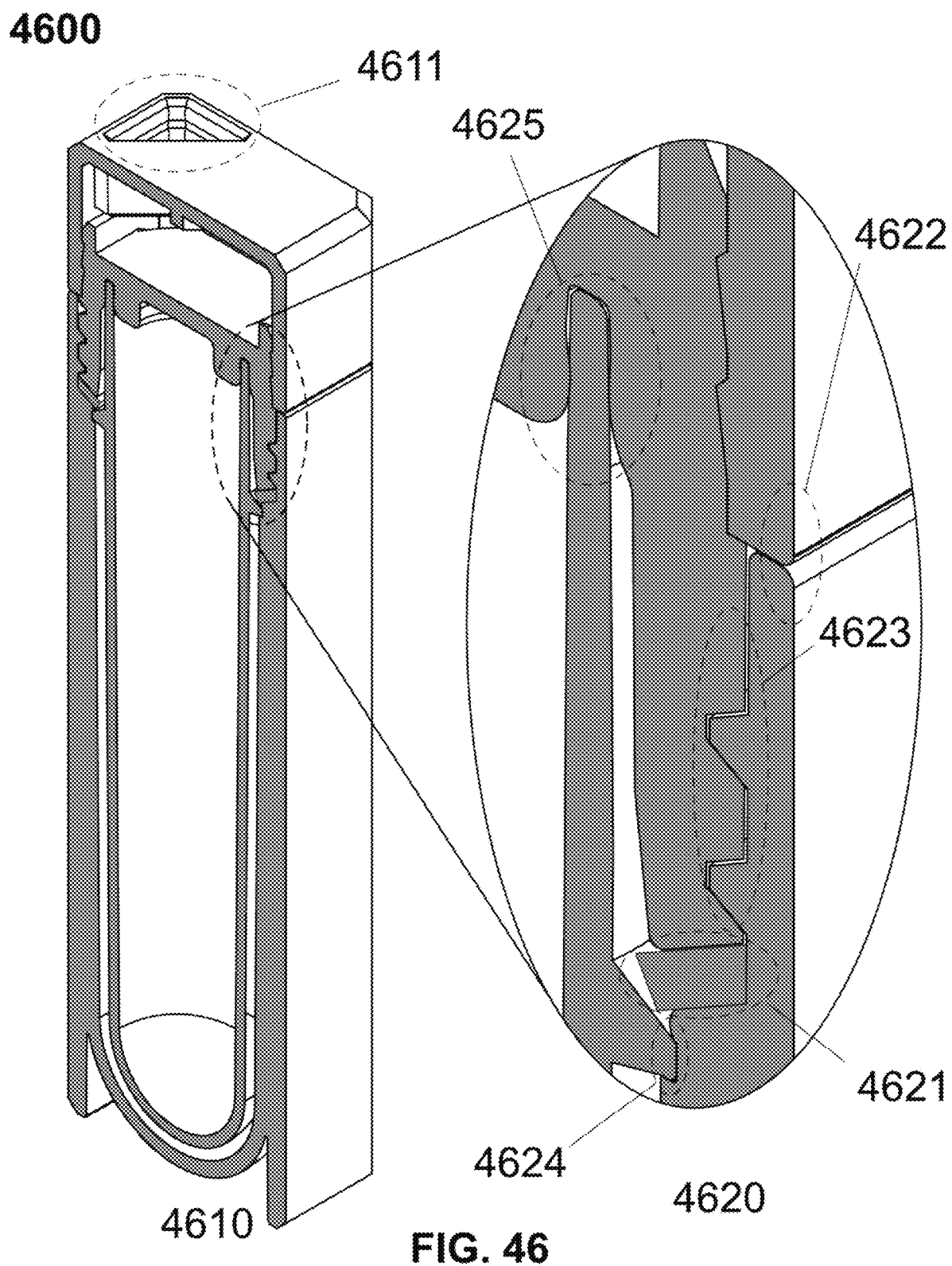
FIG. 46 is a detailed cross-sectional illustration of the assembly of the components shown in FIG. 44.

FIG. 46 illustrates the interactions 4600 among all the components described in FIG. 44. Cap (including cap shell 4421, cap base 4422) may be tightly screwed into vial body (including outer vial 4425 and inner vial 4424, and gasket 4423). View 4610 is a cross-sectional view of vial 4410, and view 4420 is a close-up view of the region where the components described above are in contact. As cap (cap base 4422) is screwed into the opening of vial body (outer vial 4425) along threads-fitting indicated by 4623, multiples interactions among components are described below.

Slot 4611 on cap shell 4421 may be for vial 4410 to be picked up by a pair of tweezers or other similar tools.

As shown in region 4621, gasket 4423 may be squeezed/compressed by cap base 4422 and outer vial 4425, filling the annular gap between cap base 4422 and outer vial 4425 to form a seal that may prevent liquid from entering the interior volume of vial 4410. The cross-section of gasket 4423 can be circular, elliptical, rectangular, diamond, or other shapes, as long as gasket 4423 is able to seal the gap between cap base 4422 and outer vial 4425 tight enough so that liquid is not able to enter the volume inside outer vial 4425 from outside. Also, the deformation of gasket 4423 shown in region 4621 may provide a force that keeps threads-fitting 4623 tight.

As shown in region 4622, after cap base 4422 is screwed to the designated position, the vertical sidewalls of outer vial 3125 should be coplanar with the corresponding sidewall of cap shell 4421, as shown in 4622. The assembled vial 4410 may have an overall cuboid shape with chamfers on each edge.

As shown in 4624, inner vial 4424 is pressed into outer vial 4425 by cap base 4422, so the interface between rim 4522 and groove 3221 may be under compression to reinforce the sealing function. Inner vial 4424 and outer vial 4425 may not have any region of contact other than fitting 4624, in order to minimize the conductive heat transfer between inner vial 4424 and outer vial 4425. Fitting 4624 may also provide mechanical support to inner vial 4424 so that inner vial 4424 may not tilt inside volume 3223 of outer vial 3125 (outer vial 4425), even if vial 4425 collides with other objects. When cap base 4422 is being unscrewed from the locking position, fitting 4624 may hold inner vial 4424 in place with outer vial 4425 so that the user may not pull inner 4424 out accidently.

As shown in region 4625, rim 4521 on inner vial 4424 is pinched by annular groove 4511 to form a seal that encapsulates the content inside inner vial 4424, and the sealing mechanism is elaborated in detail in view 3825 and in FIG. 39. Compared to view 3825, the location of region 4625 may be inside hollow 4513, and the opening of inner vial 4424 may be above the top surface of outer vial 4425.

FIG. 47 briefly describes one set of procedures to produce the coating that may be applied to surface 4523 inside the container that may be used in this disclosure 4700.

In step 4710, one or multiple types of chemicals may be added into the container (inner vial 4424 for instance). The chemicals may be either solid, liquid or a mixture of both.

In step 4720, the opening of the container described in step 4710 may be sealed. For example, inner vial 4424 can be sealed by pressing cap base 4422 onto the opening of inner vial 4424 following the completion of step 4710. Other type of sealing may also be applied, wither temporary or permanent. Step 4720 is optional.

In step 4730, the container described in step 4720 may be centrifuged where the container's axis of symmetry is col-linear with the spinning axis of the centrifuge. The chemical loaded into the container (inner vial 4424 for instance) in step 4710 are spread on the interior sidewall of the container, forming a possibly layer of uniform thickness.

In step 4740, the layer of chemicals on the interior sidewall of the container, described in step 4730, may be solidified to form a structure that lasts for a relative long period of time. The solidification (curing) of the chemical layer can be completed by altering the temperature of the chemical layer, exposing the chemical layer to radiations, or adding curing agent to the chemical layer. Other methods may also be used for the solidification. Step 4740 may be chronologically combined with step 4730 so that the chemical loaded in step 4710 can be simultaneously centrifuged and solidified.

In step 4750, the formation of the structural layer inside the container (inner vial 4424 for instance), is the results of the process flow from step 4710 to step 4740.

It is to be understood that, the present disclosure is not limited to the exact construction that has been described above and illustrated in the accompanying drawings, and that various modifications and changes can be made without departing form the scope thereof.

The invention claimed is:

1. A storage system comprising:
 an outer wall forming a container with an opening end and a screw thread disposed on an inside surface of the outer wall;
 a vial situated inside the container and substantially thermally insulated therefrom, the vial including an open end that is proximate to the opening end of the container; and
 a container cap that closes the container, seals the open end of the vial, and substantially thermally insulates the vial from the environment, the container cap including
  an annular groove that engages with the open end of the vial, and
  an annular ring having an interlocking structure that engages with the screw thread of the container between the outer wall and the vial,
 wherein an inner surface of the outer wall includes a circumferential notch and wherein the vial includes a protrusion that is shaped to engage with the notch and wherein the only point of contact between the vial and the outer wall is where the protrusion fits into the notch.

2. The storage system of claim 1 further comprising a gasket disposed between the annular ring of the container cap and the inside surface of the outer wall to form a seal therebetween.

3. The storage system of claim 1 wherein the vial and the container cap form an inner surface that is enclosed and the container cap is at least partially covered by an additive in either a liquid form, a solid form, or a combination of both forms.

4. The storage system of claim 1 wherein the container cap includes an empty hollow inside as a thermal insulation layer.

5. The storage system of claim 1 further comprising a locator that is on, in, or attached to the container and that is capable of locating the container.

6. The storage system of claim 1 further comprising an identifier that is on, in, or attached to the container and that is capable of identifying the container.

* * * * *